US006917121B2

(12) United States Patent
Akimoto et al.

(10) Patent No.: US 6,917,121 B2
(45) Date of Patent: Jul. 12, 2005

(54) POWER GENERATOR UNIT

(75) Inventors: Satoru Akimoto, Shizuoka (JP); Hidenori Takahashi, Shizuoka (JP); Shinichi Kajiya, Shizuoka (JP); Makoto Yokokura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 36 days.

(21) Appl. No.: 10/405,061

(22) Filed: Mar. 31, 2003

(65) Prior Publication Data

US 2004/0004356 A1 Jan. 8, 2004

(30) Foreign Application Priority Data

Mar. 29, 2002 (JP) ....................................... 2002-096991
Mar. 29, 2002 (JP) ....................................... 2002-097449

(51) Int. Cl.[7] .................................................. H02P 9/04
(52) U.S. Cl. ............................ 290/1 A; 290/1 B; 123/2
(58) Field of Search ................................. 290/1 B, 1 A; 123/2, 41.7

(56) References Cited

U.S. PATENT DOCUMENTS

| | | | | |
|---|---|---|---|---|
| 4,243,893 A | * | 1/1981 | Sten | 290/1 B |
| 5,121,715 A | * | 6/1992 | Nogami et al. | 123/41.7 |
| 5,433,175 A | * | 7/1995 | Hughes et al. | 123/2 |
| 5,705,917 A | * | 1/1998 | Scott et al. | 322/46 |
| 5,899,174 A | * | 5/1999 | Anderson et al. | 123/2 |
| 5,908,011 A | * | 6/1999 | Stauffer et al. | 123/2 |
| 5,929,611 A | * | 7/1999 | Scott et al. | 322/46 |
| 5,977,667 A | * | 11/1999 | Hirose | 310/51 |
| 6,028,369 A | * | 2/2000 | Hirose et al. | 290/1 A |
| 6,091,160 A | * | 7/2000 | Kouchi et al. | 290/1 A |
| 6,100,599 A | * | 8/2000 | Kouchi et al. | 290/1 A |
| 6,184,599 B1 | | 2/2001 | Okabe et al. | |
| 6,608,393 B2 | * | 8/2003 | Anderson | 290/1 A |
| 6,661,107 B2 | * | 12/2003 | Higuchi et al. | 290/1 A |

FOREIGN PATENT DOCUMENTS

| | | | | |
|---|---|---|---|---|
| DE | 4201077 A1 | * | 7/1993 | F01P/11/12 |
| JP | 57-000329 | | 1/1982 | |
| JP | 58-204916 | | 11/1983 | |
| JP | 59-074327 | | 4/1984 | |
| JP | 62-048915 | | 3/1987 | |
| JP | 62-077035 | | 4/1987 | |
| JP | 01-178716 | | 7/1989 | |
| JP | 02-070924 | | 3/1990 | |
| JP | 10-196389 | | 7/1998 | |
| JP | 11200876 A | * | 7/1999 | F02B/63/04 |
| JP | 2000337159 A | * | 12/2000 | F02B/63/04 |

* cited by examiner

*Primary Examiner*—Joseph Waks
(74) *Attorney, Agent, or Firm*—Knobbe, Martens, Olson & Bear, LLP

(57) ABSTRACT

A power generator unit incorporates an engine and a generator driven by the engine. The generator incorporates a multi piece sound insulation cover that allows for efficient cooling of the various internal components. A plurality of cooling paths are created within the cover and air is drawn into and through the cover by two separate fans. An engine cooling fan draws in cooling air through a generally dedicated cooling air vent(s) to cool an electronic control(unit, an engine cylinder, and a muffler. A generator cooling fan draws in cooling air through an additional cooling air vent(s) to cool an engine crankcase and the generator. The insulation cover provides quiet operation and efficient cooling of the power generator.

41 Claims, 62 Drawing Sheets

POWER GENERATOR UNIT

RELATED APPLICATIONS

The present application is based on and claims priority under 35 U.S.C. § 119 to Japanese Patent Applications Nos. 2002-096991 (field on Mar. 29, 2002) and 2002-097449 (filed on Mar. 29, 2002), the disclosures of which are hereby incorporated by reference in their entirety.

BACKGROUND OF THE INVENTION

1. Field of the Invention

The present invention generally relates to a portable power supply. More particularly, the present invention relates to a portable power supply that incorporates a generator driven by an engine.

2. Description of the Related Art

Portable power supplies such as power generators that incorporate a generator driven by an engine are popular for various uses. Although the power generators are convenient and useful, the internal combustion engine can be noisy and can bother an operator of the power generator or persons around the power generator. Various covers or shrouds can be used to minimize the noise generated by the power generator; however, allowing sufficient air to pass through the cover to cool and to dissipate the heat from the engine and other components can be difficult. Insufficient cooling air can also heat fuel stored in a fuel tank that is also located under the cover, which can affect engine performance.

SUMMARY OF THE INVENTION

An aspect of the present invention involves a power generator unit comprising an engine and a generator driven by the engine. The power generator unit also includes at least one fan that is driven by the engine (either directly or indirectly). A cover encloses the fan and includes at least one air intake opening. An electronic control module communicates with the engine, the generator, or both so as to control at least one operational characteristic of the power generator. The electronic control module is positioned immediately next to, but separate from, the air intake opening.

Another aspect of the present invention involves a power generator unit comprising a cover having at least a first air intake opening, a second air intake opening, and a discharge opening. The power generator unit also includes an engine with a first body portion that defines, at least in part, a combustion chamber, a second body portion disposed next to the first body portion, and at least one muffler that receives exhaust gases from the combustion chamber. The engine drives a generator, at least a first fan and a second fan. The first air intake opening is disposed on one side of the cover and the first fan is arranged to draw in external air through the first air intake opening. The engine is disposed downstream of the first fan, and the discharge opening is disposed downstream of the engine. Such an arrangement allows a first cooling air path to occur when the engine drives the first fan to draw external air through the first air intake opening to cool at least the first body portion of the engine. The heated air is then discharged through the discharge opening. The second air intake opening is disposed relative to the first and second fans such that at least a principal portion of external air drawn through the second air intake opening passes through the second fan and exits the cover through the discharge opening, thereby producing a second cooling air path. The generator is disposed generally in the second cooling air path.

In accordance with an additional aspect of the invention, a power generator unit comprises a cover including a bottom portion. An engine is disposed within the cover and drives a generator. A fuel tank is mounted onto the bottom portion of the cover along with an electronic control module that communicates with at least one of the engine and the generator. The electronic control module is mounted onto the bottom portion of the cover near the fuel tank.

Some of the applications and configurations of the improved power generator unit will be discussed below. It should be noted that the following discussion relates to several distinct features of the present invention and not all of the features need to be present in any single embodiment of the present invention. Thus, some of the features may be used with other features in some applications while other applications will only reflect one of the features. Moreover, while the features, aspects and advantages can be applied to portable power generators in the narrow sense, they can also be applied to other power supplies as will become apparent to those of ordinary skill in the art.

BRIEF DESCRIPTION OF THE DRAWINGS

These and other features, aspects and advantages of the present invention are described in detail below in connection with the accompanying drawings. The drawings comprise 62 figures.

FIG. 15(*b*) is a cross sectional view of the front cover piece taken along the section line B2—B2 of FIG. 12.

DETAILED DESCRIPTION OF PREFERRED EMBODIMENTS OF THE PRESENT INVENTION

Figure 1:
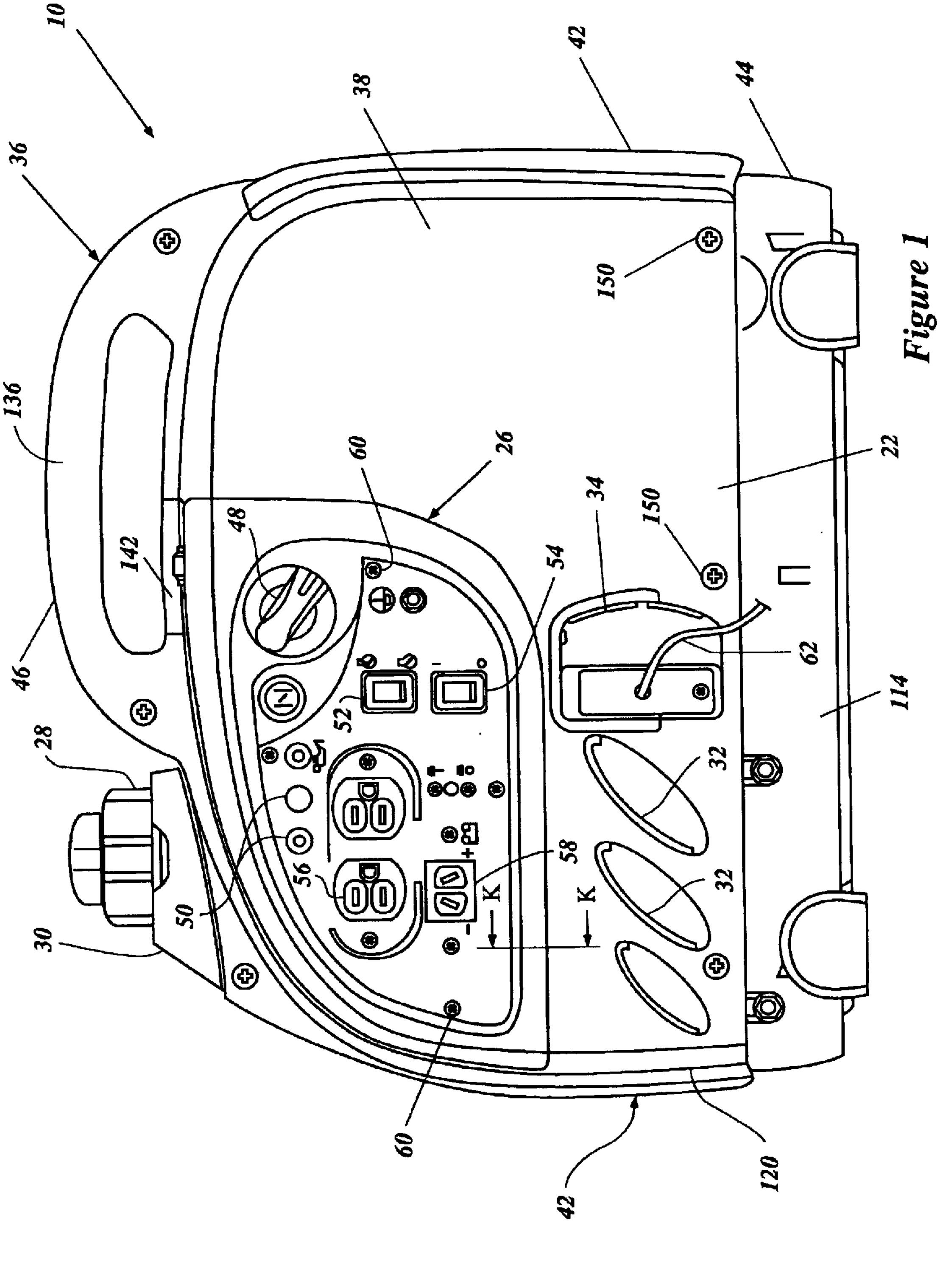
FIG. 1 is a front view of a power generator unit that is configured in accordance with certain features, aspects and advantages of the present invention.

With reference initially to FIG. 1, an overall structure of a power generator unit 10 with various features, aspects and advantages of the present invention will be described. For purposes of describing the power generator unit 10, reference will be made to the unit as it is shown in FIG. 1. Thus, the terms "front," "rear," "left side," "right side," "top," and "bottom" are used in reference to the power generator unit 10 in the orientation shown in FIG. 1.

The illustrated power generator unit 10 generally comprises an internal combustion engine 12 that operates on a four-stroke cycle combustion principle. The engine 12 includes a crankcase 14 and a cylinder 16 incorporating a cylinder bore (not shown), classifying the engine 12 as a single cylinder engine. The illustrated engine, however, merely exemplifies one type of engine in connection with which various aspects and features of the present invention can be used. Engines having a different number of cylinders, other cylinder arrangements, other cylinder orientations (e.g., upright cylinder banks, inline, boxer, V-type, and W-type), operating on other combustion principles (e.g., crankcase compression two-stroke, diesel, and rotary) and having different cooling systems (e.g., air cooling and water cooling) are all practicable. Many orientations of the engine are also possible (e.g., with a transversely or vertically oriented crankshaft).

A piston (not shown) reciprocates in the cylinder bore formed within the cylinder 16. A cylinder head 17 is affixed to the upper end of the cylinder 16 to close the upper end of the cylinder bore. The cylinder head member, the cylinder bore and the piston together define a combustion chamber (not shown). Multiple fins are incorporated on the cylinder 16 and cylinder head 17 to better dissipate engine-operating heat.

The crankcase 14 is affixed to the lower end of the cylinder 16 to close the lower end of the cylinder bore and to define, in part, a crankshaft chamber. The crankshaft (not shown) is journaled between the cylinder 16 and the crankcase 14. The crankshaft is rotatably connected to the piston through a connecting rod (not shown).

The cylinder 16, the cylinder head 17, and the crankcase 14 together generally define an engine body of the engine 12. The engine 12 preferably is made of an aluminum-based alloy, however, other materials can also be used.

The engine 12 preferably comprises a fuel supply system 18, an ignition system (not shown), and an exhaust system 20. Further details of engine function and mounting position of these systems will be described below.

An AC generator 22 is placed next to the engine 12 to be driven by the engine 12. A shaft of the generator (not shown) is coupled with the output shaft of the engine 12 and rotates together with the engine crankshaft. The AC generator 22 generates an alternating current (AC) power.

A power-converting unit (not shown) is electrically coupled with the generator 22 to convert the AC power to a high quality AC power. The power-converting unit incorporates an electronic control module 24 to control an output of the power-converting unit. The power generator unit 10 also includes a DC/DC converter (not shown). The DC/DC converter is electrically coupled to the power-converting unit.

The electronic control module 24 controls the output of the generator 22 and the output of the DC/DC converter in addition to controlling the output of the power-converting unit. Preferably, the control module 24 comprises at least a central processing unit (CPU) and some form of memory or storage.

FIG. 1 shows an overall side view of the power generator unit 10 including a control panel 26, a fuel cap 28, a fuel tank collar 30, and a cover 36. The cover 36 preferably is a multiple piece sound insulation cover and includes a plurality of cooling air vents. In the illustrated embodiment, the cover 36 includes several different air cooling vents, including a first set of cooling air intake vents 32 and a second set of cooling air intake vents 34.

In the illustrated embodiment, the multiple piece sound insulation cover 36 comprises a front piece 38, a rear piece 40, a side piece 42, and a bottom tray 44. Each of the cover pieces 38, 40, 42 and the tray 44 can be formed by one or more elements. The various sound insulation covers are advantageously held together through various fasteners 47. An access opening 45 is located beneath the handle 46 on the sound insulation cover 36 to access various internal components of the power generator unit 10. The front piece 38 and the rear piece 40 of the sound insulation cover 36 together form a handle 46 to allow for easy transportation of the power generator unit 10. The pieces 38, 40, 42, the access cover 142, and the bottom tray 44 can incorporate insulating fiber material or internal metal coverings to further improve the sound proofing of the insulating cover 36.

The control panel 26, which is best seen in FIG. 1, further comprises a fuel cock control knob 48, various indicators 50, an engine shut-off switch 52, an economy switch 54, an AC voltage output 56, and a DC voltage output 58. Various fasteners 60 hold the control panel 26 to the front piece 38 of the multiple piece sound insulation cover 36.

As noted previously, the various cooling air vents incorporated into the sound insulation cover include the first set of cooling air intake vents 32 and the second set of cooling air intake vents 34. In the illustrated embodiment, the vent openings of the second set of cooling air intake vents 34 are smaller than the vent openings of the first set of cooling air intake vents 32. The second set of cooling air intake vents 34 preferably are disposed next to a starter pull-cord 62. Additional air-cooling vents 68 are incorporated into the rear piece 40.

Figure 2:
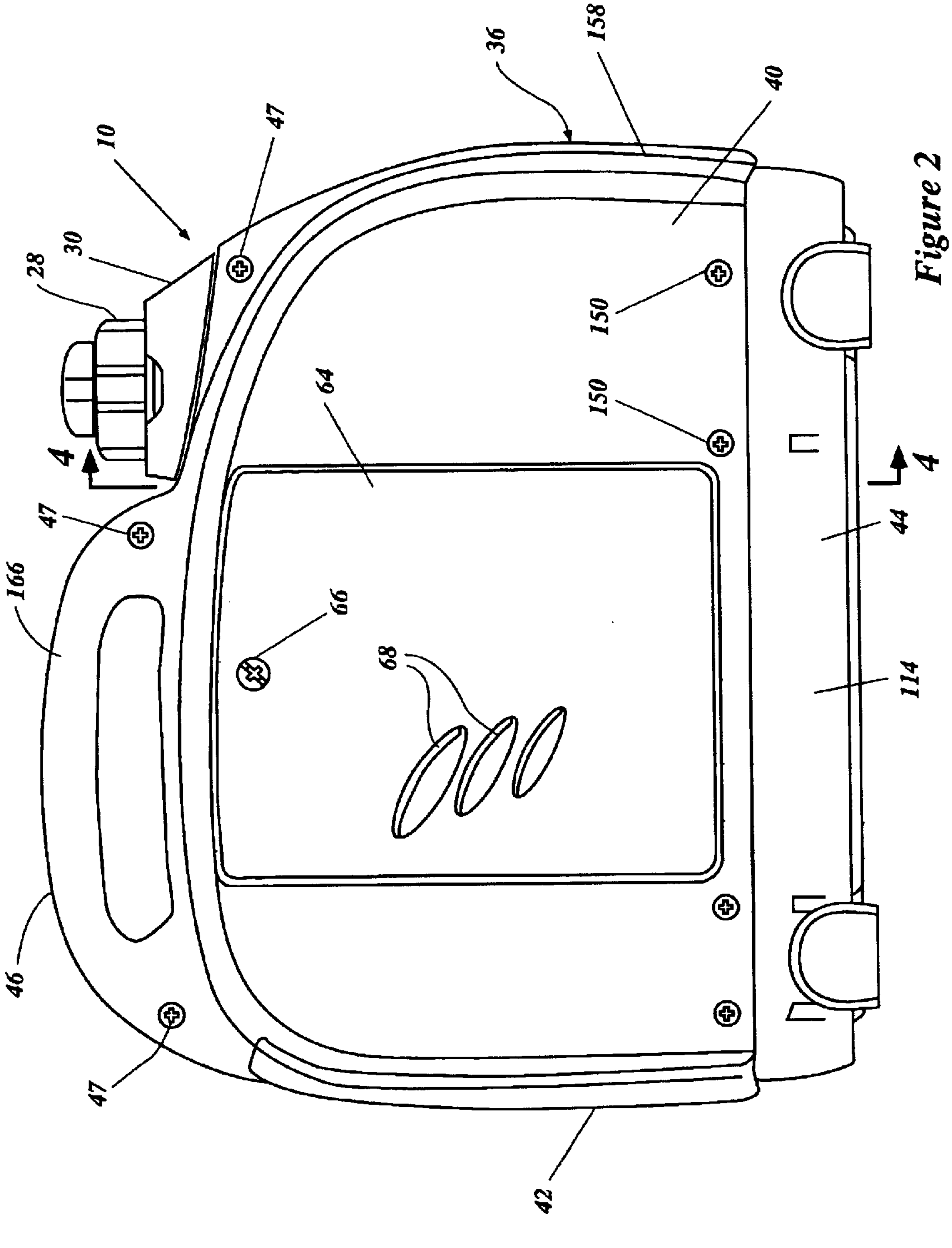
FIG. 2 is a rear view of the power generator unit of FIG. 1.
Figure 3:
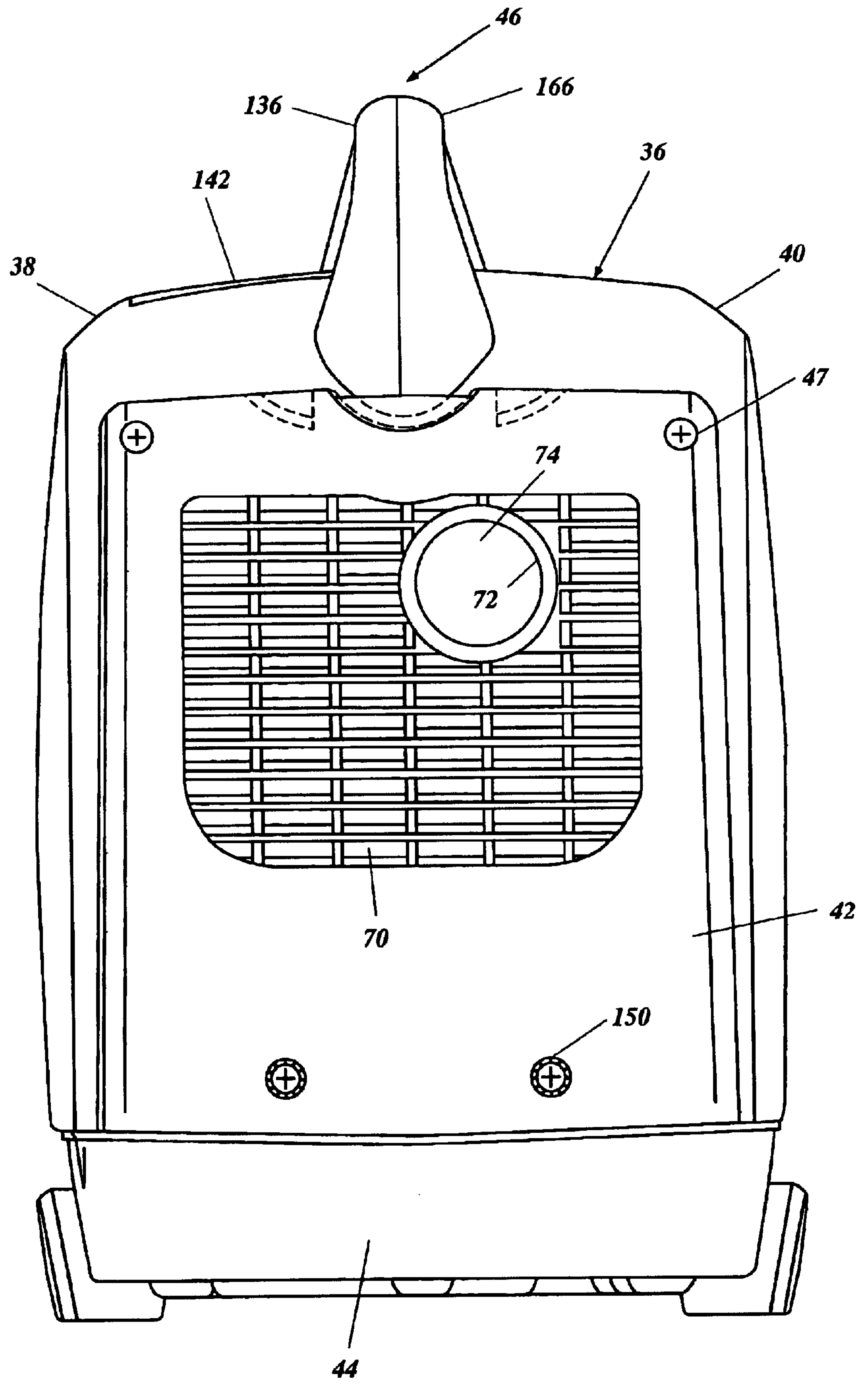
FIG. 3 is a side view of the power generator unit of FIG. 1.

With reference to FIG. 2, the rear piece 40 can be seen. An access lid 64 is incorporated into the rear piece 40 and held in place through a fastener 66. FIG. 3 illustrates the side piece 42 with an effluent or discharge vent 70. Incorporated into the effluent vent 70, is an exhaust outlet recess 72 where a muffler 74 discharges exhaust gases to the outside environment.

Figure 4:
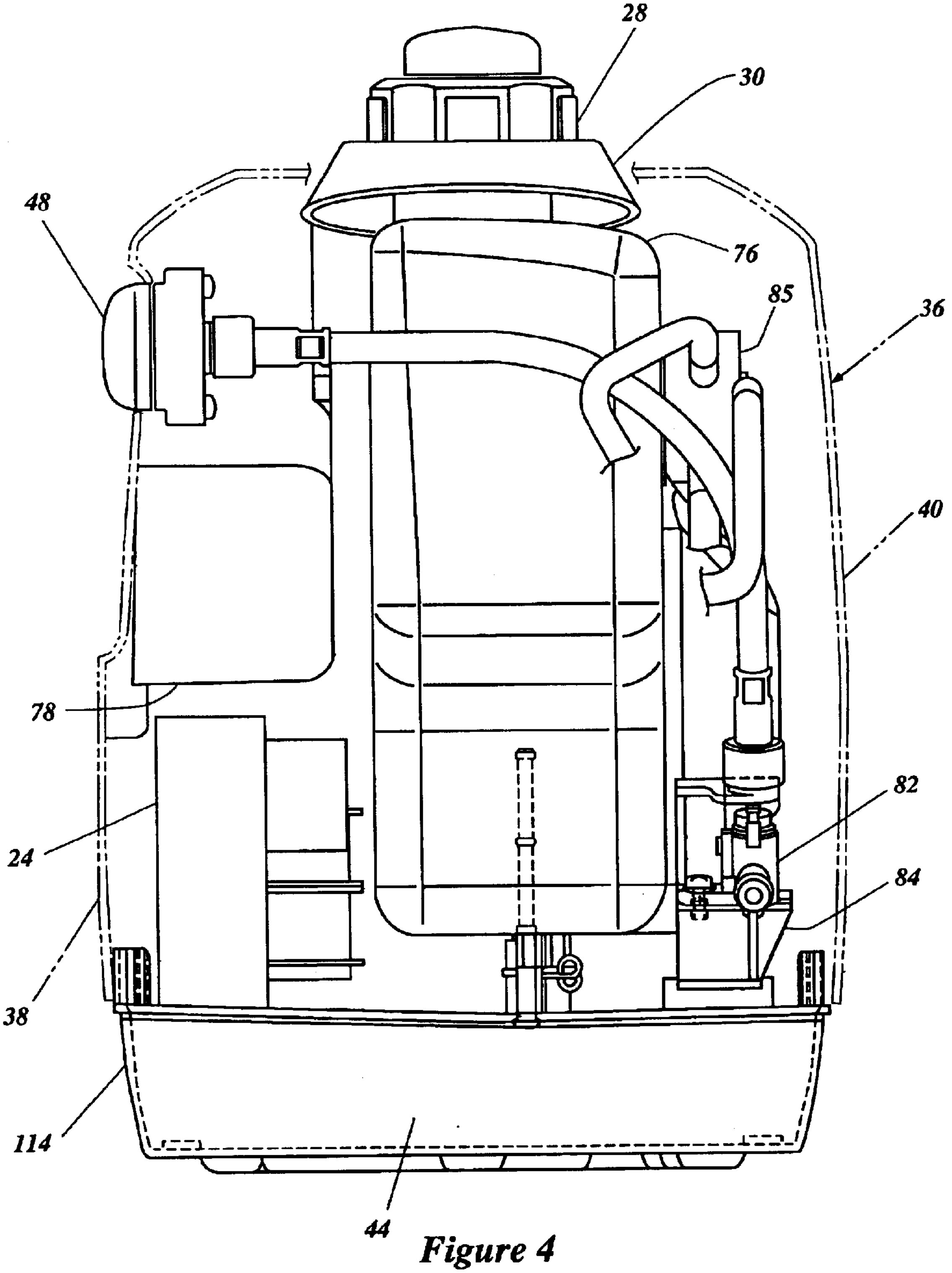
FIG. 4 is a sectional view of the power generator taken along section line 4—4 of FIG. 2 and illustrates a layout of several internal components of the power generator unit, including a fuel tank, a fuel cock, a fuel pump, an electronic control module, and a control panel housing. A bottom tray portion of a cover for the power generator unit is shown in solid lines, whereas front and rear pieces of the cover are shown in phantom lines.

With reference to FIG. 4, a control panel housing 78 resides behind the control panel 26. The housing 78 encloses at least the back sides of at least some of the electrical components that are arranged on the control panel 26.

A fuel tank 76 lies adjacent to the control panel housing 78. The electronic control module 24 is positioned below the control panel housing 78 and directly in front of the first set of cooling air intake vents 32. The fuel cock control knob 48 is advantageously connected through a flexible transmitter 80 to a fuel cock 82 supported by a fuel cock support piece 84. The fuel cock 82 regulates the fuel flow from the fuel tank 76 through a fuel pump 85 to the engine 12.

A generally planar surface of the electronic control module 24 includes cooling fins, the electronic control module 24 is advantageously mounted directly in behind, but spaced apart from, the first set of cooling air intake vents 32. This direct mounting of the electronic control module 24 allows the cooling air to first contact the planar surface of the module 24 providing substantial cooling of the module 24. Mounting of the electronic control module 24 directly behind the first set of cooling air access intake vents 32 also acts to insulate the internal noise of the power generator unit 10, thereby providing quieter operation. The power generator operational noise is kept to a minimum even though air is allowed to freely enter the cooling intake vents 32 to efficiently cool internal components of the power generator unit 10.

Figure 5:
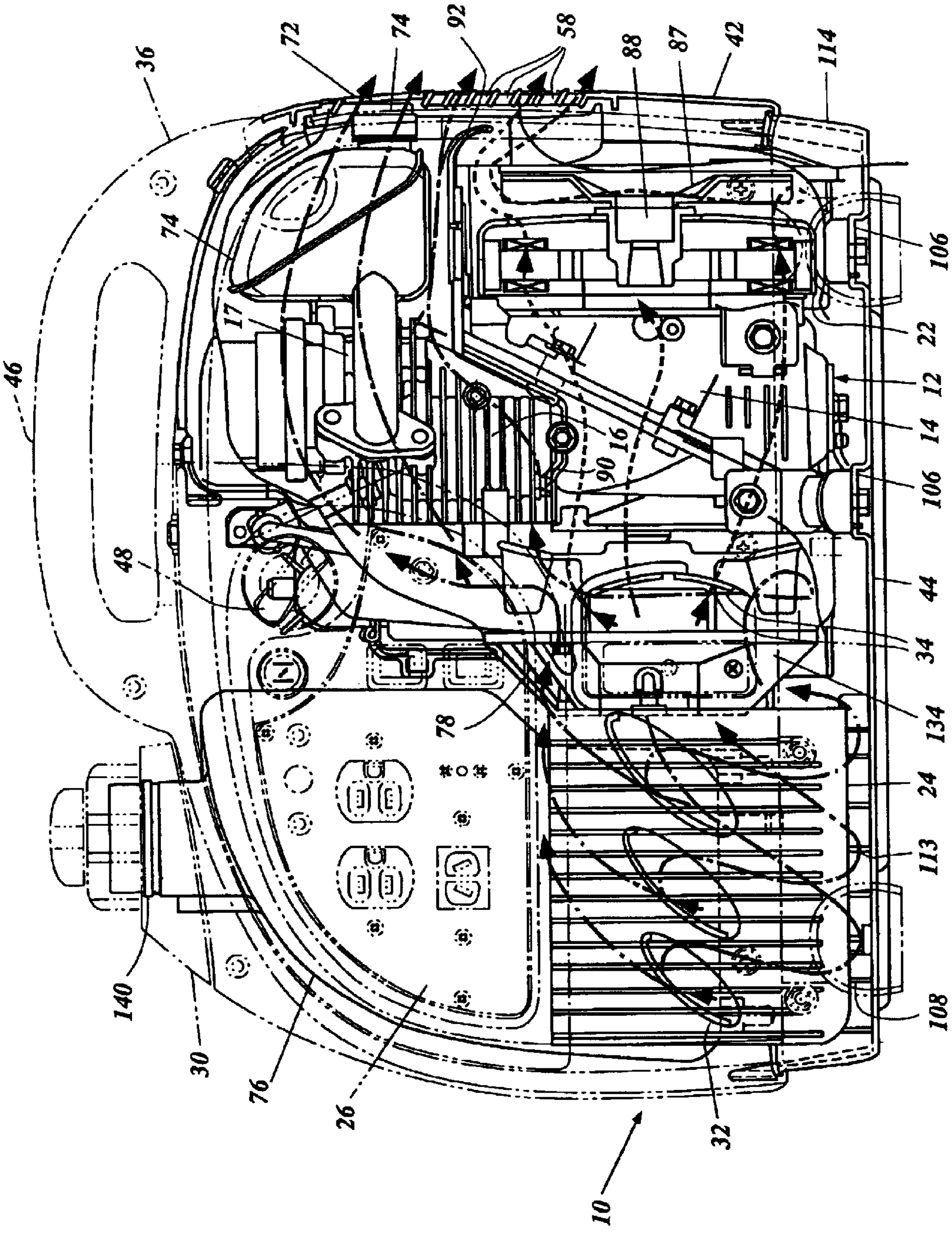
FIG. 5 is a front view of the engine generator of FIG. 1 with external components of the power generator unit, including a control panel, being shown in phantom. The figure illustrates two, generally distinct internal cooling air paths through the cover. A first cooling air path is shown long-short dashed lines, and a second cooling air path is shown in short dashed lines.

FIG. 5 illustrates various cooling air paths of the power generator unit 10. There can be two generally distinct cooling air paths through the sound insulation cover 36. Each cooling air path preferably is designed to cool components of a similar temperature. For example, the first cooling path is designed to cool warmer operating components of the power generator, for example, the electronic control module 24, the engine cylinder 16, the cylinder head 17, and the muffler 74. The second cooling air path is designed to cool those components that normally operate at a lesser temperature, for example the crankcase 14 and the generator 22. The use of two, generally separate cooling air paths allows for improved cooling efficiency. The cooler operating components preferably are mounted near the fuel system whereas the warmer operating components are positioned together away from the cooler fuel tank and fuel system. The cooling paths preferably are kept generally separate even as each one exits the power generator to inhibit interference that can affect cooling efficiency.

Figure 6:
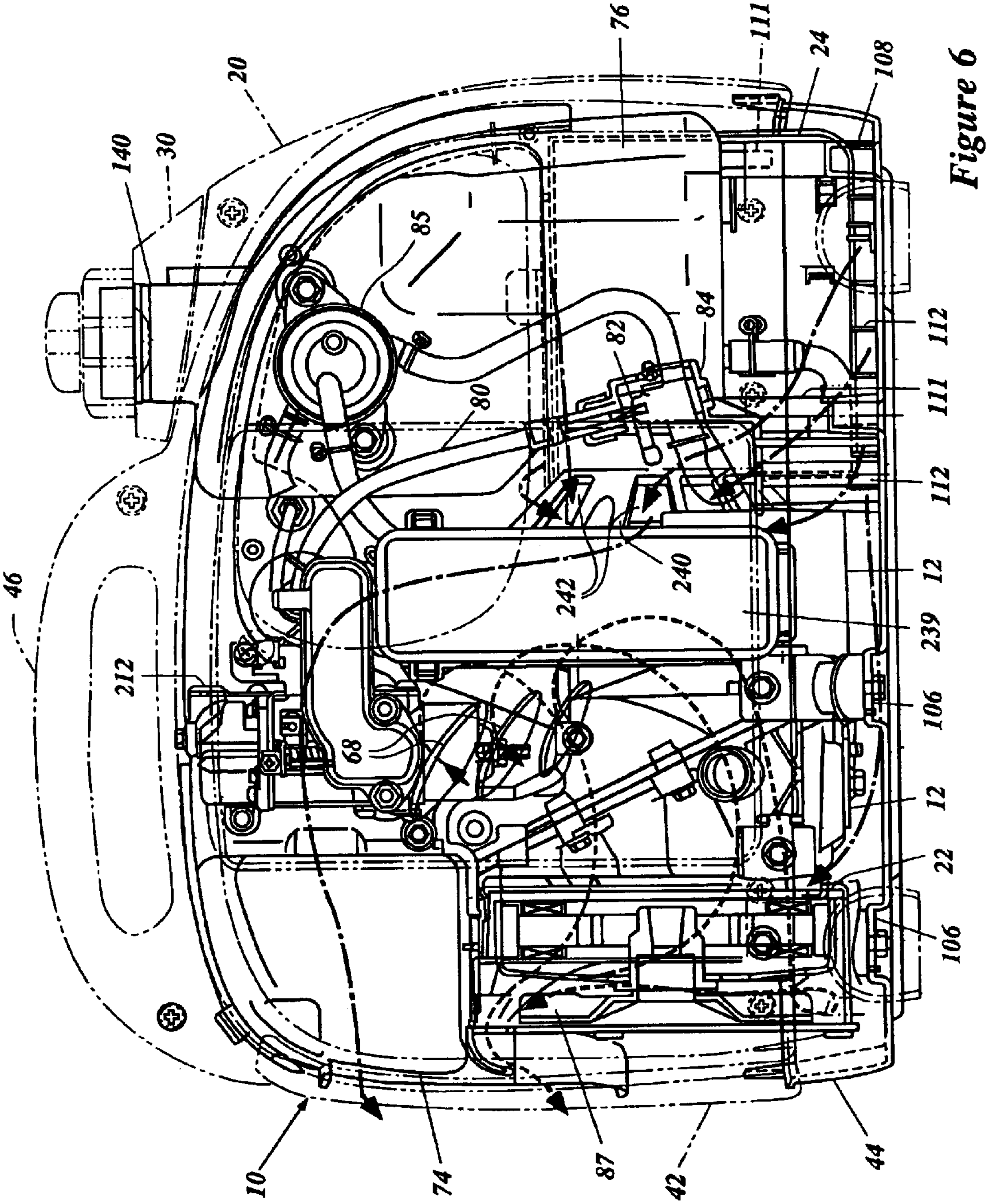
FIG. 6 is a rear view of the engine generator of FIG. 5 with external components of the power generator unit being shown in phantom. The figure illustrates the first and second cooling air paths; again, the first cooling air path is shown long-short dashed lines and the second cooling air path is shown in short dashed lines.
Figure 7:
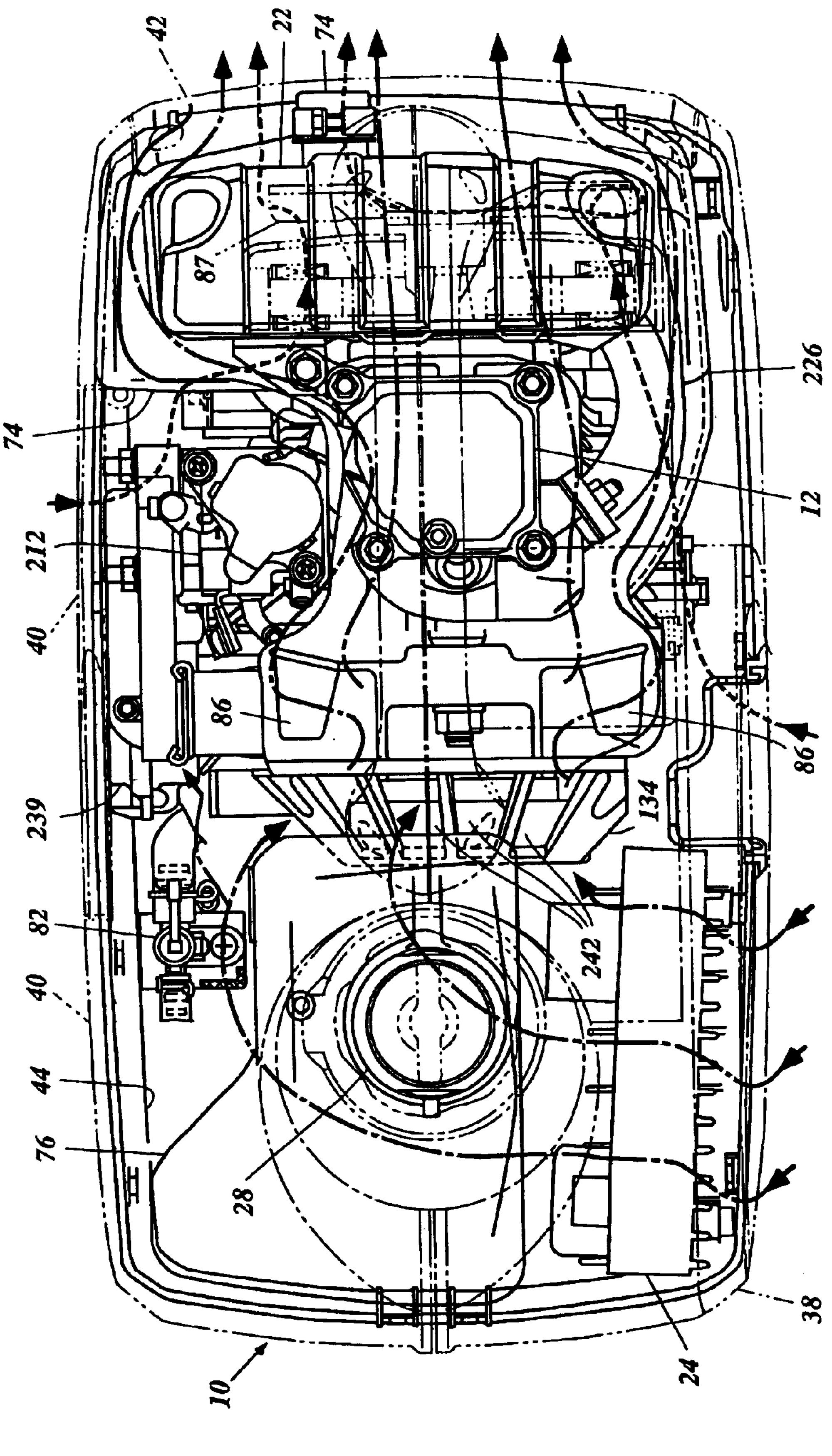
FIG. 7 is a top view of the engine generator of FIG. 5 with external components of the power generator unit being shown in phantom. This figure also illustrates the first and second cooling air paths from a top view; again, the first cooling air path is shown long-short dashed lines and the second cooling air path is shown in short dashed lines.
Figure 8:
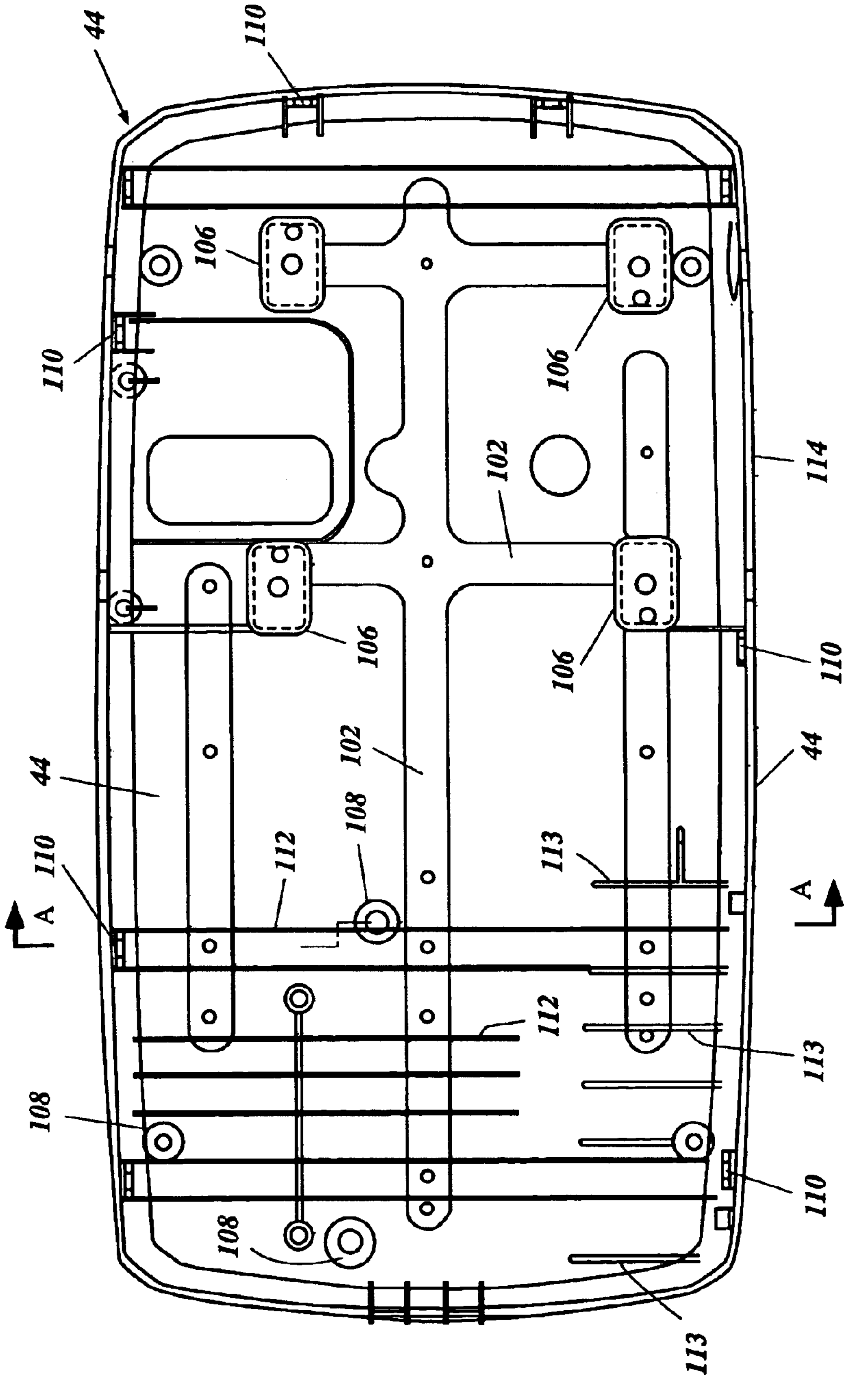
FIG. 8 is a top view of a bottom cover piece of the power generator unit of FIG. 1.
Figure 9:
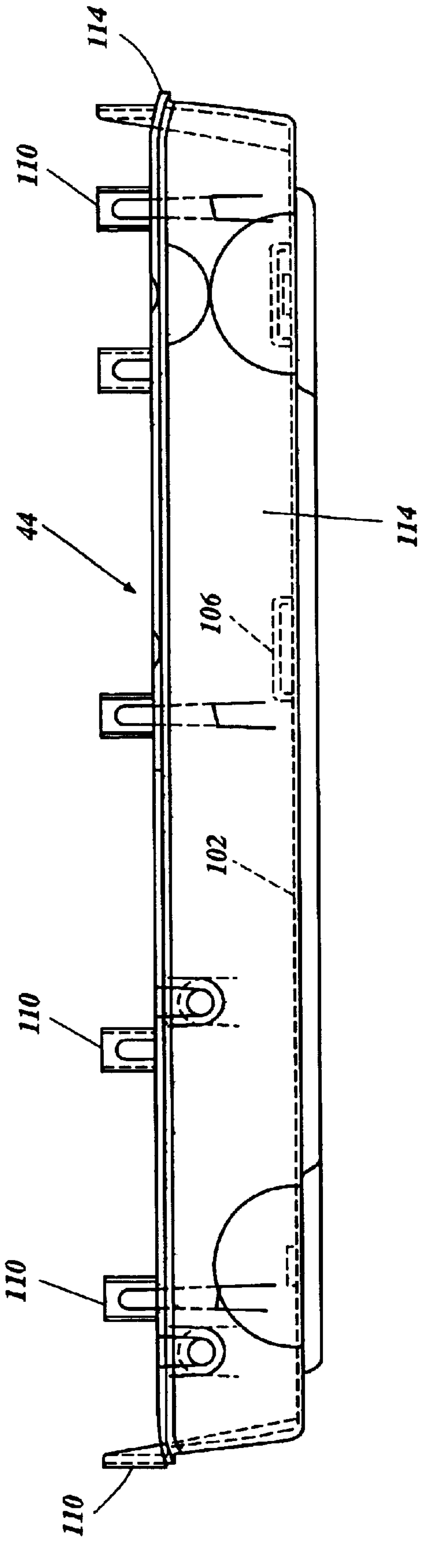
FIG. 9 is a front view of the bottom cover piece of FIG. 8.
Figure 10:
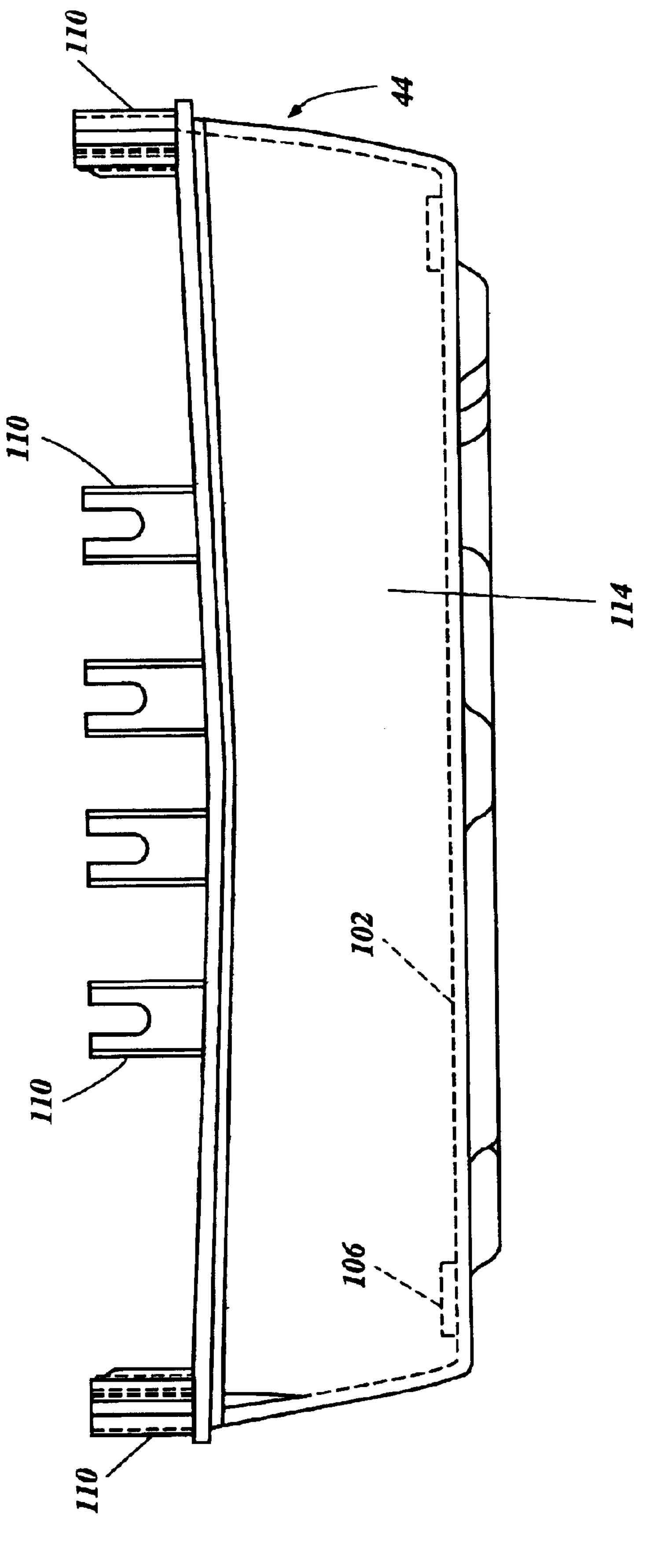
FIG. 10 is a right side view of the bottom cover piece of FIG. 8.
Figure 11:
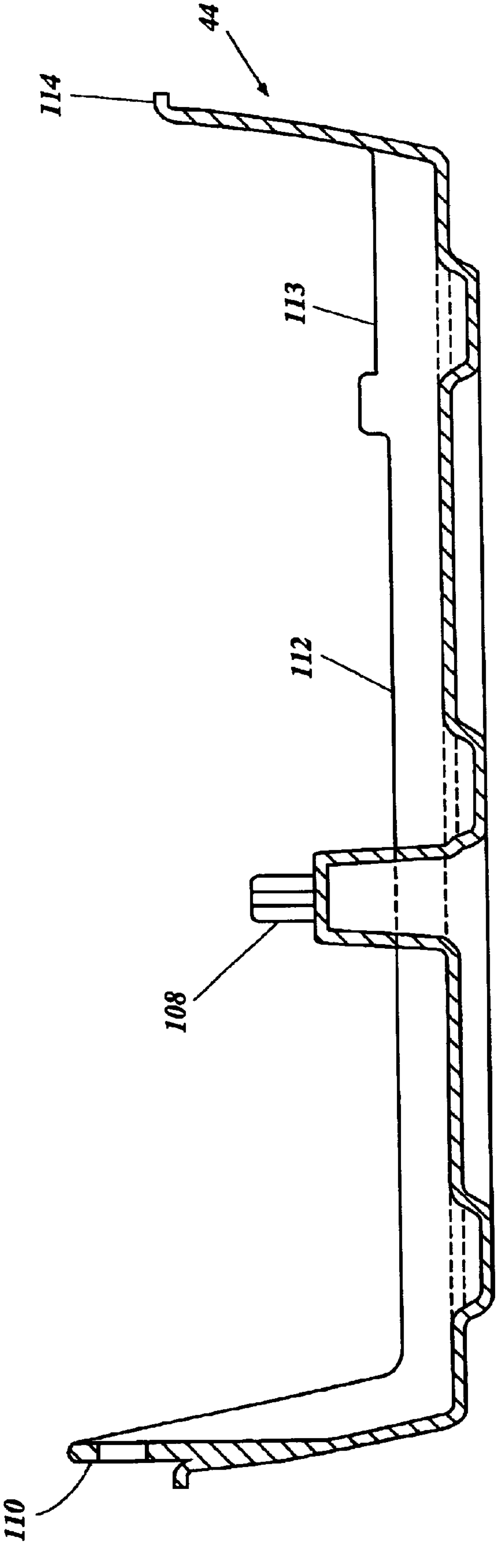
FIG. 11 illustrates a cross sectional view of the bottom cover piece taken along the section line A—A of FIG. 8.

One cooling path, which is illustrated by long and short dashed lines in FIGS. 5 through 7, begins at the first set of cooling air intake vents 32; an engine-cooling fan 86 draws air into the generator cover 36 through the first set of cooling air intake vents 32. The air enters the air intake vents 32 and initially cools the electronic control module 24. The broad surface of the electronic control module 24 provides the cooling air with a large heat transfer surface over which the air passes. The air then flows through the engine cooling fan 86, cools the engine cylinder 16 and the cylinder head 17. The air continues and cools the muffler 74, and finally exits through the side piece 42 through an upper portion of the effluent air vents 70, which generally lies directly behind the engine cooling fan 86. This first cooling air path thus is mainly defined by the arrangement and orientation of the first set of cooling air vents, the electronic control module 24, the engine cooling fan 86 and the effluent air vents 70. Air traveling along the defined path advantageously flows through or over the warmer engine components allowing the cooler engine components, and other cooler components within the sound insulation cover 36, to remain at a cooler temperature. These other cooler components can include the fuel tank 76, the control panel 26 and various fuel lines.

Air flow along a second cooling air path, which is illustrated by short dashed lines in FIGS. 5 through 7, begins at the second set of cooling air intake vents 34 and at the side piece air vents 68 (as shown in FIG. 6). That is, a generator cooling fan 87 including at least one blade draws air into the generator cover 36 through both the second set of cooling air intake vents 34 and the side piece air vents 68. The generator cooling fan 87 is connected to the generator 22 through a fan hub 88. The drawn-in air passes through the generator cooling fan 87 and is guided by the arrangement of internal components within the cover 36 to cool the engine crankcase 14, the generator 22, and then to exit through a lower portion of the side cover effluent air vent 70. These two generally distinct cooling paths are advantageously separated through various internal air deflectors 90, thereby allowing efficient cooling of the warmer components of the power generator unit 10, as well as cooling of those components operating at a lower temperature within the power generator unit 10. An exiting air deflector 92 further separates the two cooling air paths and guides at least a portion of the exiting air in a downward direction.

FIG. 7 is a top sectioned view of the power generator unit 10 illustrating another perspective of the various cooling air paths. The mounting configuration of cooler to warmer power generator components can be seen. The fuel tank 76 and electronic control module 24 are positioned away from the warmer engine 12 and muffler 74. The second air-cooling path used to cool the crankcase 14 and generator 22 does not pass through the hotter engine cylinder 16 or exhaust muffler 74 keeping the generator 22 at a proper lower operating temperature.

FIGS. 8–11 illustrate various views of the bottom tray 44. The bottom tray 44 is preferably made of a plastic material; however, it can also be made of other materials or a combination of materials. In the illustrated embodiment, a plurality of reinforcement pieces 102 are molded into the bottom tray 44 to strengthen its structure. Engine mount bosses 106 are also molded on the bottom tray 44 to provide for effective securement of the engine 12. Numerous fastening screw recesses 108 are also molded into the bottom tray 44 to allow various components to be mounted the bottom tray 44 as well to allow the front piece 38, the rear piece 40, and the side piece 42 to be attached to the bottom tray 44. Various positioning tabs 110 aid in positioning various components to the bottom tray 44, such as, but not limited to, the front piece 38, the rear piece 40, the side piece 42.

The fuel tank 76 is attached to the mounting bosses 108 toward a left side of the bottom tray 44. In the illustrated embodiment, the fuel tank 76 includes mounting studs 111 that are used to secure the fuel tank 76 to the mounting bosses 108.

The bottom tray 44 also comprises a sidewall 114 that gives the bottom tray 44 a shallow depth. One set of elevated component mounts 112 are integrally formed within the bottom tray 44 to support the fuel tank 76. Another set of elevated component mounts 113 are molded into the bottom tray 44 to support the electronic control module 24. The molded bottom tray 44 thus provides a reinforced base on which to mount the engine 12 as well as various components of the generator unit 10, such as, for example, the fuel tank 76 and the electronic control module 24.

The engine 12, the generator 22, the fuel tank 76, and numerous other components are independently mounted directly onto the bottom tray 44. Therefore, additional mounting systems are unnecessary. For example, brackets normally used to secure fuel tanks and engines in other power generator applications are unnecessary. Due to the lack of additional mounting systems, production cost and maintenance of the power generator unit 10 are greatly reduced. The various pieces, 38, 40, and 42 can be removed without altering the position or function of the internal components making the internal components easy to service and properly maintain.

FIGS. 12–17 illustrate various components of the front piece 38. The front piece 38 is principally formed by two surfaces: a side portion 120 and a console portion 122. The side portion 120 extends rearward from the left side and the top of the console portion 122. These sections of the front portion 120 cooperate with corresponding sections of the rear piece 40 to complete the left side and the top of the cover 36. The side portion 120 also has sections that extend from the right side of the console portion 122. These sections, however, do not complete the rear side of the cover 36. Rather, these sections cooperate with the side piece 42 to complete the right side of the cover 36.

Figure 12:
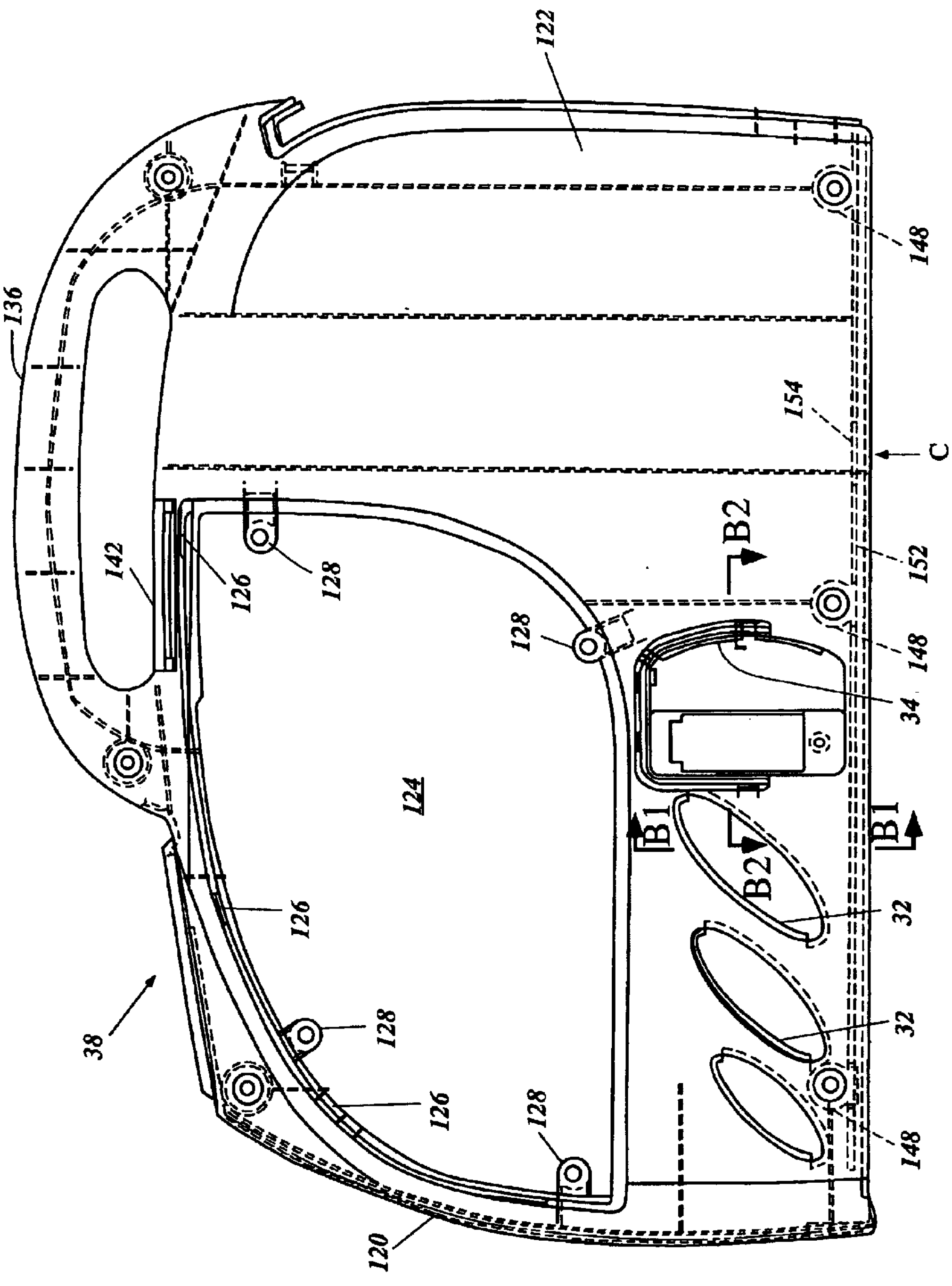
FIG. 12 is a front view of a front cover piece of the power generator unit of FIG. 1 with the control panel removed.
Figure 13:
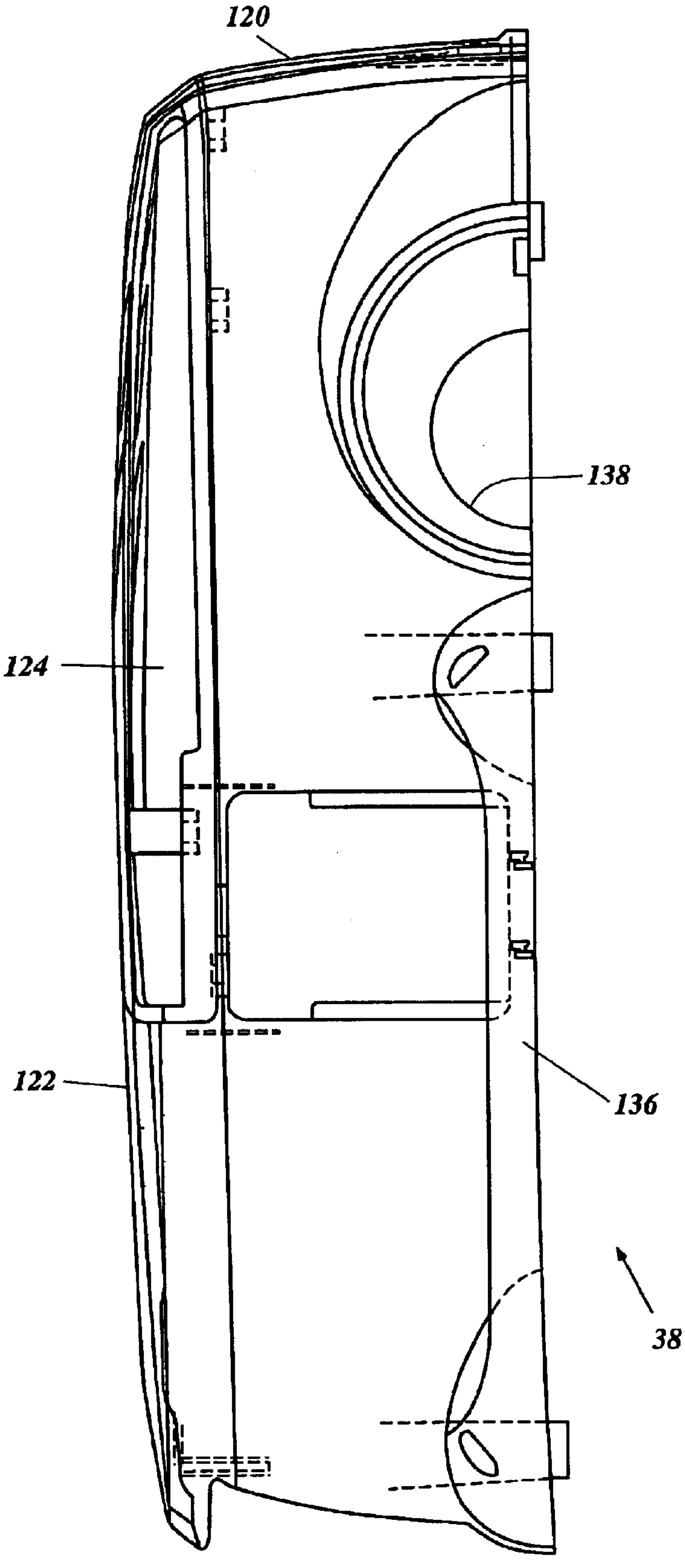
FIG. 13 is a top view of the front cover piece of FIG. 12.
Figure 14:
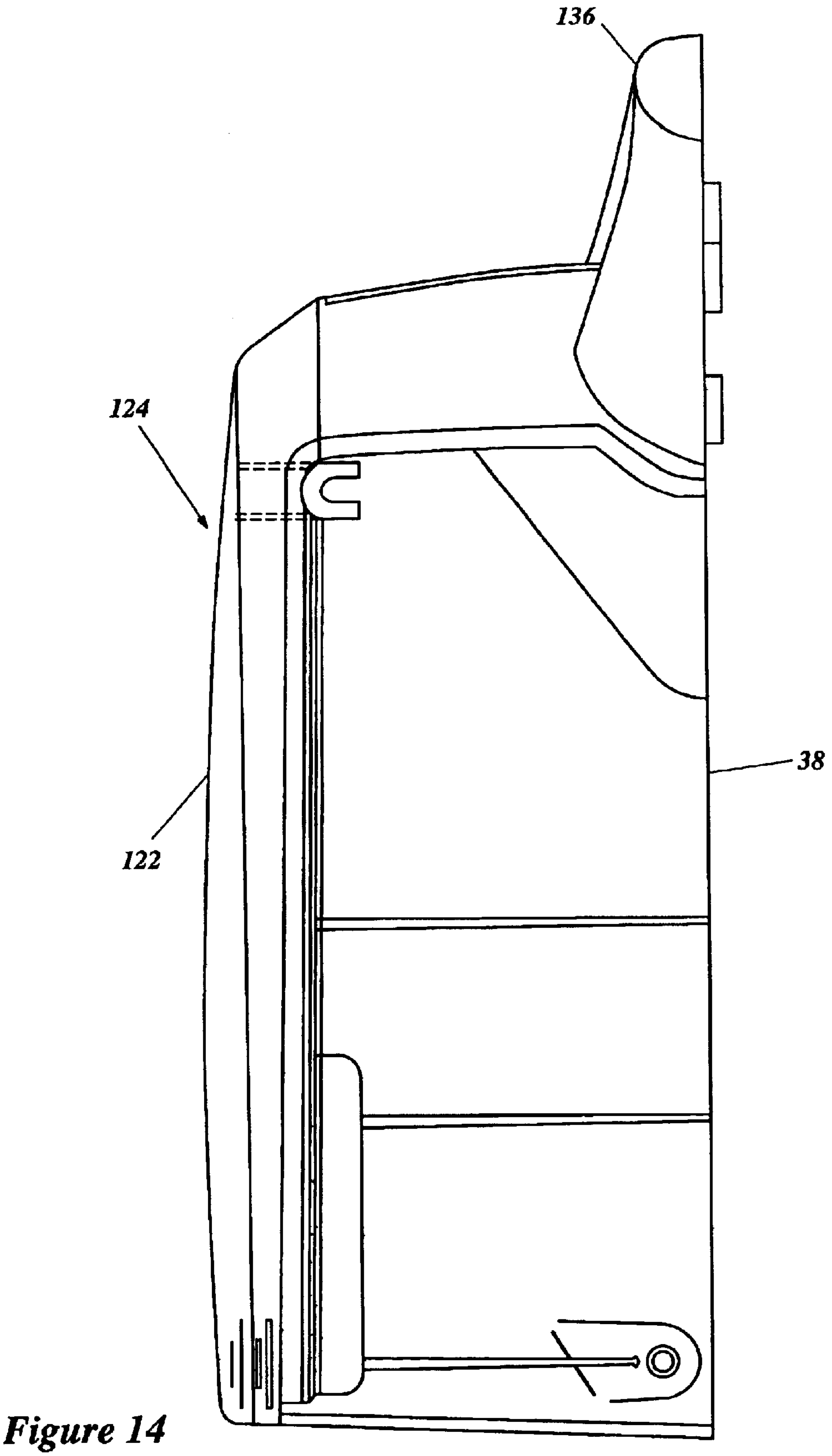
FIG. 14 is a right side view of the front cover piece of FIG. 12.

The front piece 38 has a recess opening 124 positioned on the upper left side to accept the control panel housing 78. The first set of air intake vents 32 are disposed below the recess opening 124 to introduce air directly onto the electronic control module 24 and into the cover 36, as described above. The second set of cooling air intake vents 34 is positioned next to the first set of cooling air intake vents 32 toward the center of the power generator (FIGS. 1, 5, and 12). The upper side of the recess opening 124 has a plurality of positioning slits 126 to correctly position the control panel housing 78. Various screw holes 128 formed in mounting are positioned around a the recess opening to securely fasten the control panel housing 78.

The second set of cooling air intake vents 34 is integrally formed in the front piece 38 directly of a recoil starter 134. The starter cable 62, which is attached to rotate the recoil starter 134 (see FIG. 7), enters the cover through the front piece 38 at a location adjacent to the second set of cooling air intake vents 34.

An upper portion of the front piece 38 preferably forms half of a handle 136, as shown in FIG. 12. The top surface of the front piece 38 incorporates a semicircular opening 138 (FIG. 13) to surround a fuel tank filler neck 140 of the fuel tank 76. An access opening 142 is positioned on the top surface of the front piece 38 and has an attached lid 144, which is shown in detail in FIGS. 18 and 19 as removed from the front piece 38. The access lid 144 can be attached to or removed from the front piece 38. In some applications, the lid can be hinged.

Figure 16:
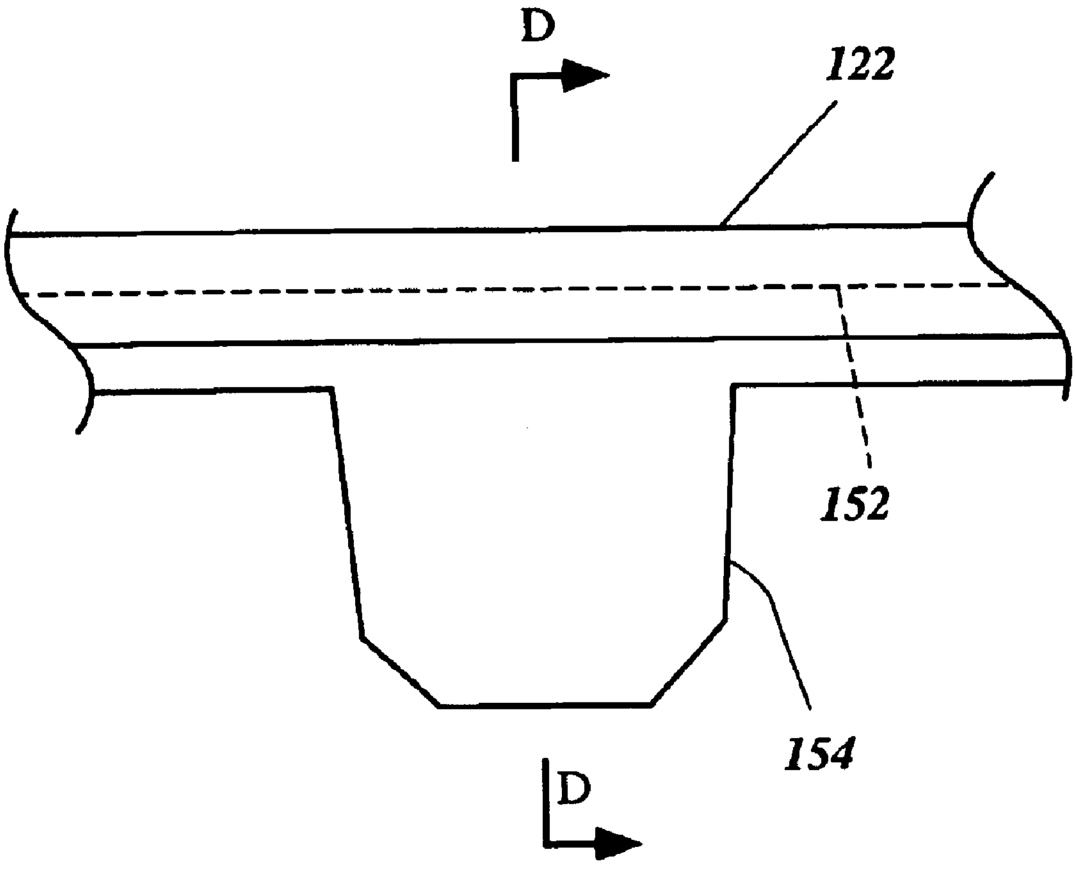
FIG. 16 is an enlarged section of the front cover piece as viewed in the direction of arrow "C" of FIG. 12.
Figure 17:
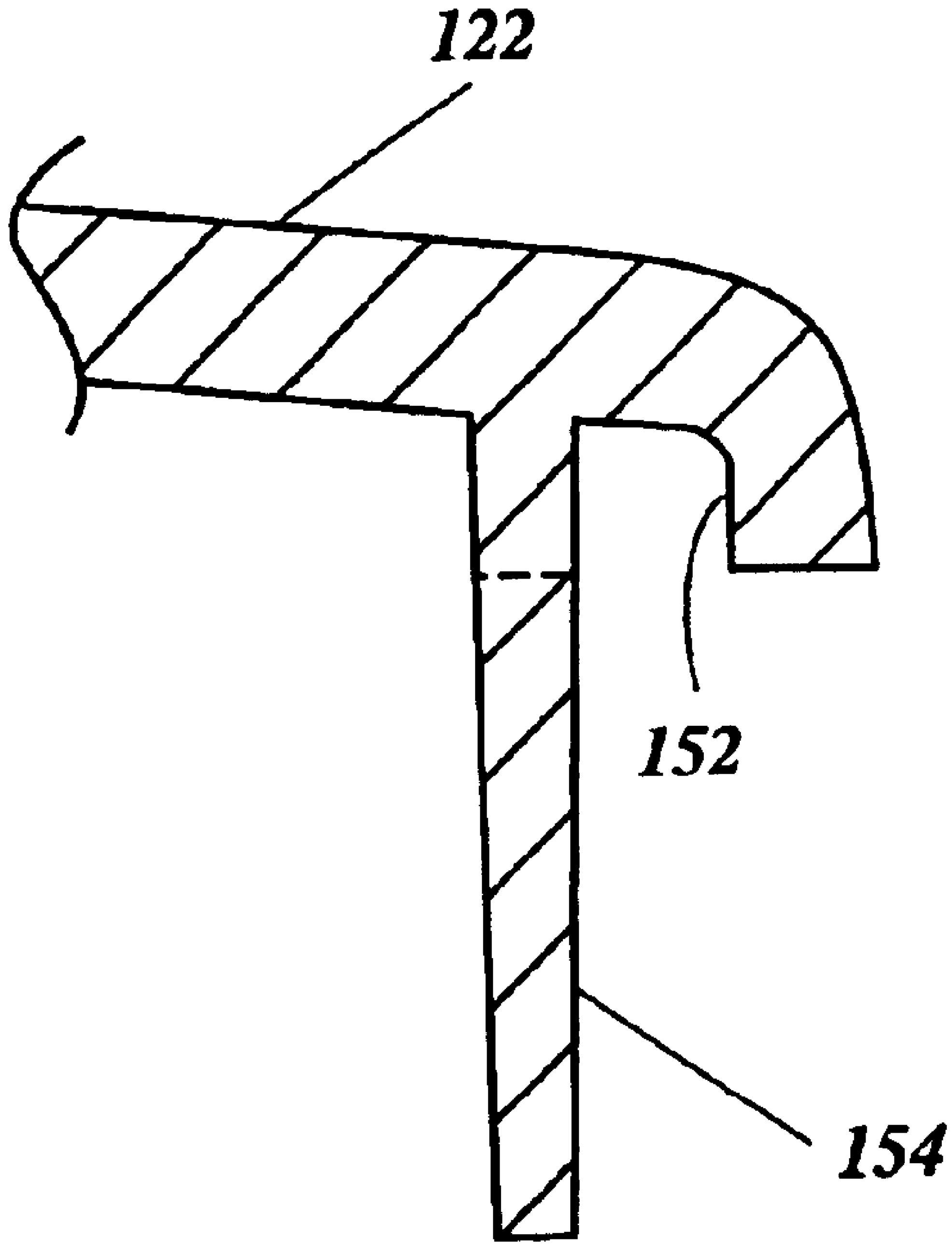
FIG. 17 is a cross sectional view of the front cover piece section taken along the section line D—D of FIG. 16.

The bottom edge portion of the front piece 38 incorporates a plurality of screw securing bosses 148. These boss portions allow the front piece 38 to be secured with screws 150 to the positioning tabs 110 of the bottom tray 44. The bottom edge portion of the front piece 38 preferably has a positioning groove 152 with an opening to locate the sidewall 114 of the bottom tray 44. As best seen in FIGS. 12, 16 and 17, positioning tabs 154 project inward on the upper side of the positioning groove 152 and contact the upper edge of the bottom tray sidewall 114 of the bottom tray 44 when the front piece 38 is positioned in the tray 44.

Figure 15A:
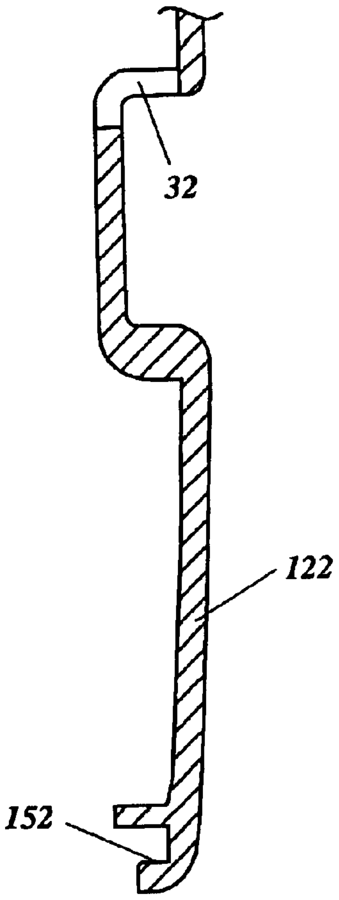
FIG. 15(*a*) is a cross sectional view of the front cover piece taken along the section line B1—B1 of FIG. 12.
Figure 15B:
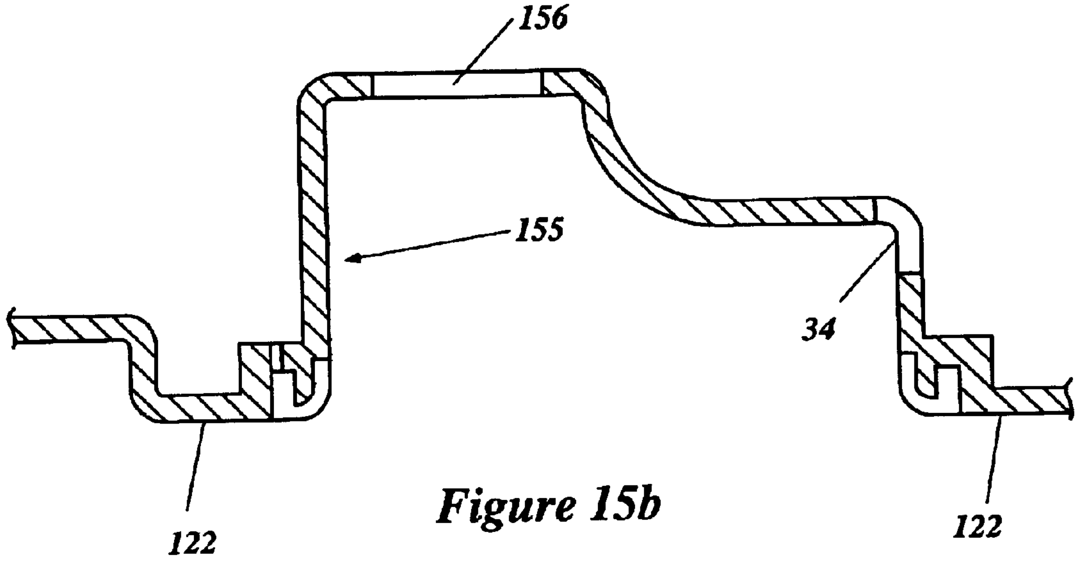

FIGS. 15*a*–17 illustrate enlarged views of specific areas of the front piece 38. FIG. 15*a* shows a cross sectional view of the front piece 38 taken along the sectional line B1—B1 of FIG. 12. One of the first set of cooling air intake vents 32 can be seen along with the positioning groove 152. FIG. 15*b* illustrates a cross sectional view of the front piece 38 taken along the sectional line B2—B2 of FIG. 12. One of the second set of air cooling intake vents 34 can be seen positioned in the front side surface 122 of the front piece 38. A recess for a starter cable handle is shown in this Figure, as well as the opening 156 through which the starter cable 62 passes.

FIG. 16 illustrates a section of the front piece 38 as seen in the direction of arrow “C” of FIG. 12. The positioning tab 154 protrudes away from the console side surface of the front piece 38. FIG. 17 shows a cross sectional view of the positioning tab 154 to illustrate better the position of the positioning tab 154 with reference to the positioning groove 152 of the front piece 38.

Figure 18:
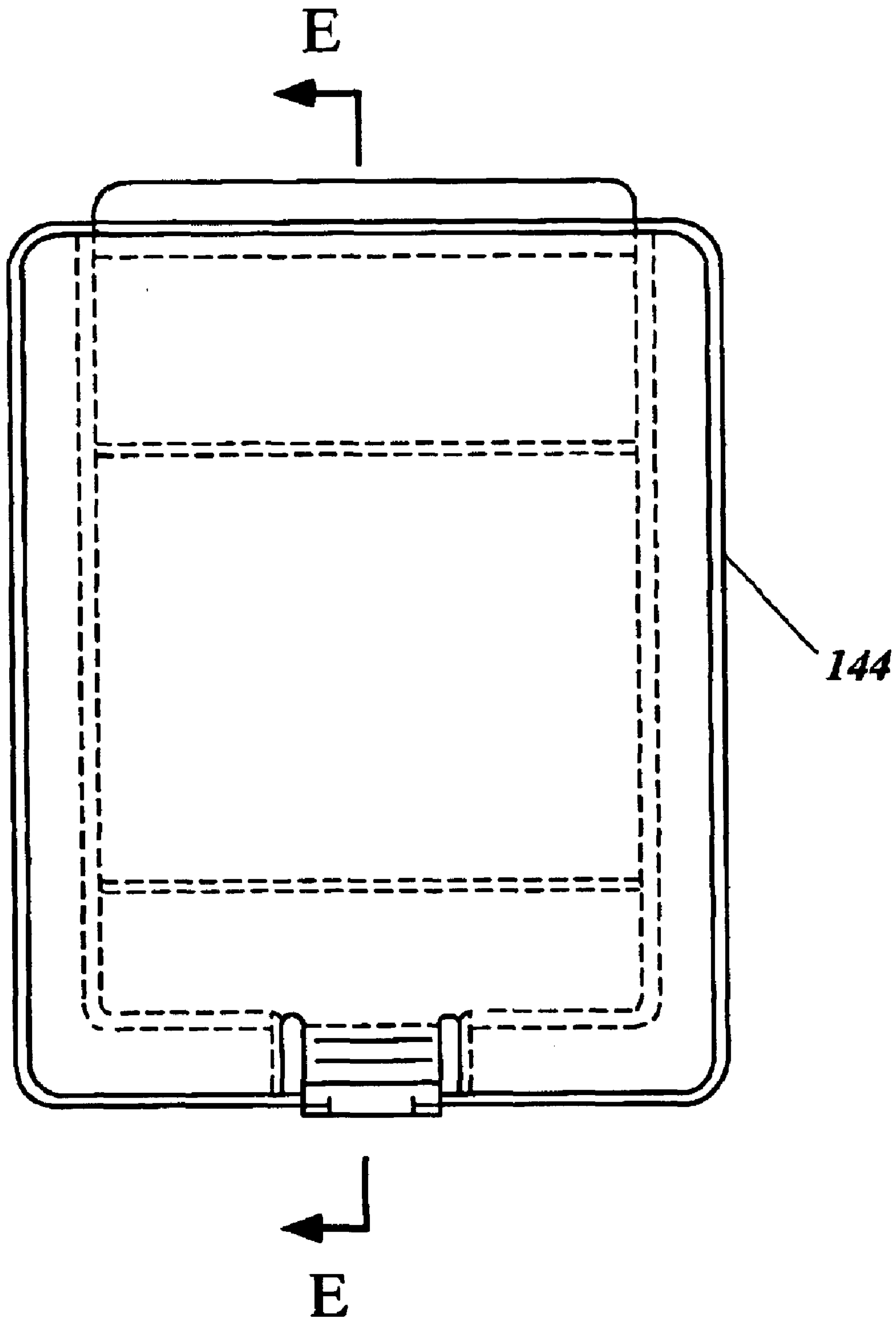
FIG. 18 is an enlarged top view of an lid for the front cover piece of FIG. 12.
Figure 19:
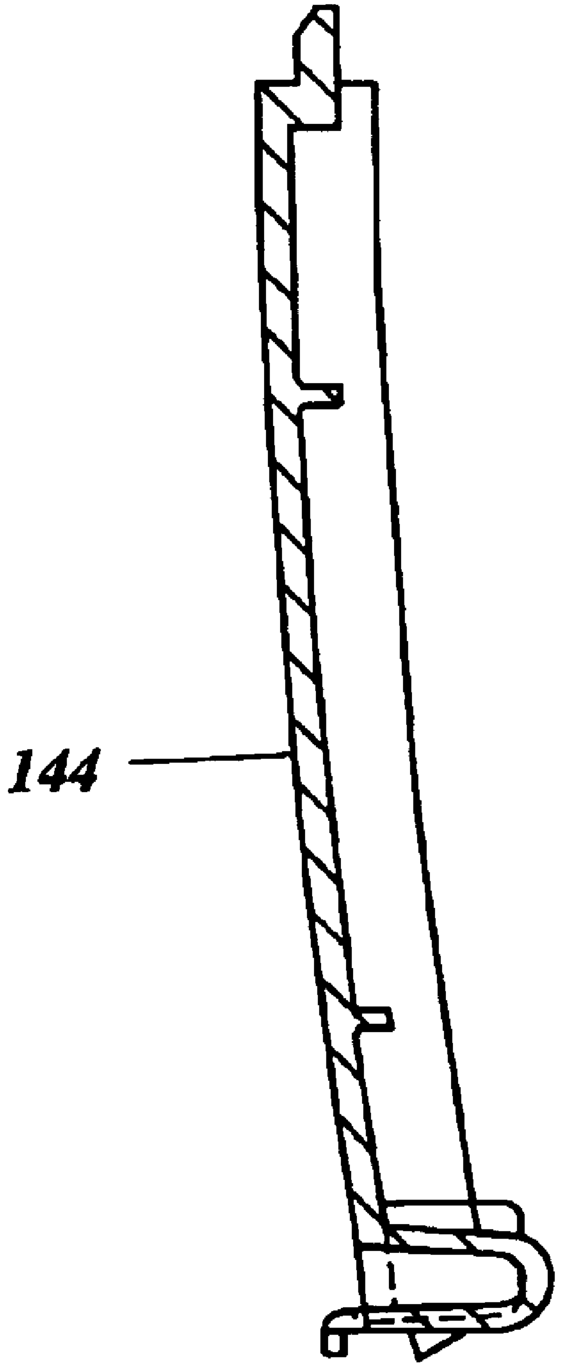
FIG. 19 is a cross sectional view of the front cover piece access lid taken along the section line E—E of FIG. 18.

Front and side views of the access-opening lid 144 are shown in FIGS. 18 and 19. FIG. 19 illustrates a cross sectional view of the access-opening lid 144 taken along the sectional line E—E of FIG. 18.

Figure 20:
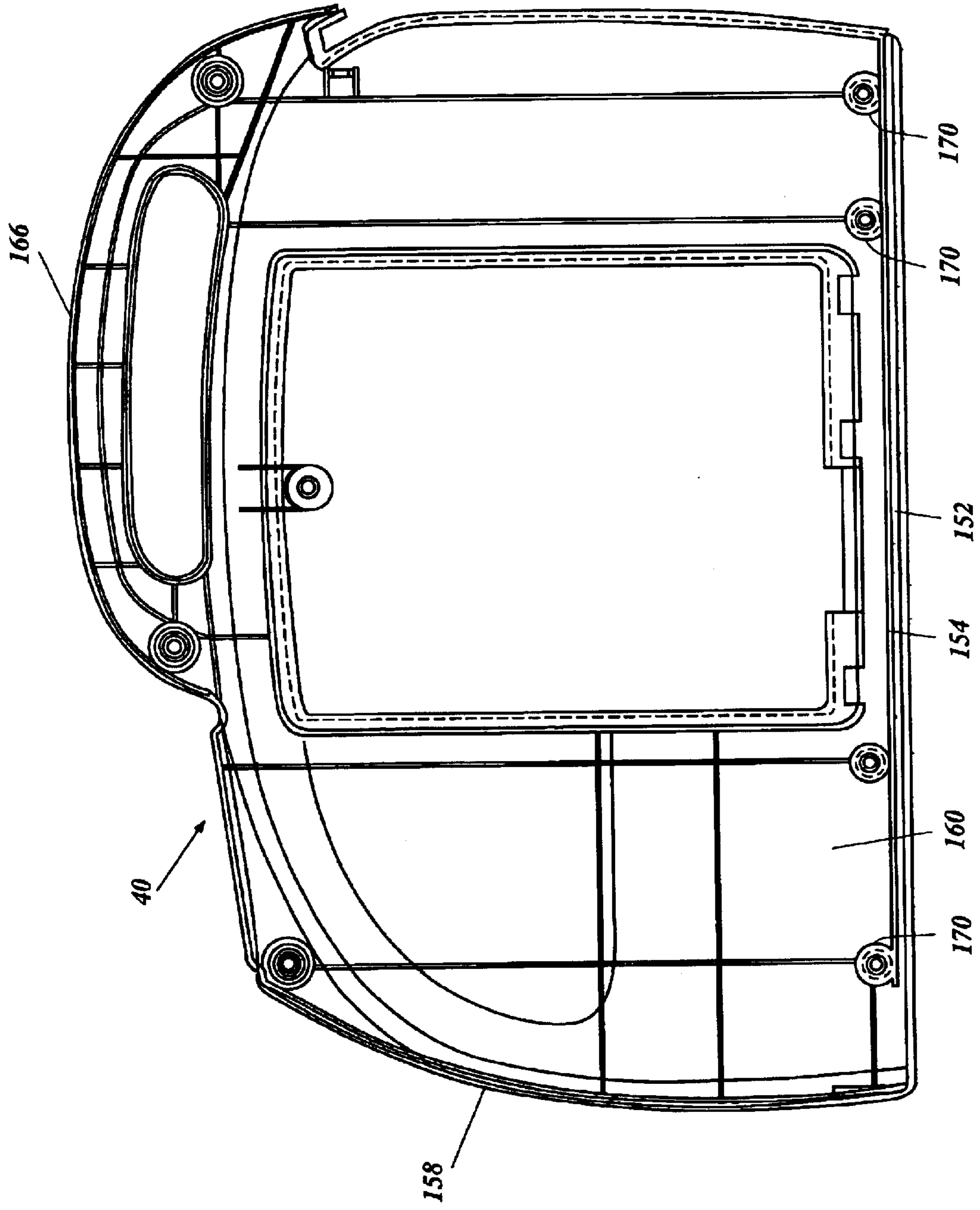
FIG. 20 is a plan view of the rear cover piece of the engine generator of FIG. 2, showing an inside of the rear cover piece.
Figure 21:
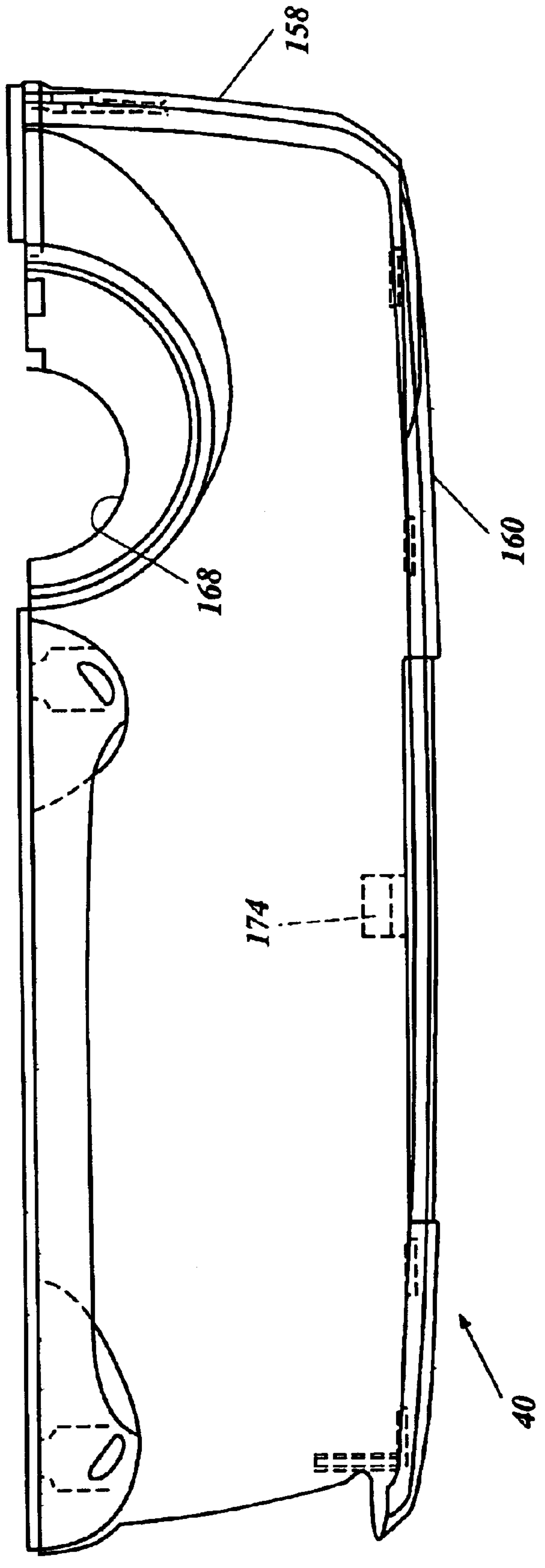
FIG. 21 is a top view of the rear cover piece of FIG. 20.
Figure 22:
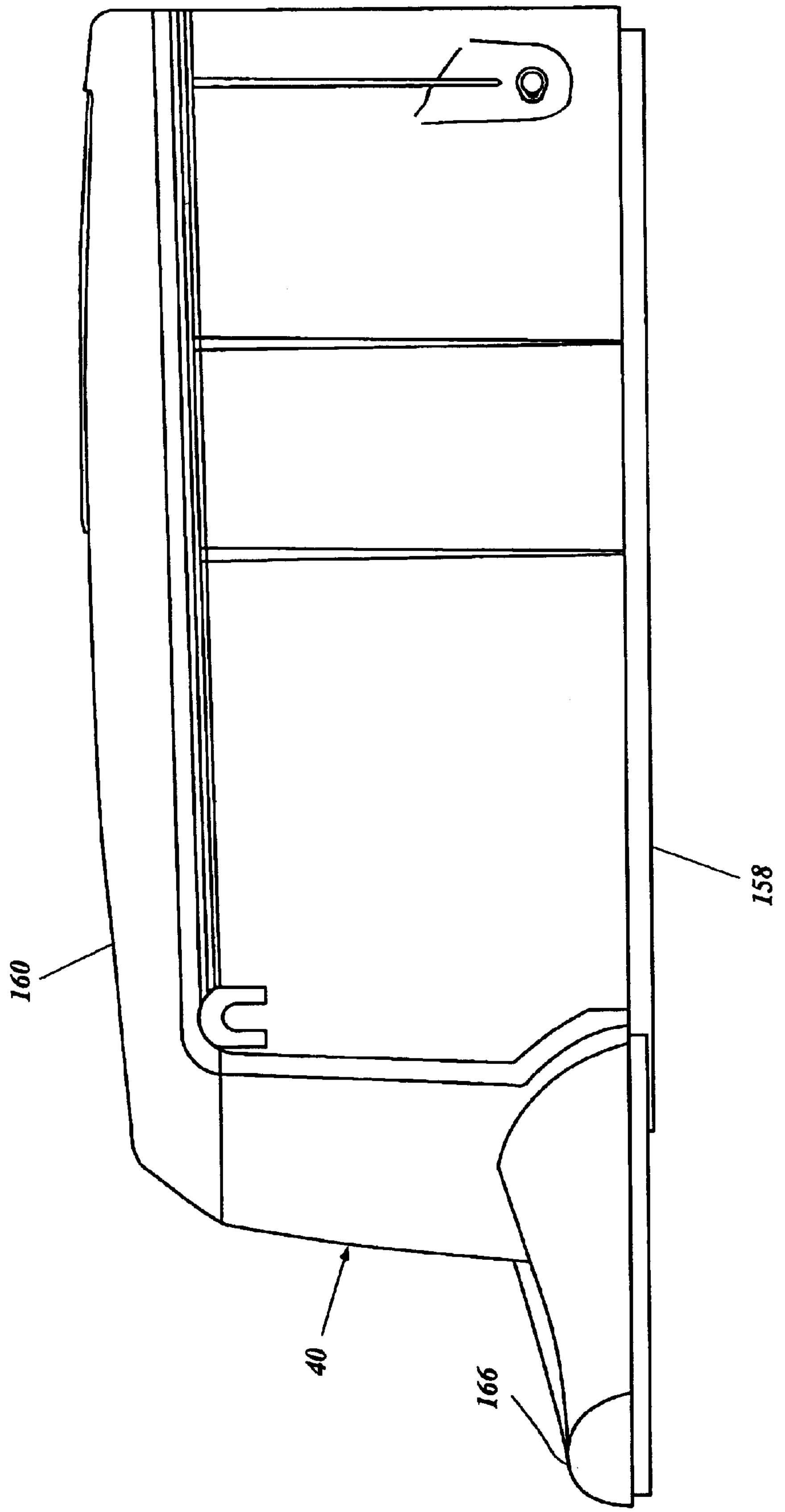
FIG. 22 is a right side view of the rear cover piece of FIG. 20.

The rear piece 40 as shown in FIGS. 20–22 preferably has a generally similar symmetric shape to that of the front piece 38. The rear piece 40 has a side surface 158 extending from the back surface 160 that continues to the left side of the power generator unit 10. The back surface 160 houses the centrally located removable access cover 64 (FIGS. 2, 14, and 23) including the second set of air intake vents 68 for introducing external air. An upper portion of the rear piece 40 incorporates another half of a handle 166 that matches the half handle 136 of the front piece 38. The two half handle segments 136 and 166 together form the complete handle 46 allowing easy carrying of the power generator unit 10. The top surface of the rear piece 40 includes another semicircular opening 168 (FIG. 21) to surround the fuel tank filler neck 140 of the fuel tank 76. When the front and rear piece halves 38, 40 are combined the two semicircular openings 138, 168 combine to form a complete circular opening to surround the fuel tank filler neck 140.

The lower edge of the rear piece 40, similar to the lower edge of the front piece 38, incorporates a number of screw bosses 170, a positioning groove 172, and positioning tabs 174. The positioning groove 172, as well as the positioning tabs 174 allow for the rear piece 40 to be correctly aligned with the bottom tray 44. Various types of fasteners including, but not limited to screws 150 can be used to secure the rear piece 44 as well as the front piece 38, and the side piece 42 to the bottom tray 44.

The positioning grooves 152 of the front piece 38 and the positioning grooves 172 of the rear piece 40 are designed to position both covers allowing a tight, uniform assembly contributing to strength ease of production.

Figure 23:
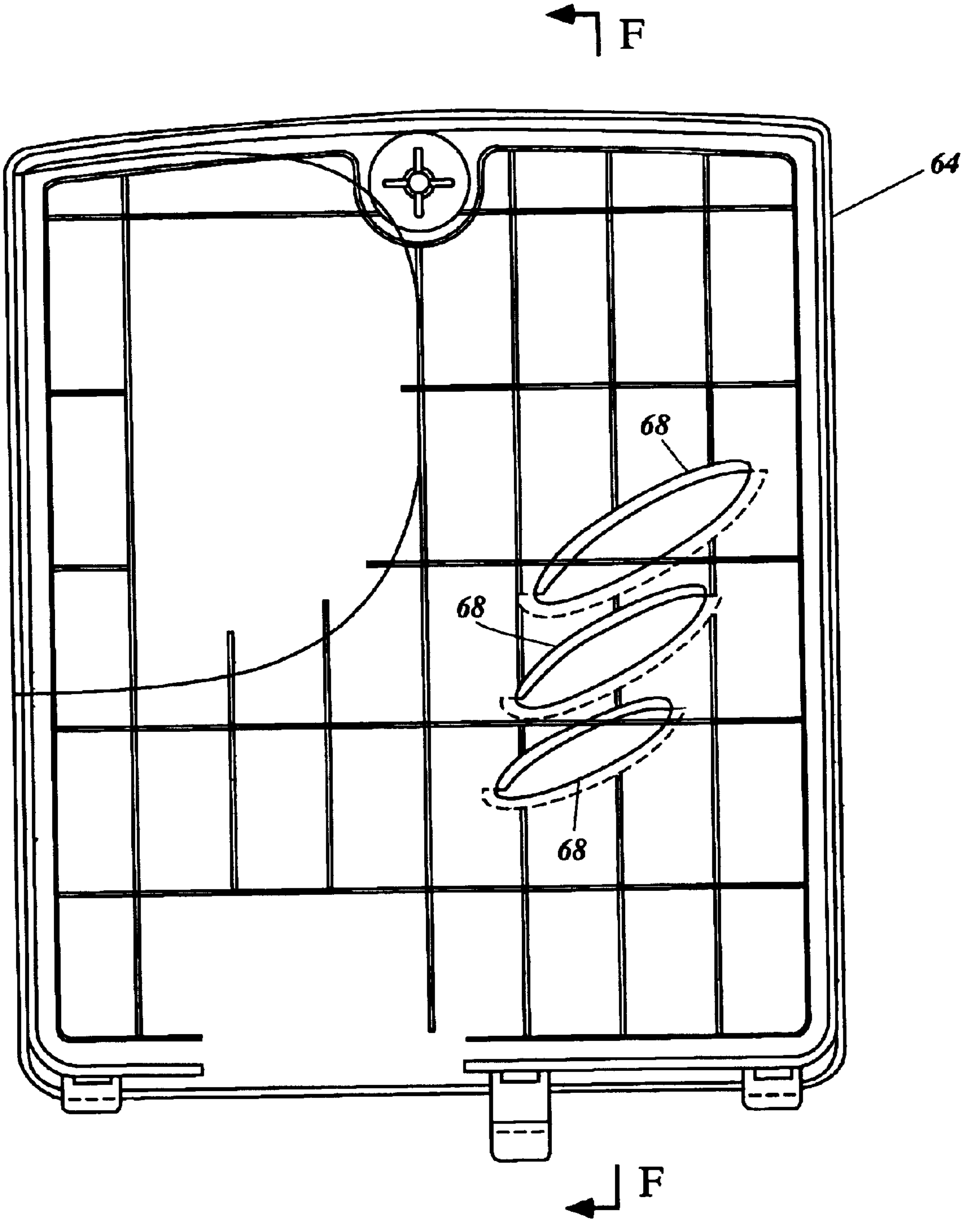
FIG. 23 is a plan view of an access lid for the rear cover piece of FIG. 20, showing an inner side of the access lid.
Figure 24:
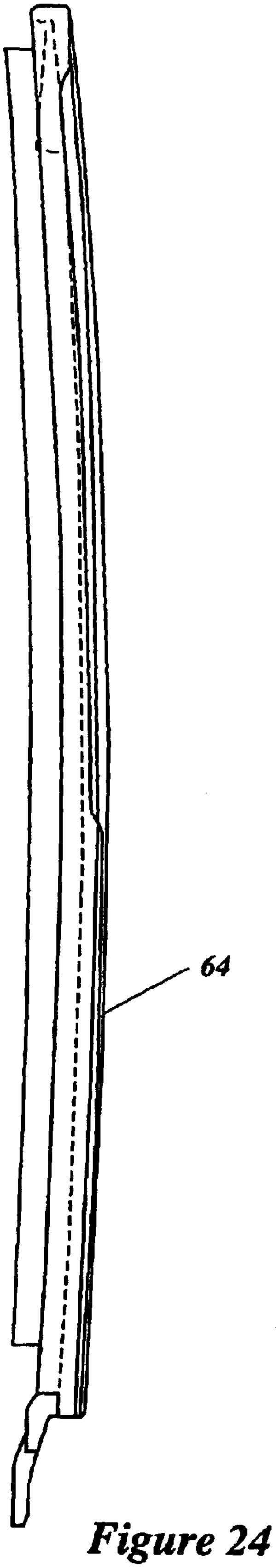
FIG. 24 is a right side view of the rear cover piece access lid of FIG. 23.
Figure 25:
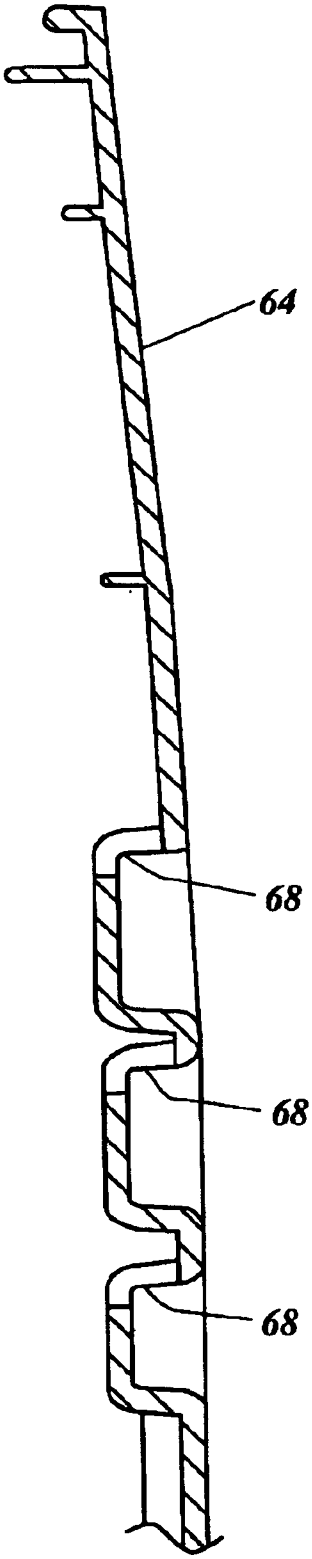
FIG. 25 is a cross sectional view of the rear cover piece access lid taken along the section line F—F of FIG. 23.
Figure 26:
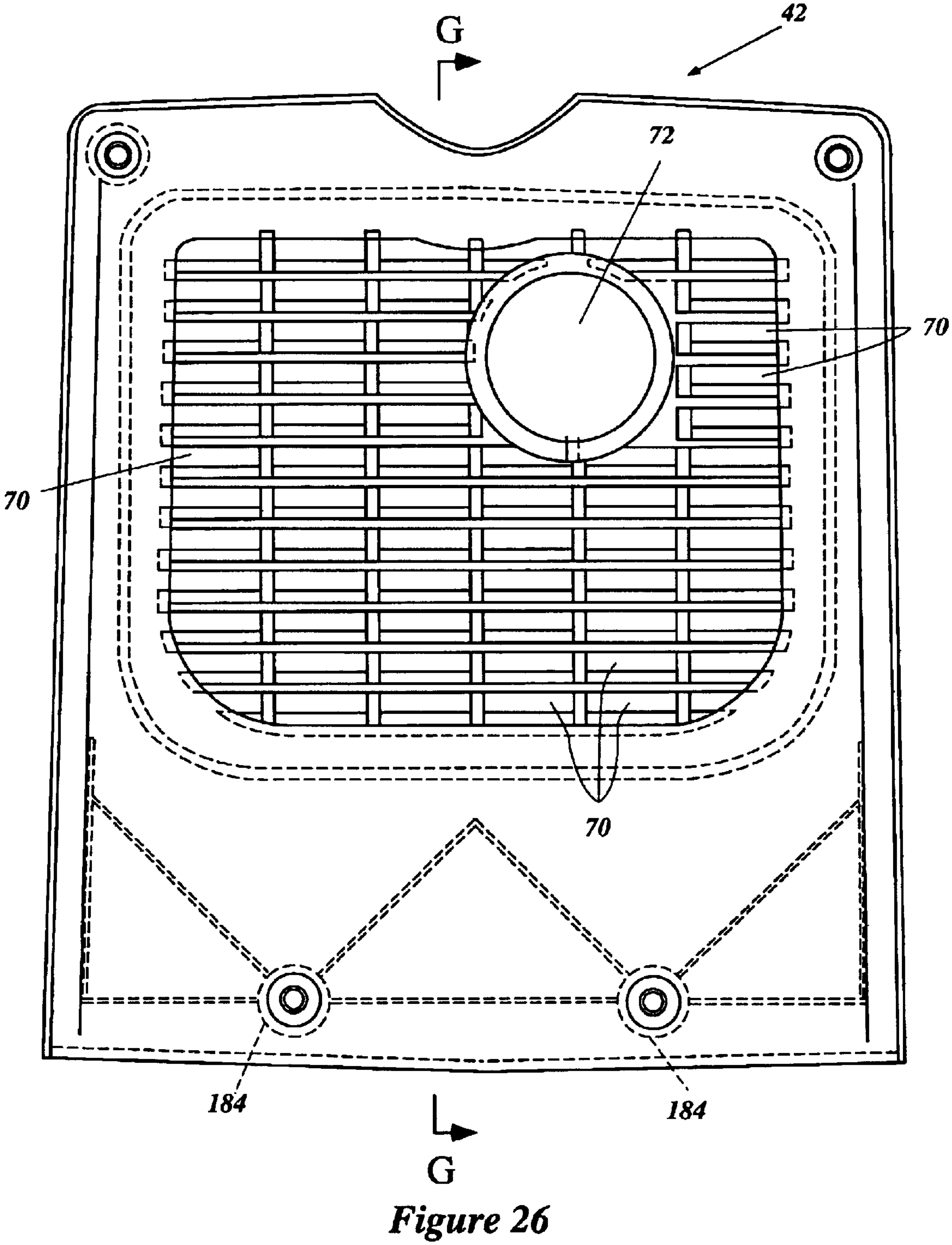
FIG. 26 is a plan view of a right side cover piece of the power generator unit of FIG. 3.
Figure 27:
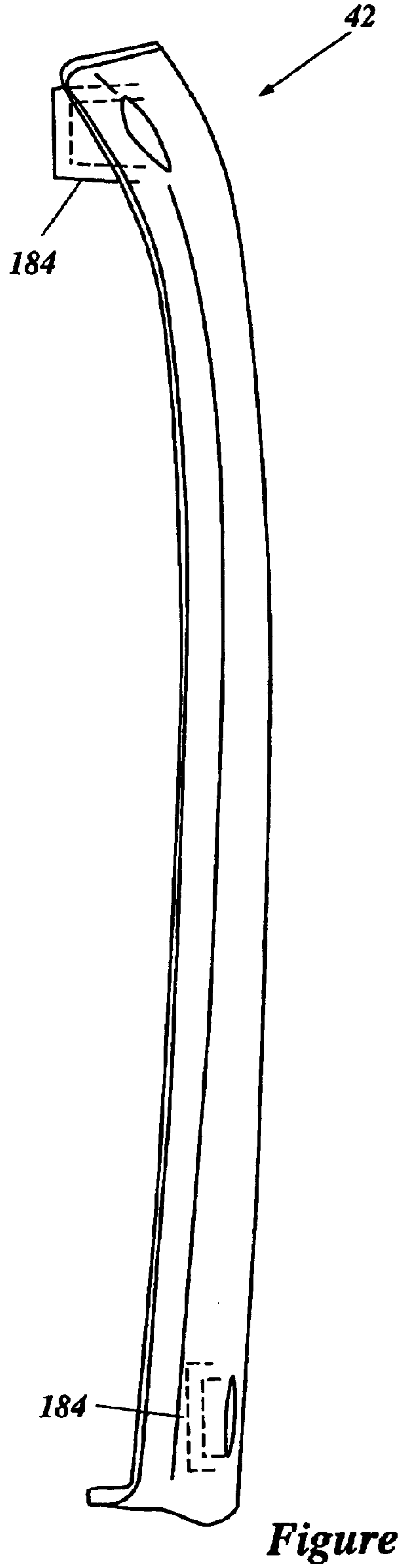
FIG. 27 is a side view of the right side cover piece of FIG. 26.
Figure 28:
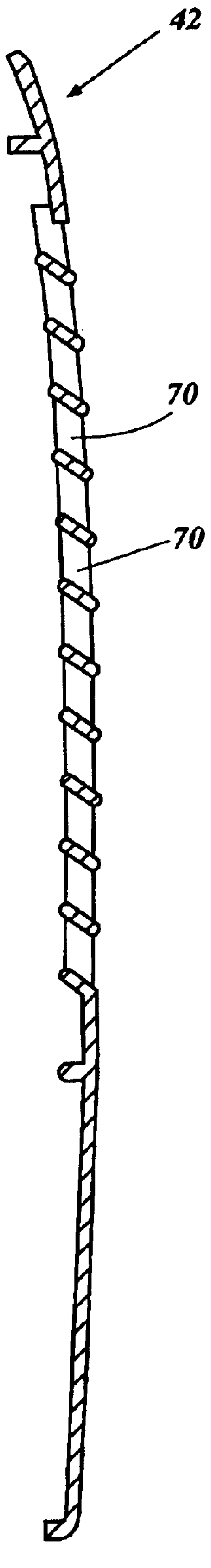
FIG. 28 is a cross sectional view of the right side cover piece taken along the section line G—G of FIG. 26.

FIGS. 23–25 illustrate in greater detail the access cover 64 and the air intake vents 68. Reinforcement ribs, which are used to increase rigidity of the cover 64, are molded directly into the access cover 64. A plurality of positioning tabs located along the bottom edge of the access cover 64 allow the access cover 64 to be correctly positioned within the rear cover 40. The access cover 64 preferably has a slightly curved shape that follows the contour of the rear cover 40 when the access cover 64 is closed. FIG. 25 is a cross sectional view taken along the lines F—F of FIG. 23 and shows the air intake vents 68 in greater detail. The upper inside corners of the air intakes include openings allowing air to inter the power generator 10 while inhibiting the entry of water, for example if the power generator 10 is used in an outside environment. The air intake vents 68 allow external air to enter while inhibiting the release of excess noise from the power generator 10.

The side piece 42, as shown in detail in FIGS. 3 and 26–28, is arranged to be placed on the right-hand side of the power generator unit 10 generally between the front piece 38 and the rear piece 40 and slightly overlapping with the other pieces 38, 40, as seen in FIG. 3. The side piece 42 includes the exhaust outlet opening 60 to accommodate an exhaust pipe outlet 182 from the muffler 74 of the engine 12. The discharge or effluent air vent 70 is incorporated into the side piece 42 allowing the discharge of the heated cooling air. The side piece 42 includes a plurality of screw hole bosses 184 to allow the side piece 42 to be fastened to the bottom tray 44, the front piece 38, and the rear piece 40 through screws 150.

FIGS. 29–37 illustrate various details of the control panel 26 and the control panel housing 78 positioned within the formed recess opening 124 and located in the front piece 38.

Figure 29:
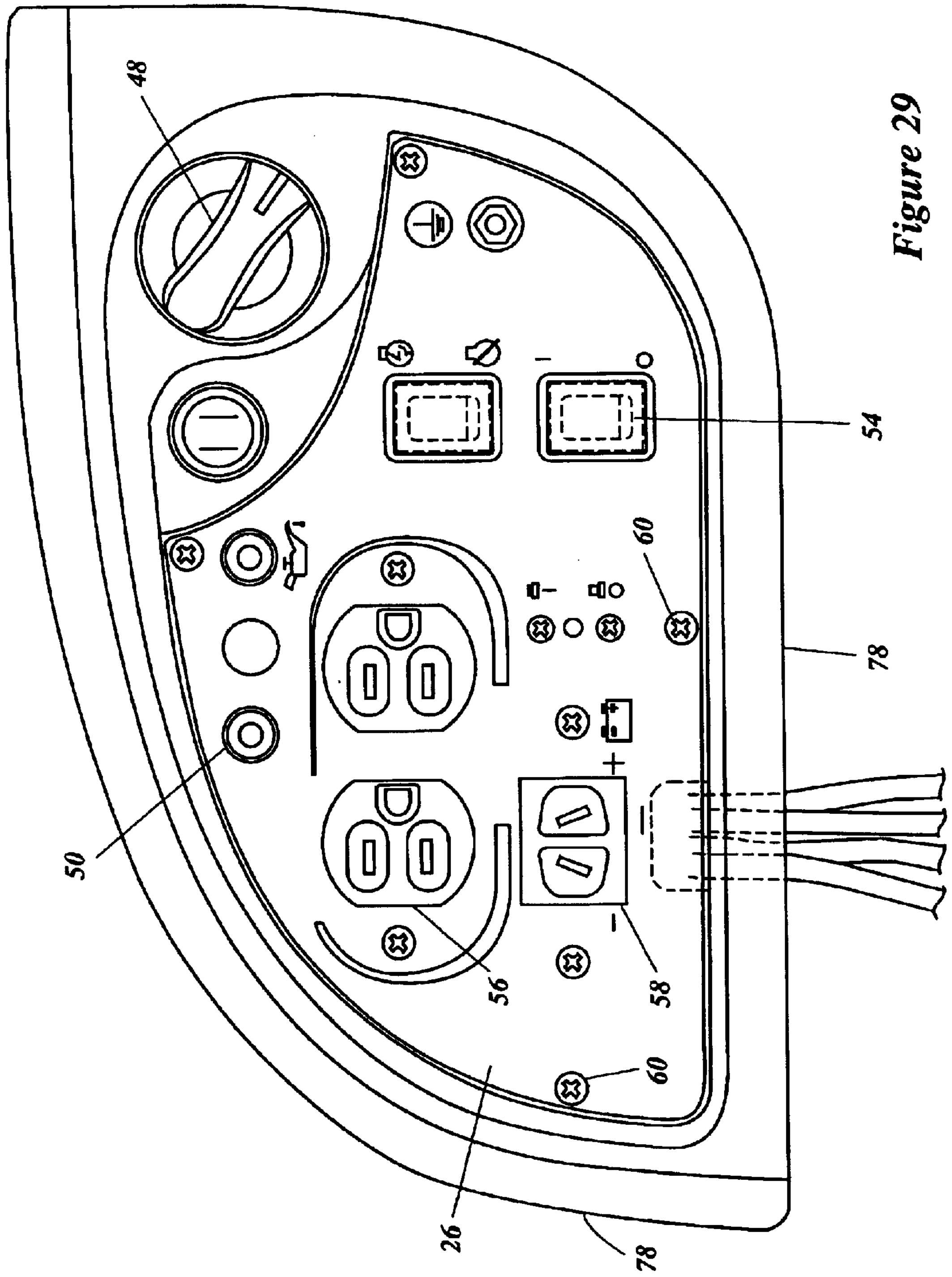
FIG. 29 illustrates a front plan view of the control panel the control panel housing of the power generator unit of FIG. 1.

FIG. 29 shows the control panel 26 positioned within the control panel housing 78 and attached to the housing 78 using the screws 60. The engine on/off switch 52 as well as the economy switch 54, the AC voltage plug receptacles 56, the DC voltage receptacle 58 and various warning lights 50 are located on the front of the control panel 26. The fuel cock control knob 48 allows for convenient control of fuel flow to the engine 12 from the fuel tank 76.

Figure 30:
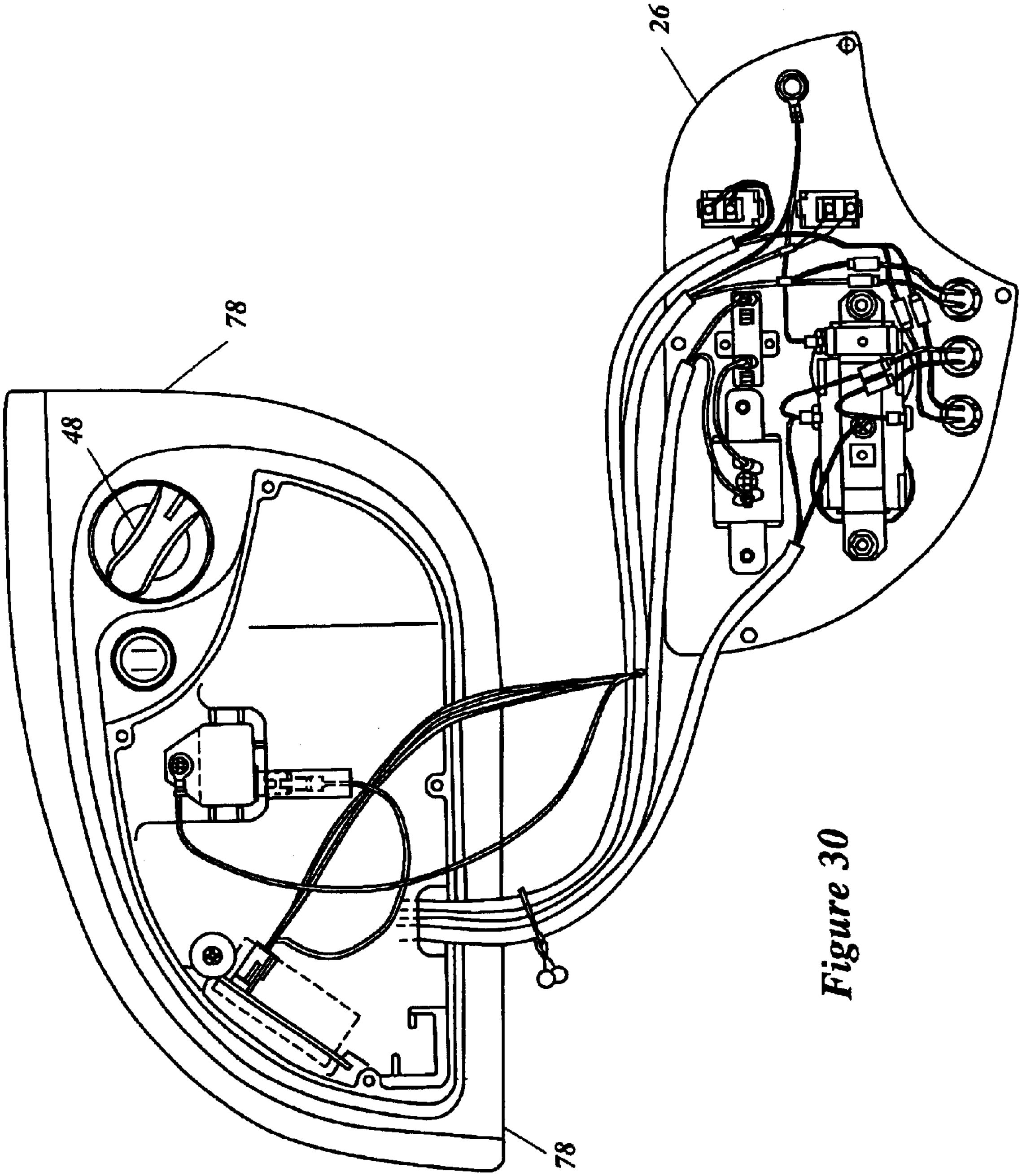
FIG. 30 is a schematic view of the control panel disassembled from the control panel housing to expose a back side of the control panel and an interior of the control panel housing. This figure also illustrates a wiring harness that interconnect various electronics on the control panel with electronics housed within the control panel housing.

FIG. 30 schematically illustrates the wiring associated with the control panel 26. Numerous electric components are disposed inside the housing 78 giving the housing 78 a depth that fits into the formed recess opening 124.

FIGS. 31–37 show further details of the control panel housing 78. The control panel housing 78 includes a plurality of positioning tabs 194 that are designed to correctly position the control panel housing 78 into the front piece 38. Reinforced mounting holes 196 incorporated in the housing 78 allowing screws 60 to align with the screw holes 128 of the front piece 38 to secure the housing 78 to the front piece 38. The screws 60 allow the housing 78 to be easily removed, thereby allowing the switches 52 and 54 along with the various warning lights 50 to be easily serviced when the control panel 26 is removed.

Figure 31:
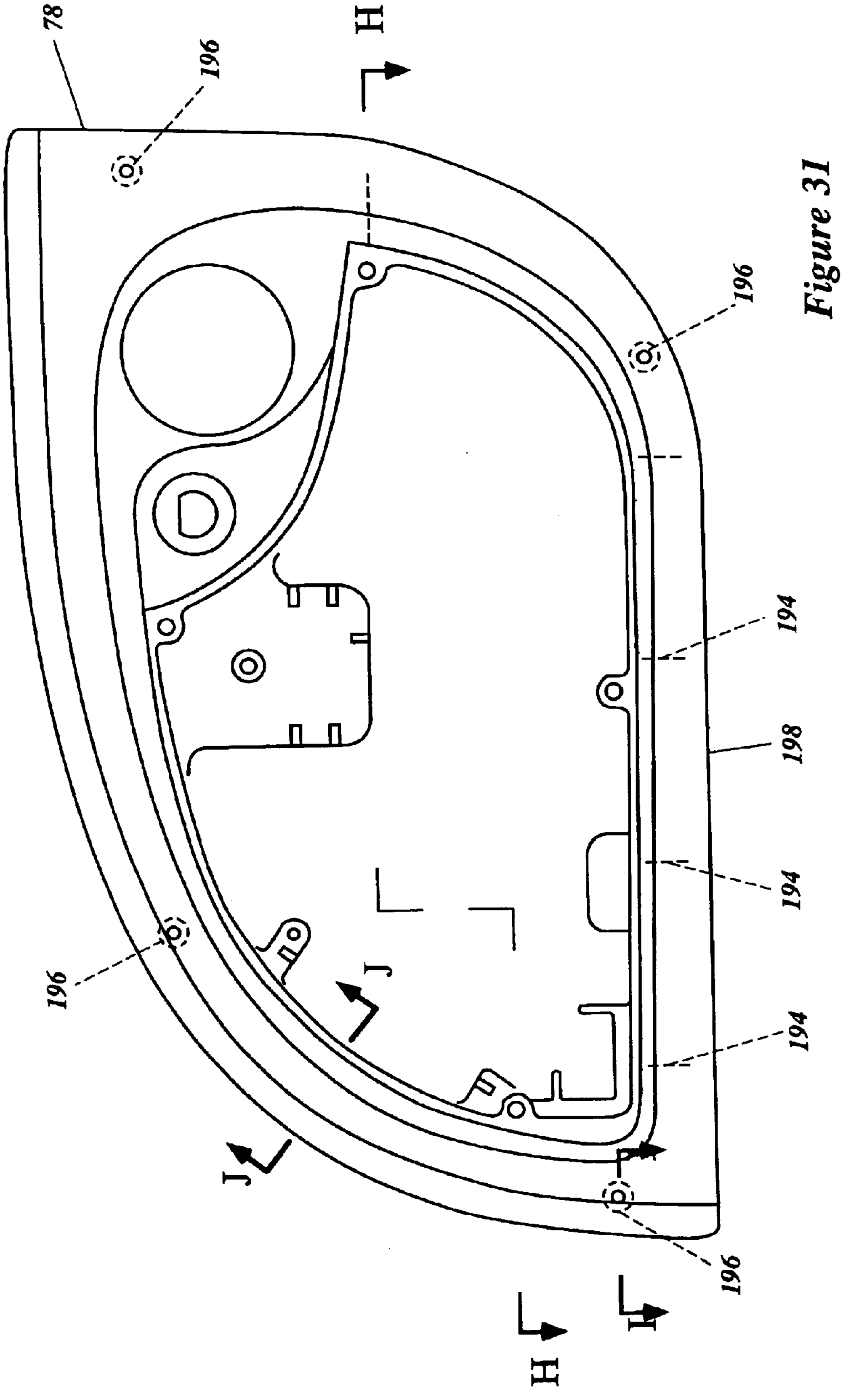
FIG. 31 is a front view of the control panel housing of FIG. 29 with the control panel and the electronics removed.
Figure 32:
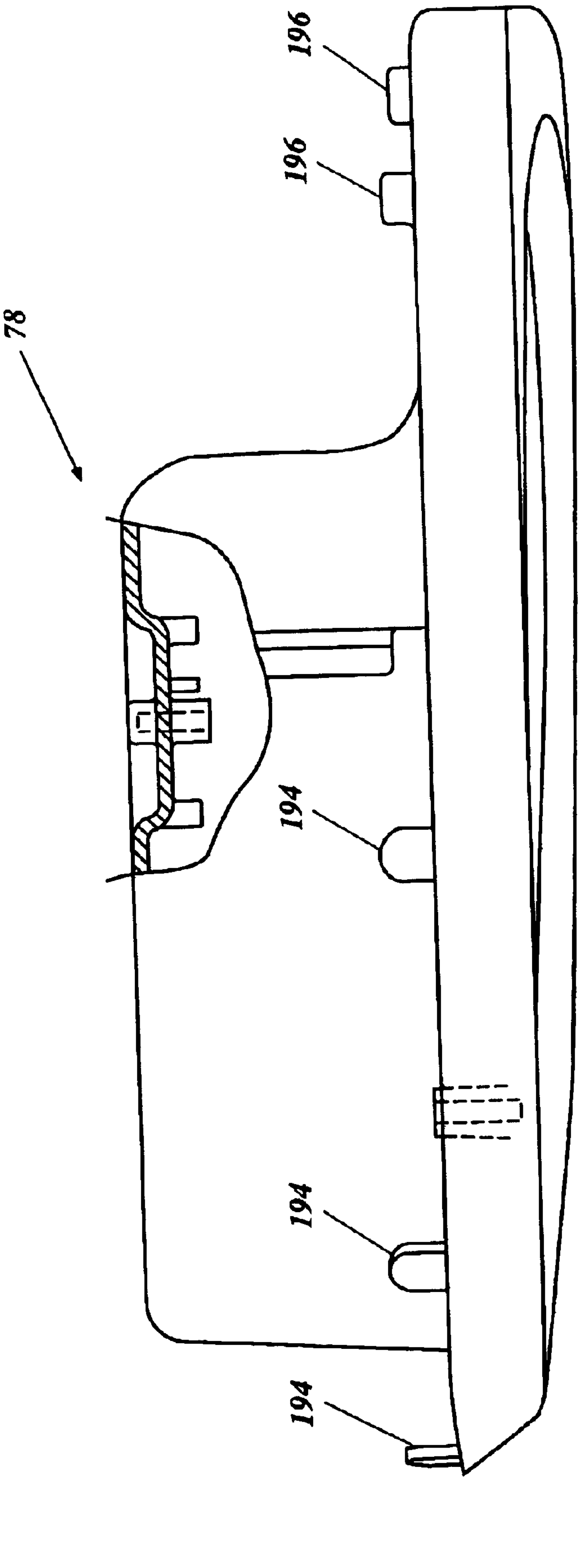
FIG. 32 is a top view of the control panel housing of FIG. 31.
Figure 33:
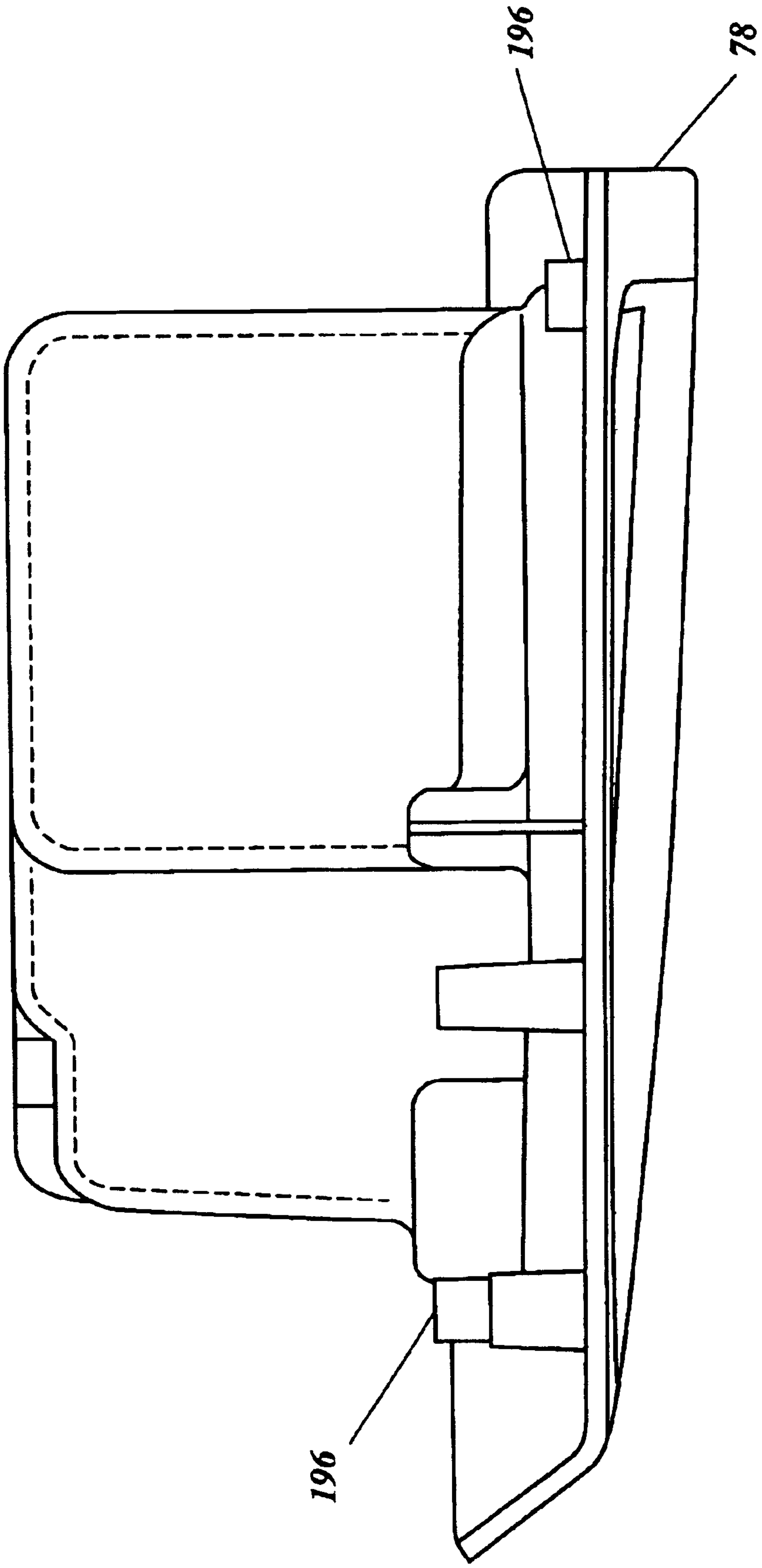
FIG. 33 is a right side view of the control panel housing of FIG. 31.
Figure 34:
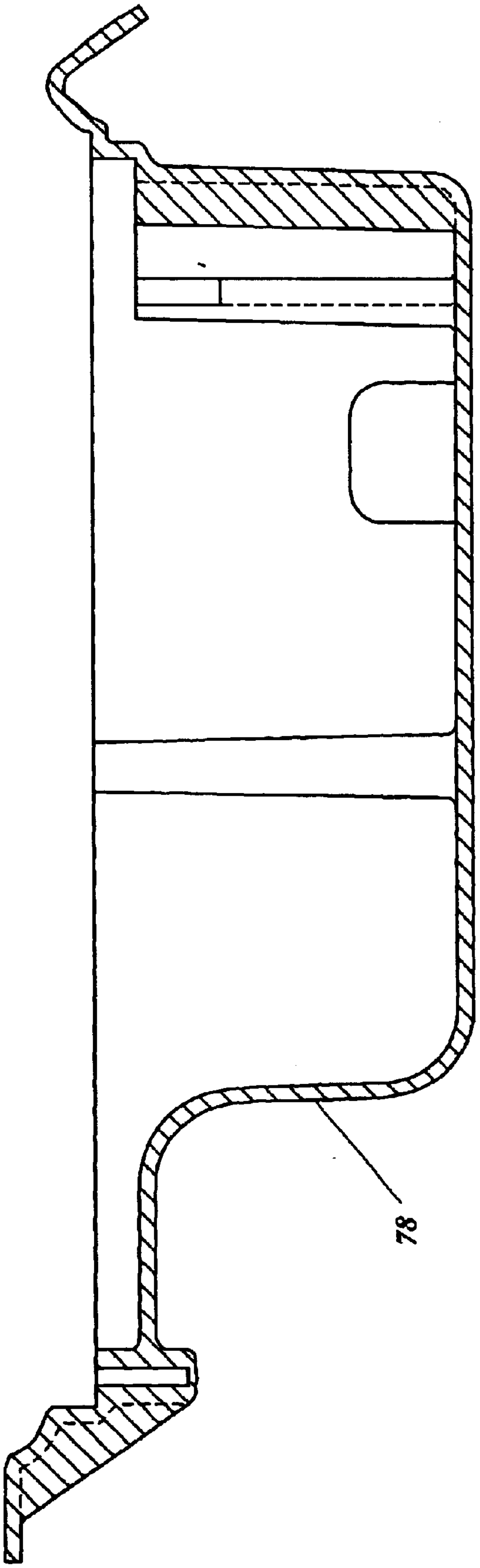
FIG. 34 is a cross sectional view of the control panel housing taken along the section line H—H of FIG. 31.
Figure 35:
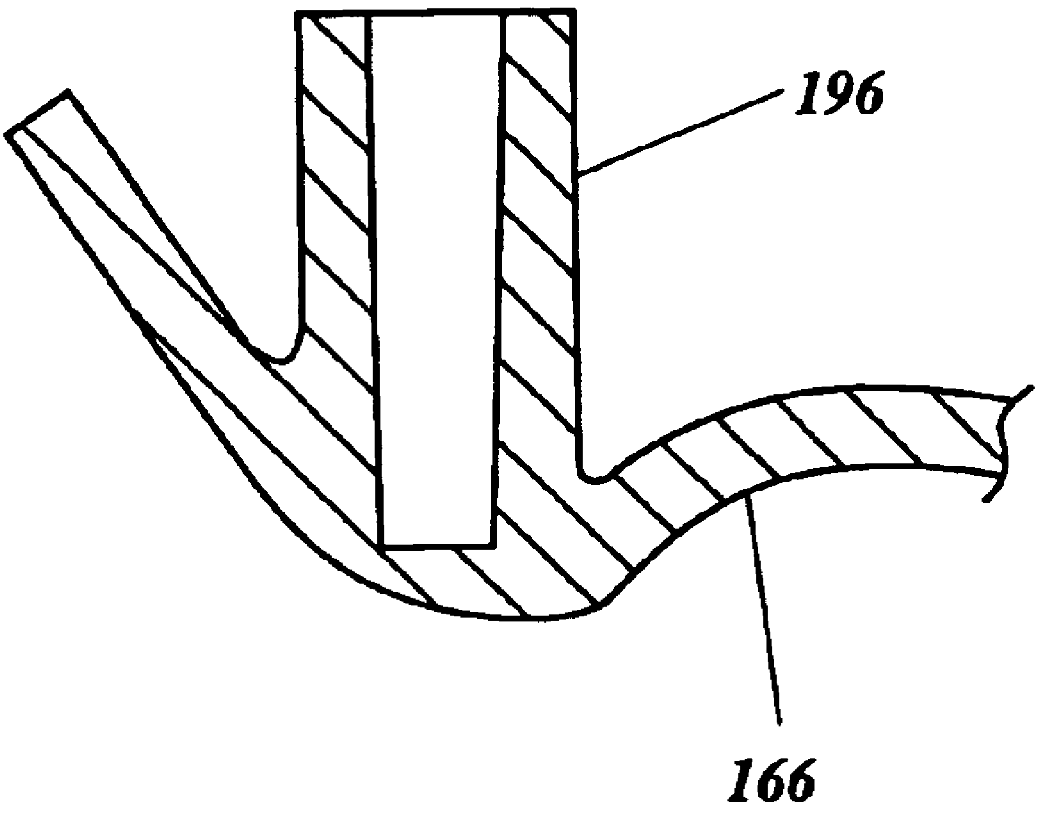
FIG. 35 is a sectional view of a portion of the control panel housing taken along the section line I—I of FIG. 31.
Figure 36:
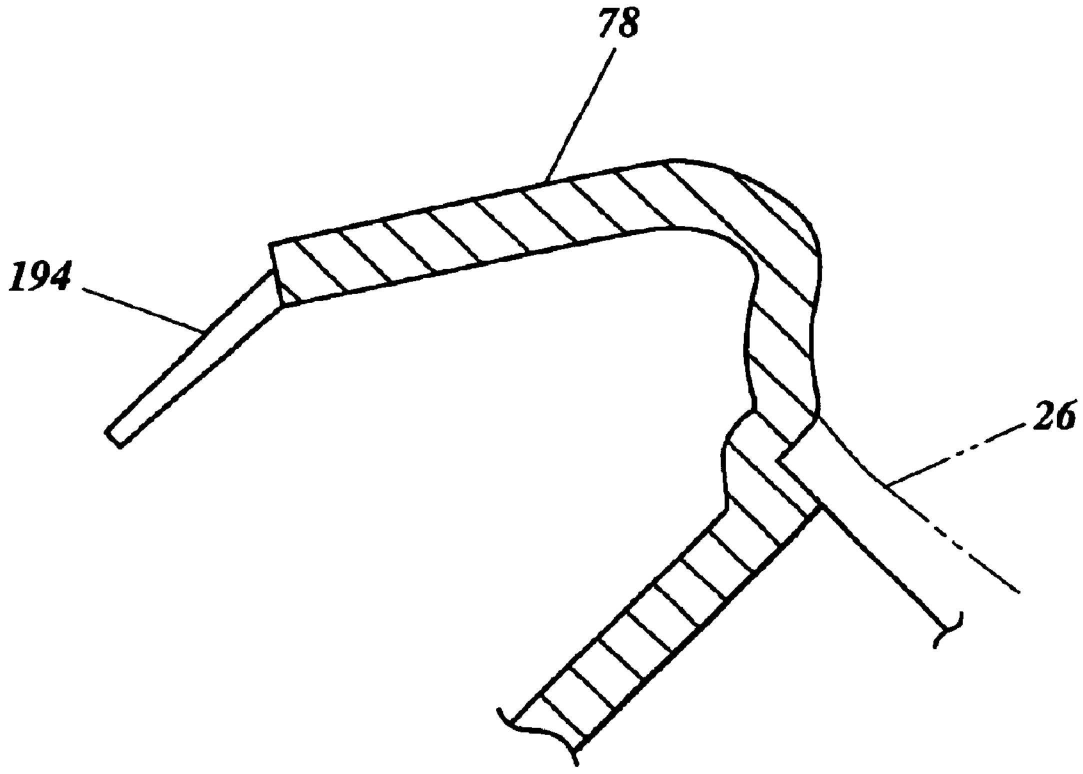
FIG. 36 is a cross sectional view of another portion of the control panel housing taken along the section line J—J of FIG. 31.
Figure 37:
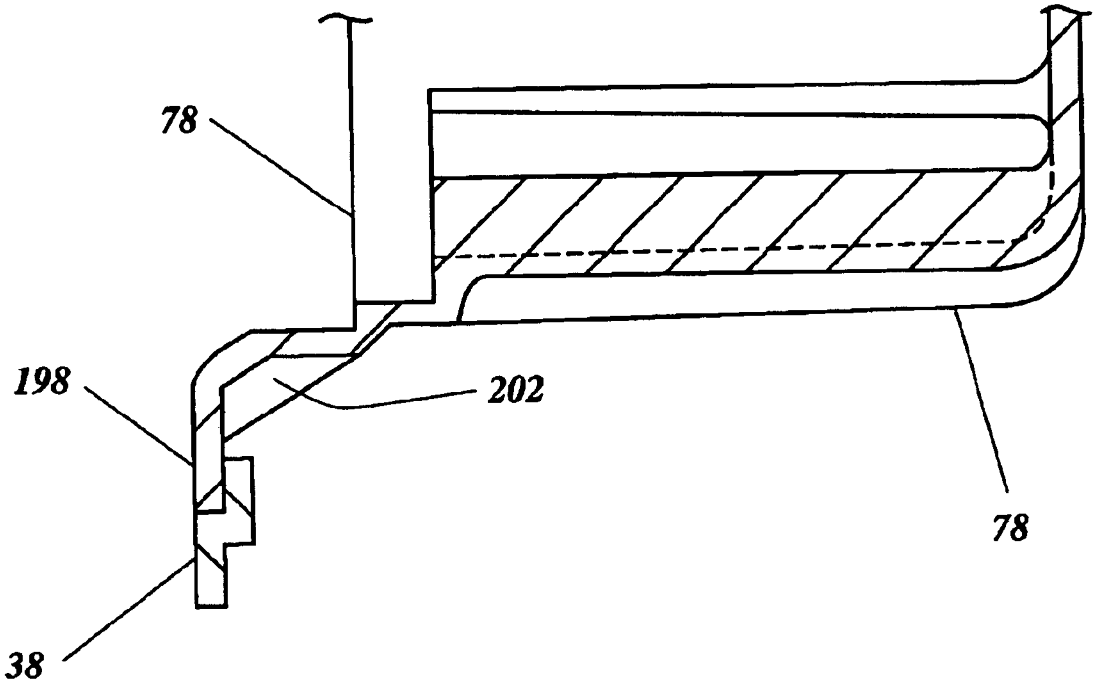
FIG. 37 is a cross sectional view of the an additional portion of the control panel housing, as attached to the front cover piece, taken along the section line K—K of FIG. 1.

FIG. 34 illustrates the cross, sectional view of the control panel housing 78 taken along the sectional line H—H of FIG. 31. FIG. 35 illustrates the cross sectional view of the control panel housing 78 taken along the sectional line I—I of FIG. 31 and show the detail of the reinforced mounting holes 196. The sectional line cross section J—J of FIG. 31 shown in FIG. 36 shows the detail of the positioning tabs 194 as well as how the control panel 26 fits to the control panel housing 78. As shown in FIG. 37, taken along the lines K—K of FIG. 1, a lower edge 198 of the housing 78 is made to further correctly position the housing 78 within the front panel 38. This lower edge 198 is strengthened by reinforcements 200.

Figure 38:
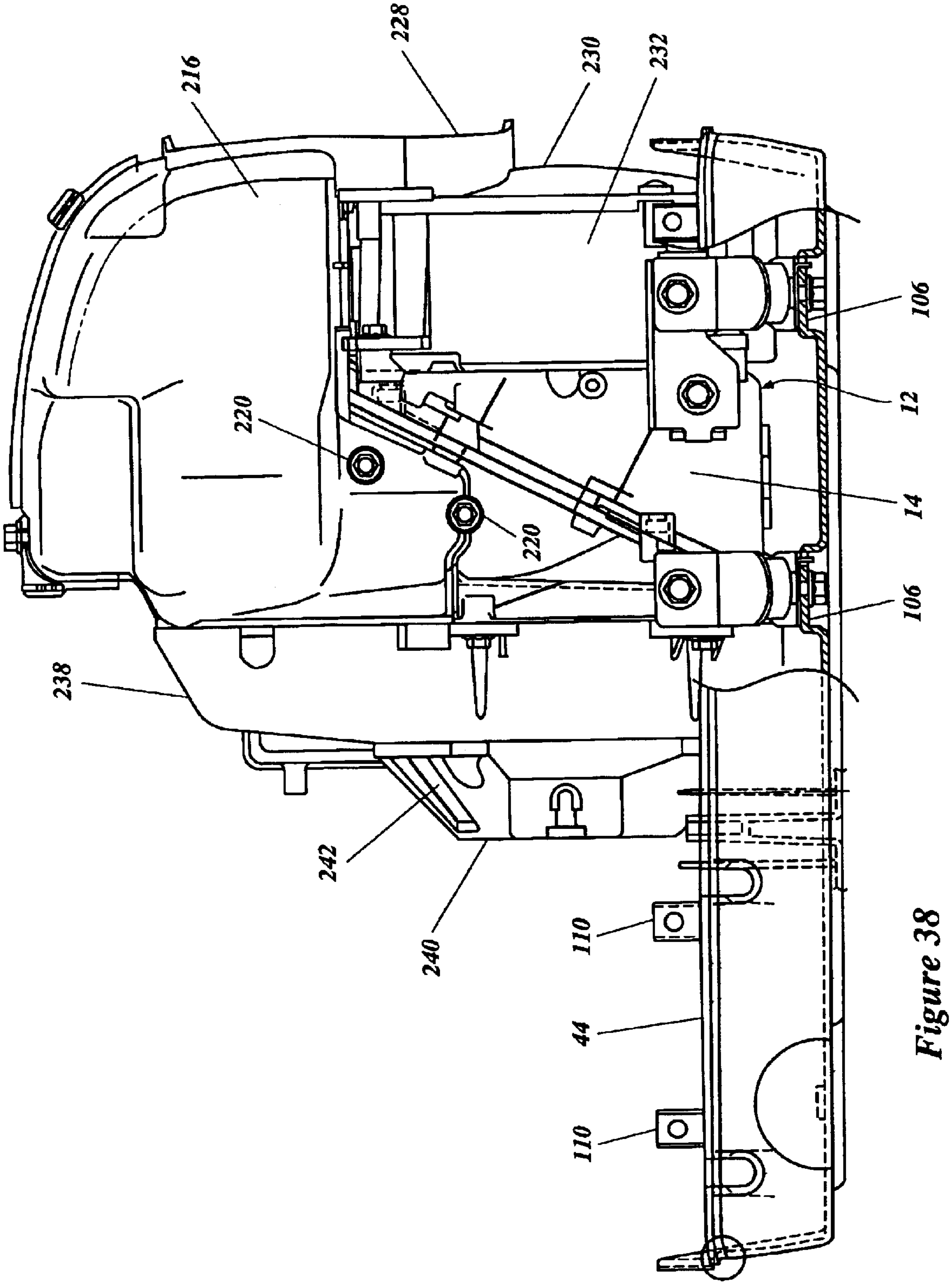
FIG. 38 is a front view of an engine-generator assembly mounted to the bottom cover piece of the power generator unit of FIG. 1 with a portion of the bottom cover piece being sections to expose engine mounts for the engine on the bottom cover piece.
Figure 39:
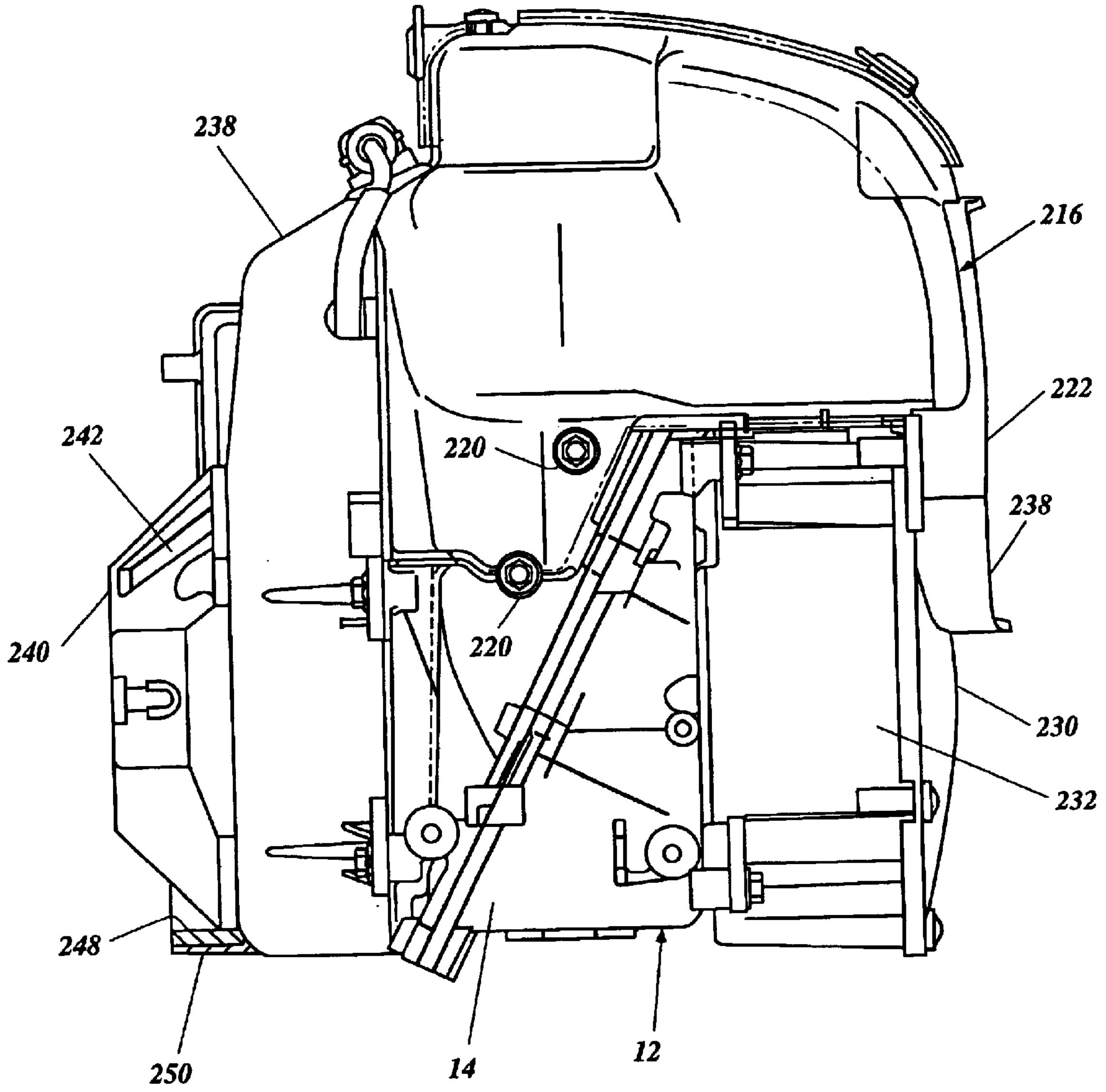
FIG. 39 is a front elevational view of the engine-generator assembly of the power generator unit of FIG. 1.
Figure 40:
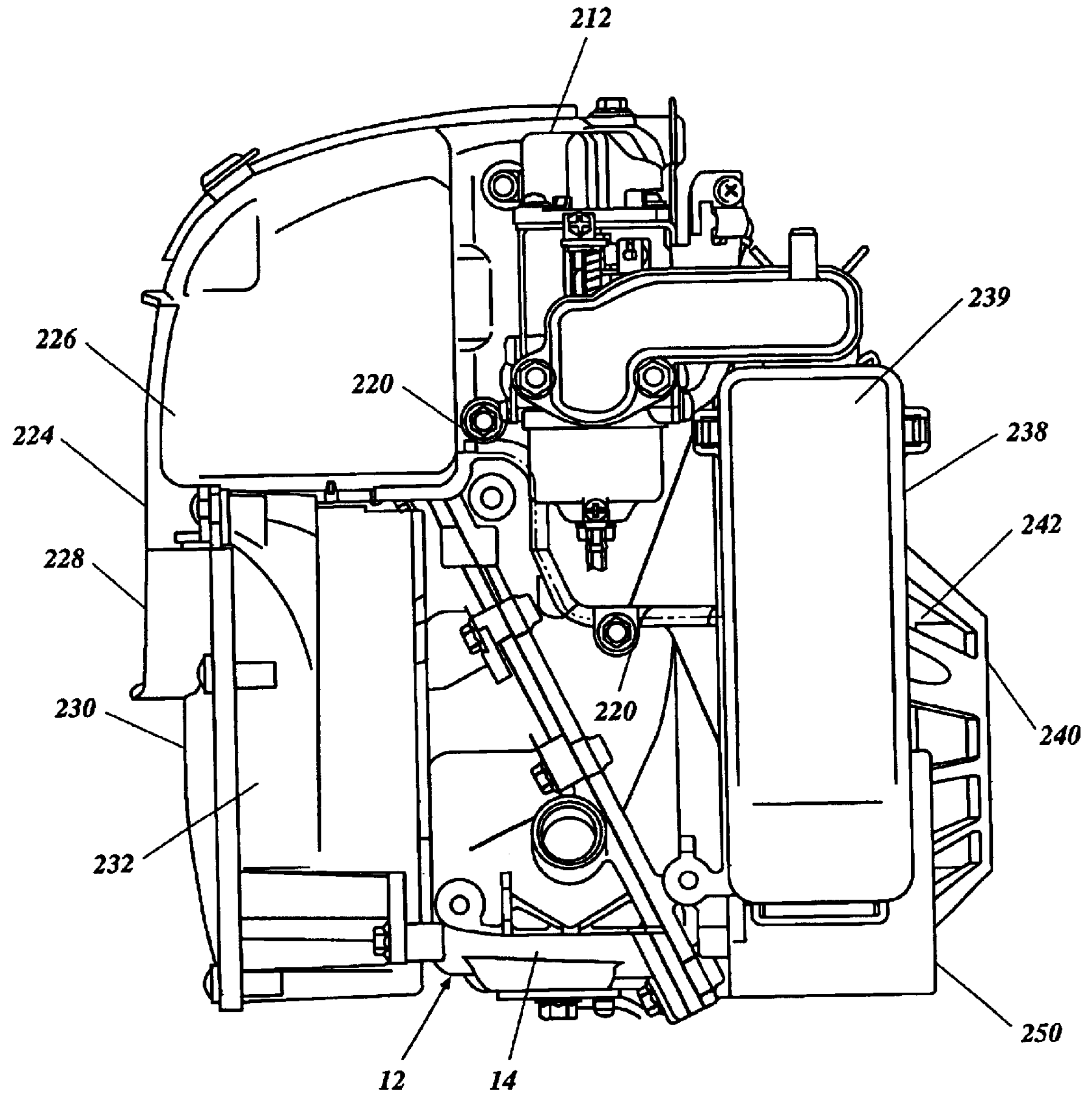
FIG. 40 is a rear elevational view of the engine-generator assembly of FIG. 39.
Figure 41:
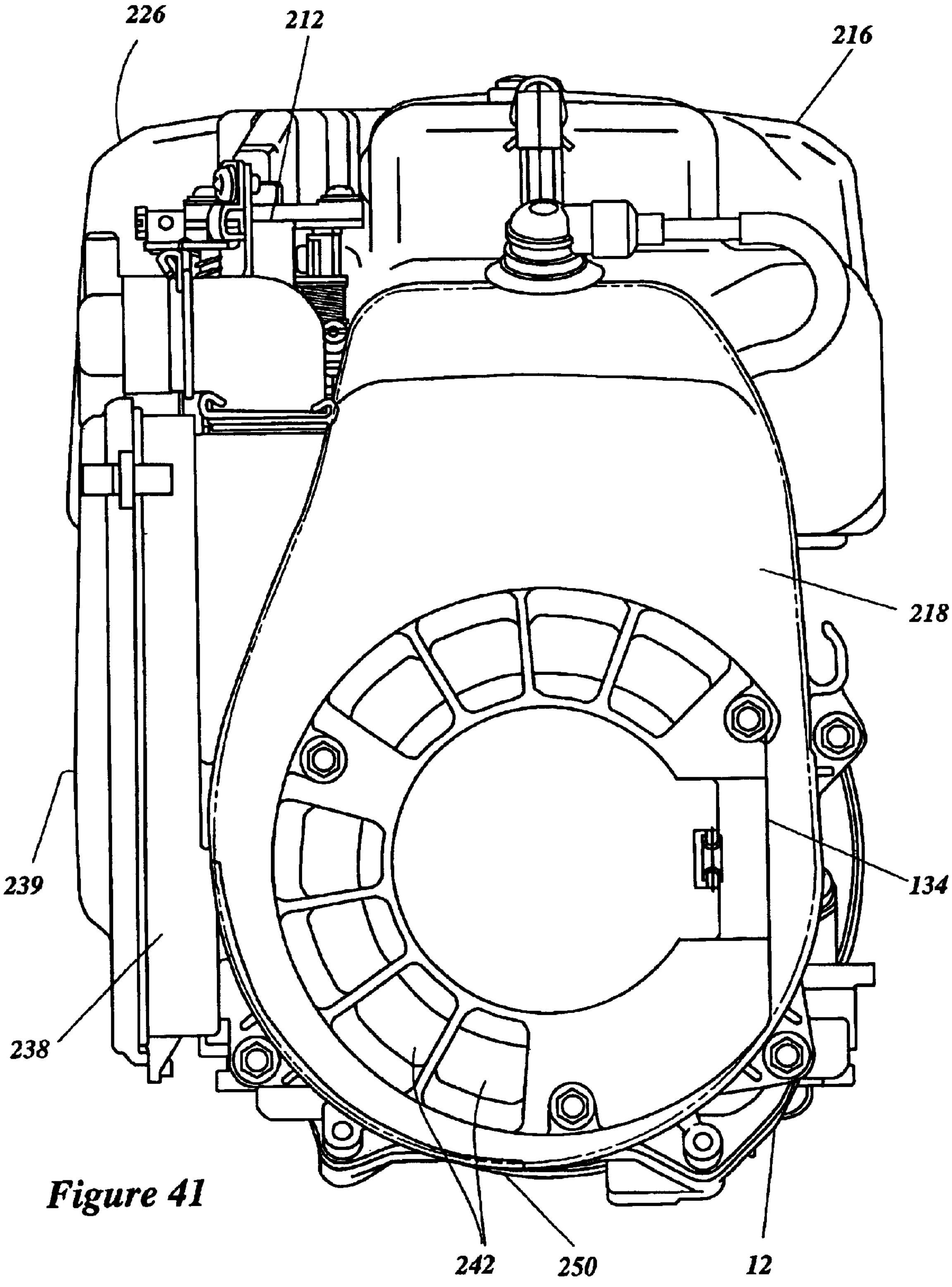
FIG. 41 is an left elevational side view of the engine-generator assembly of FIG. 39, showing an engine cooling fan.
Figure 42:
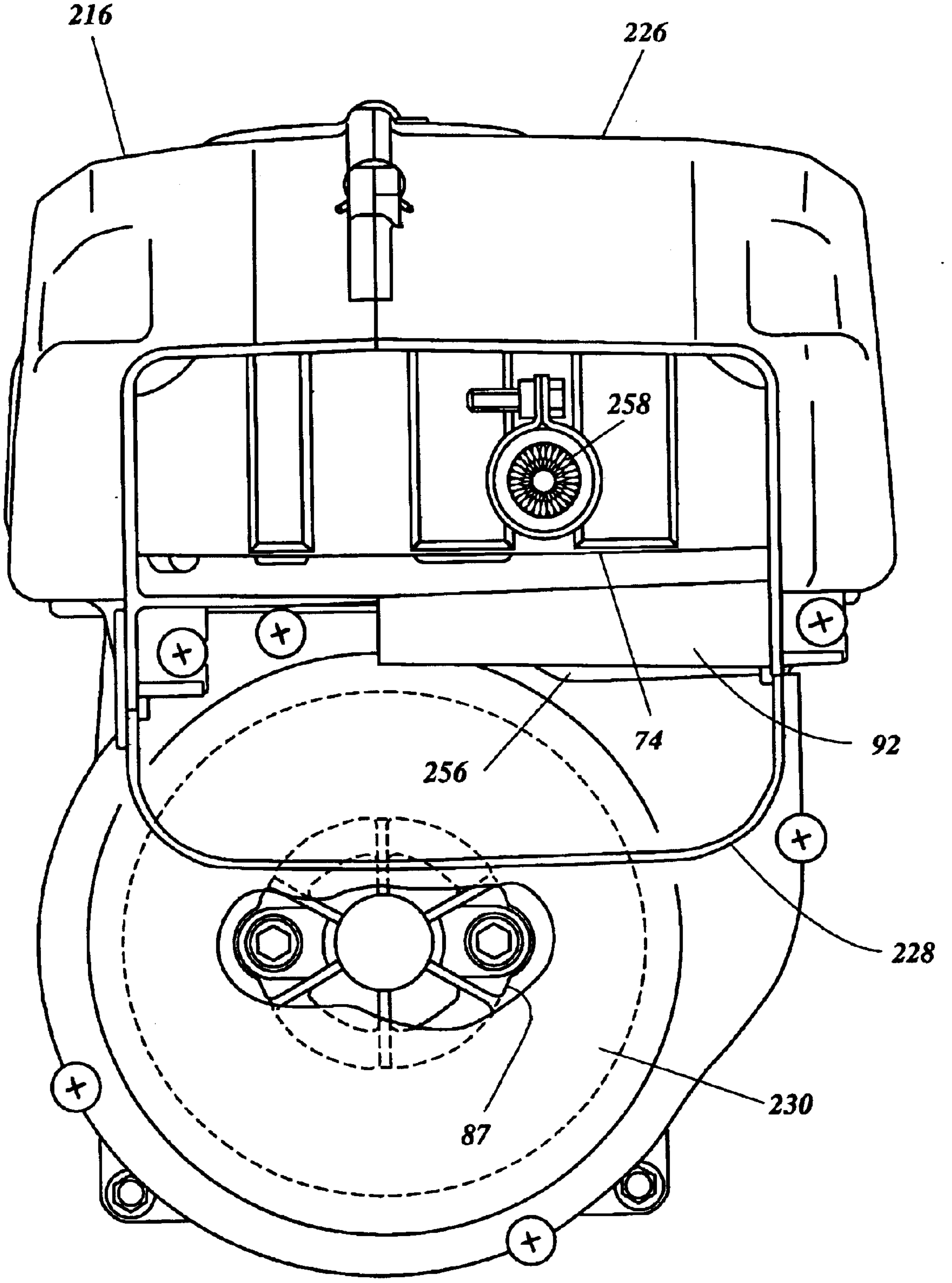
FIG. 42 is an right elevational side view of the engine-generator assembly, showing a generator-cooling fan.

FIG. 38 illustrates a front view of the engine 12 mounted to the bottom tray 44. Air is drawn into an intake system 210 and is delivered to a carburetor 212 where the air is combined with fuel to form an air/fuel mixture. The carburetor incorporates a throttle valve (not shown) that regulates an amount of the air/fuel mixture. The air/fuel mixture amount can change in response to a position of the throttle valve, i.e., a throttle opening position. A manual throttle lever (not shown) or a stepper motor (not shown) can actuate the throttle valve. The greater the opening degree of the throttle valve, the greater the amount of the air/fuel mixture and the higher the engine speed.

The air/fuel mixture is ignited by the ignition system (not shown) at a predetermined crankshaft position and the engine 12 produces a force when a rapid heat expansion occurs as a result of the air/fuel mixture combusting in the combustion chamber. The force is applied to the piston and is translated into a rotational force through the connecting rods and crankshaft. A combusted mixture, i.e. exhaust gases are routed to an external location through the muffler 74.

Various internal components such as the fuel tank 76, the engine 12, and the generator 22 are placed in a preferred order on the bottom tray 44 from left to right as viewed from the front of the power generator unit 10. This preferred order allows the cooler components to be cooled first while cooling the warmer components last. Additionally, as noted above, significantly heated components are cooled by cooling air flowing along the first cooling air path, while cooler components are cooled by air flowing along the second cooling air path, which is generally separated from the first cooling air path by the arrangement of the components within the generator cover 36, as well as by shrouds and guides within the cover, which will be described in greater detail below.

The fuel tank 76 is placed behind (that is, generally to the rear of) the control module 24 and is, supported by a rubber sheet 206 on the pair of elevated component mounts 112 on the bottom tray 44, in addition to the mounting bosses 108, which were described above.

With reference now to FIGS. 38 through 42 and to FIGS. 46 through 53, a front engine cover 216 and a rear engine cover 226 are mounted to respective sides of the engine 12 with screws through screw bosses 220. The front engine cover 216 is formed with a front side air diffuser 222 that is designed to line up with a rear side air diffuser 224 incorporated into a rear engine cover 226. The front cover side air diffuser 222 and the rear cover side air diffuser 224 join together with a lower air diffuser 228 that is incorporated into a right side generator cover 230 to guide the exiting engine and generator cooling air.

The generator 22 is mounted inside a generator housing 232. In addition to supporting the generator 22, the generator housing 232 further guides the generator cooling air path to help efficiently cool the generator 22. The right side generator cover 230 is attached to the generator housing 232 to help guide the cooling air.

Figure 43:
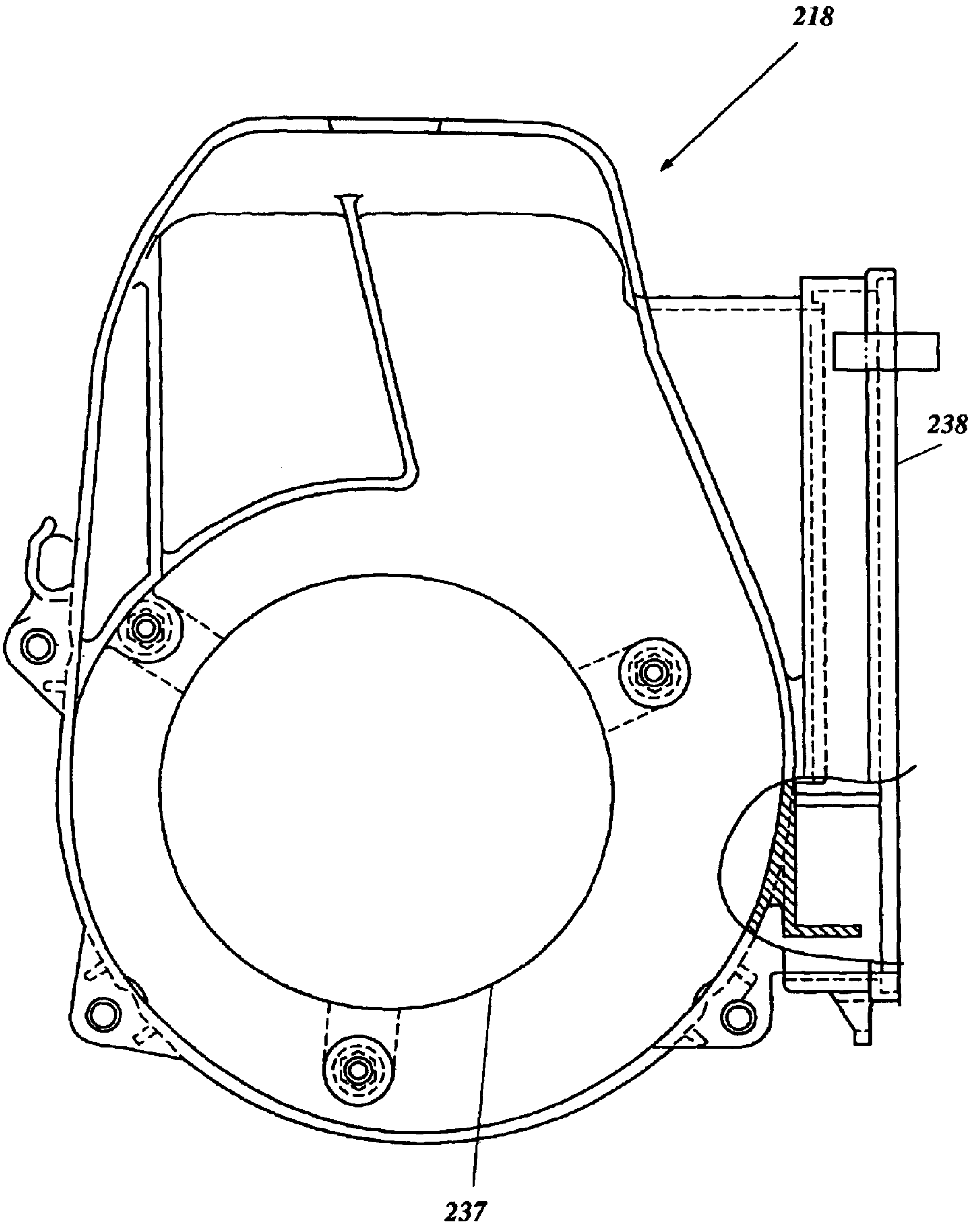
FIG. 43 is plan view of the engine fan shroud of the engine-generator assembly of FIG. 40, showing an inner side of the shroud and an air clearer housing. A portion of the shroud is sectioned to illustrate an interior of the air cleaner housing.
Figure 44:
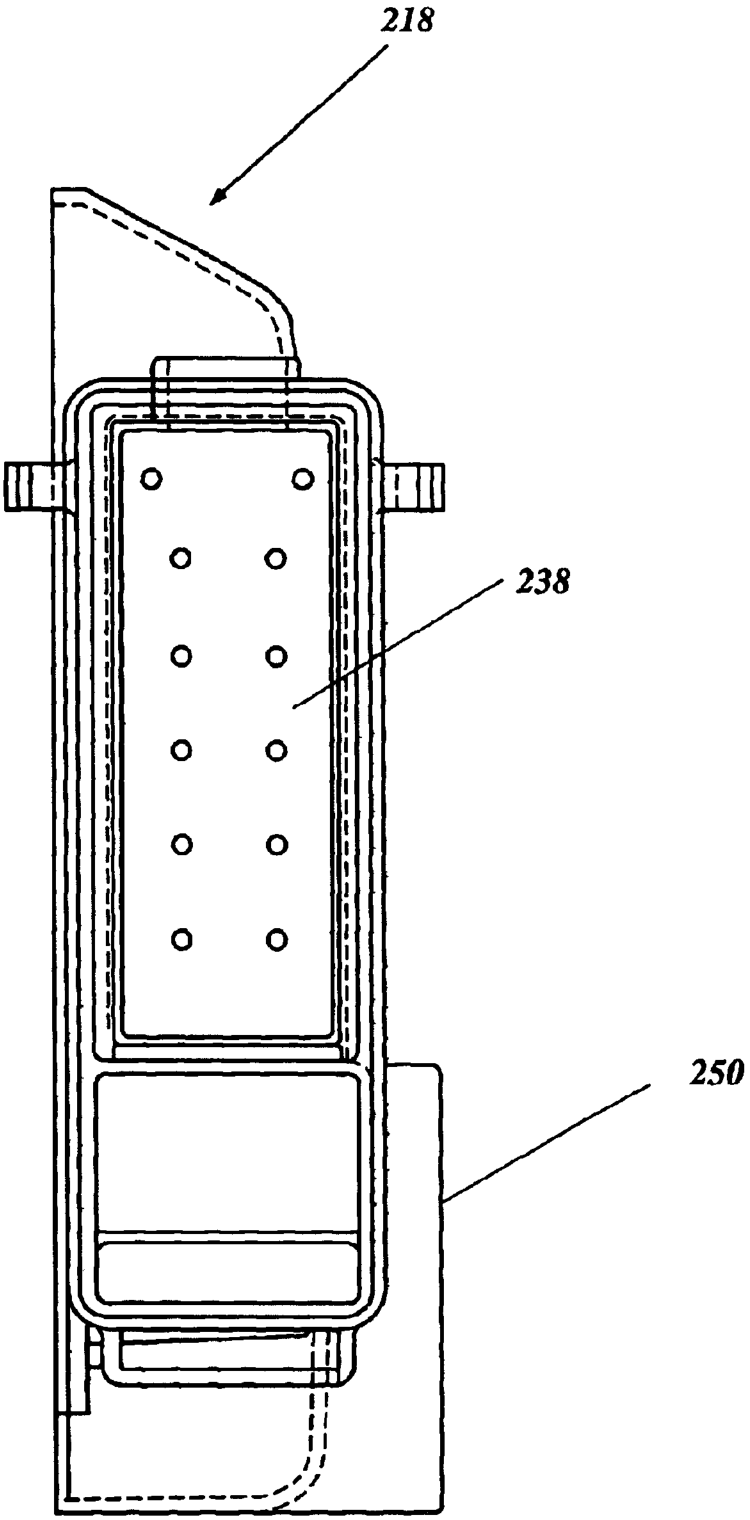
FIG. 44 is a rear side view of the air cleaner housing of FIG. 43.
Figure 45:
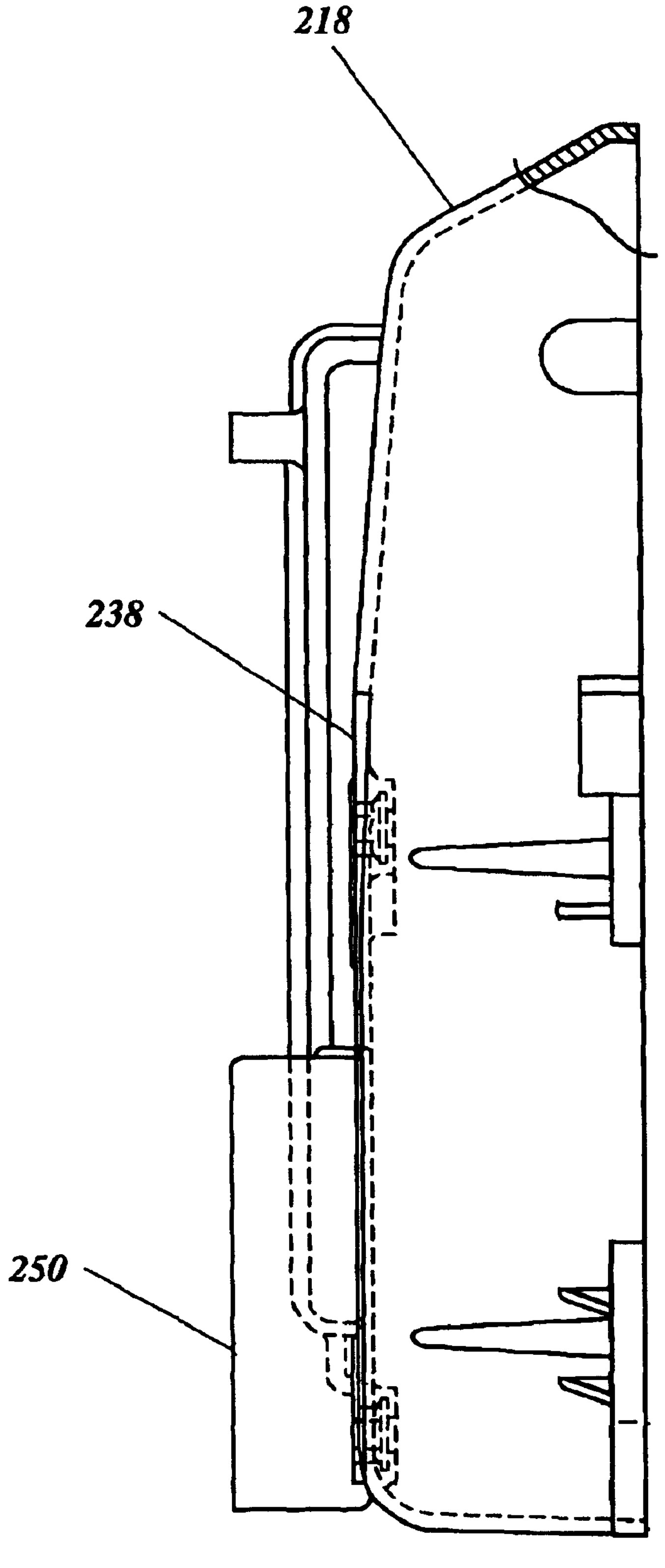
FIG. 45 is a front side view of the air cleaner of FIG. 43.
Figure 46:
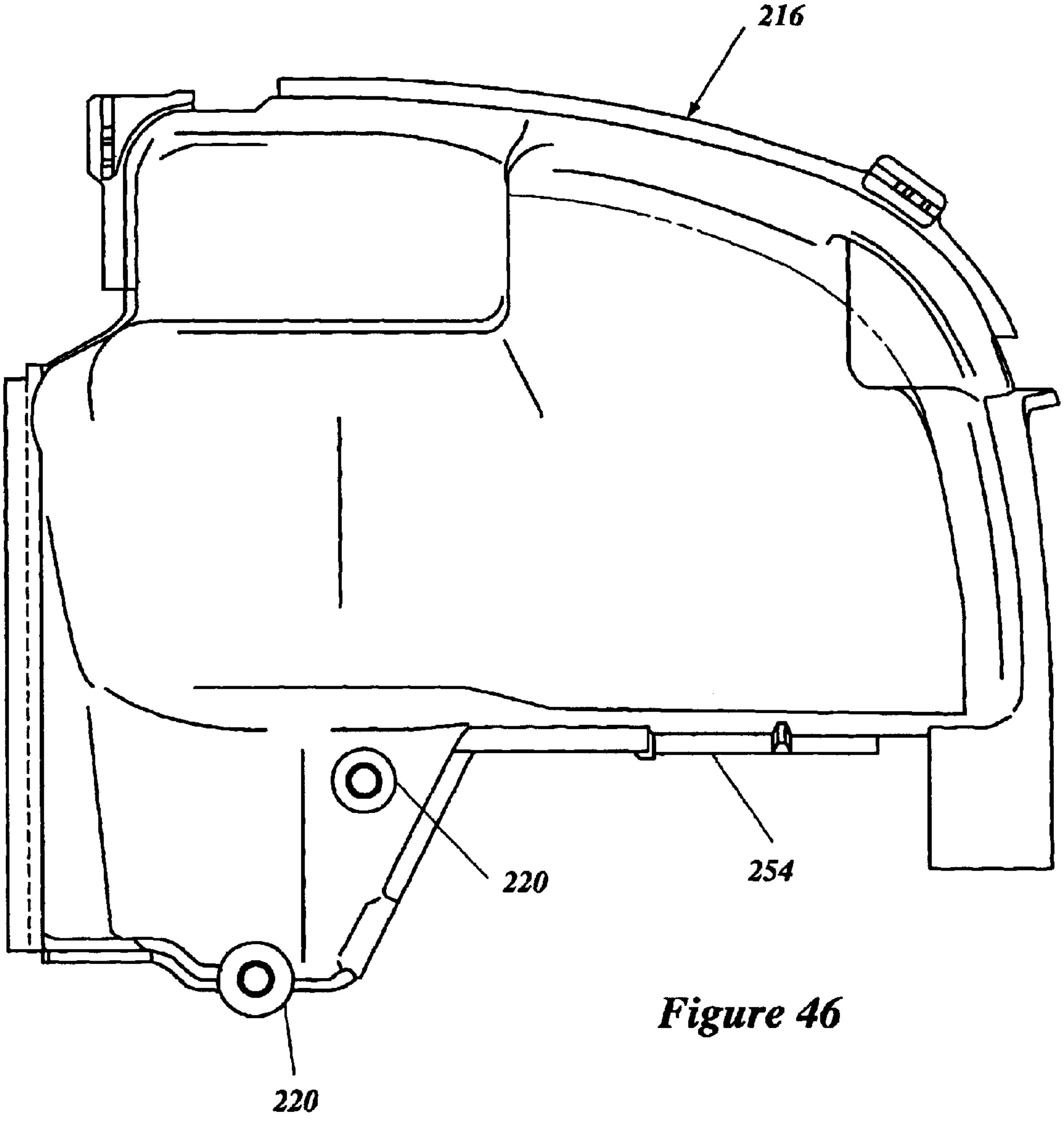
FIG. 46 is a front view of a front engine shroud of the engine-generator assembly of FIG. 39.
Figure 47:
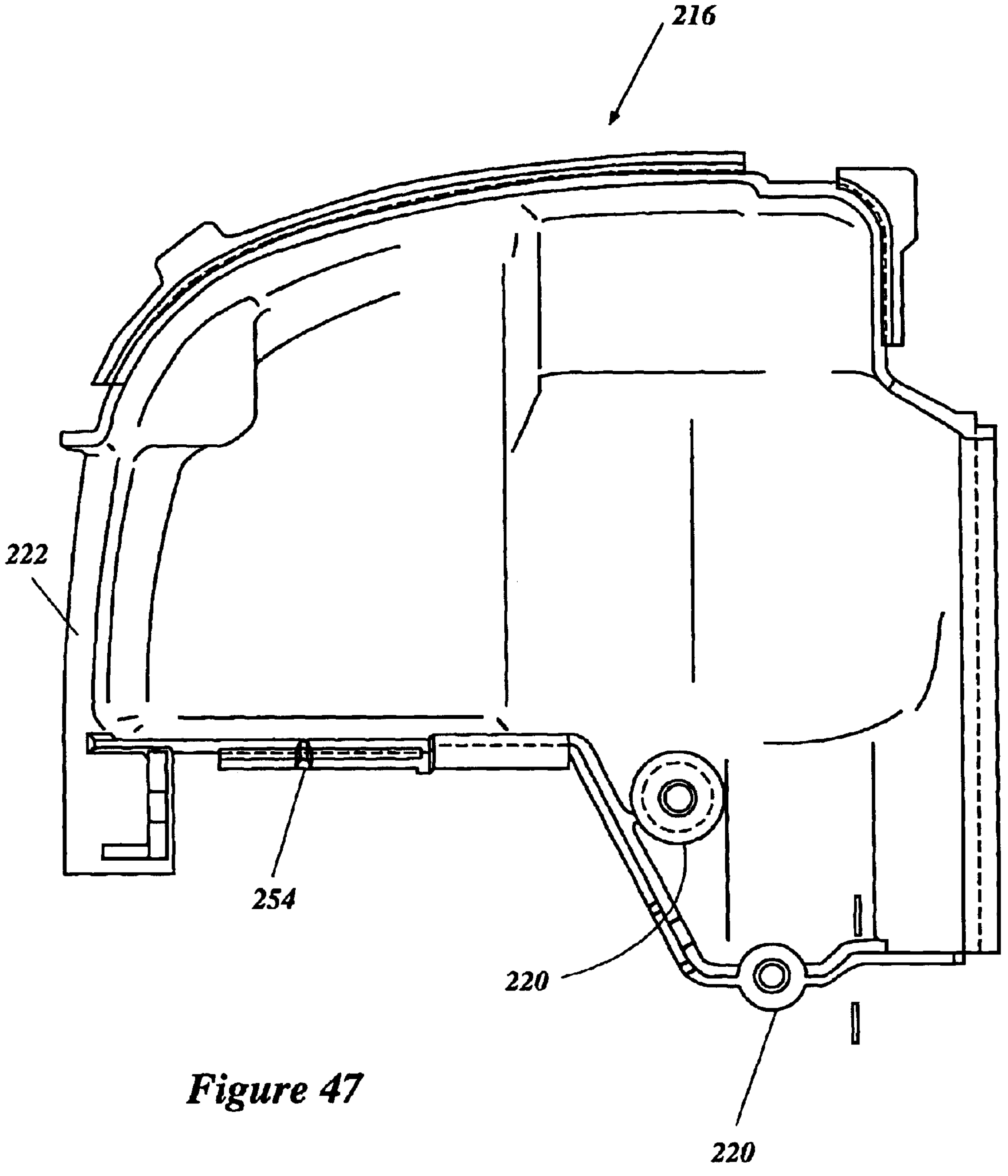
FIG. 47 is a plan view of the front engine shroud of FIG. 46, illustrating an inner side of the front engine shroud.
Figure 48:
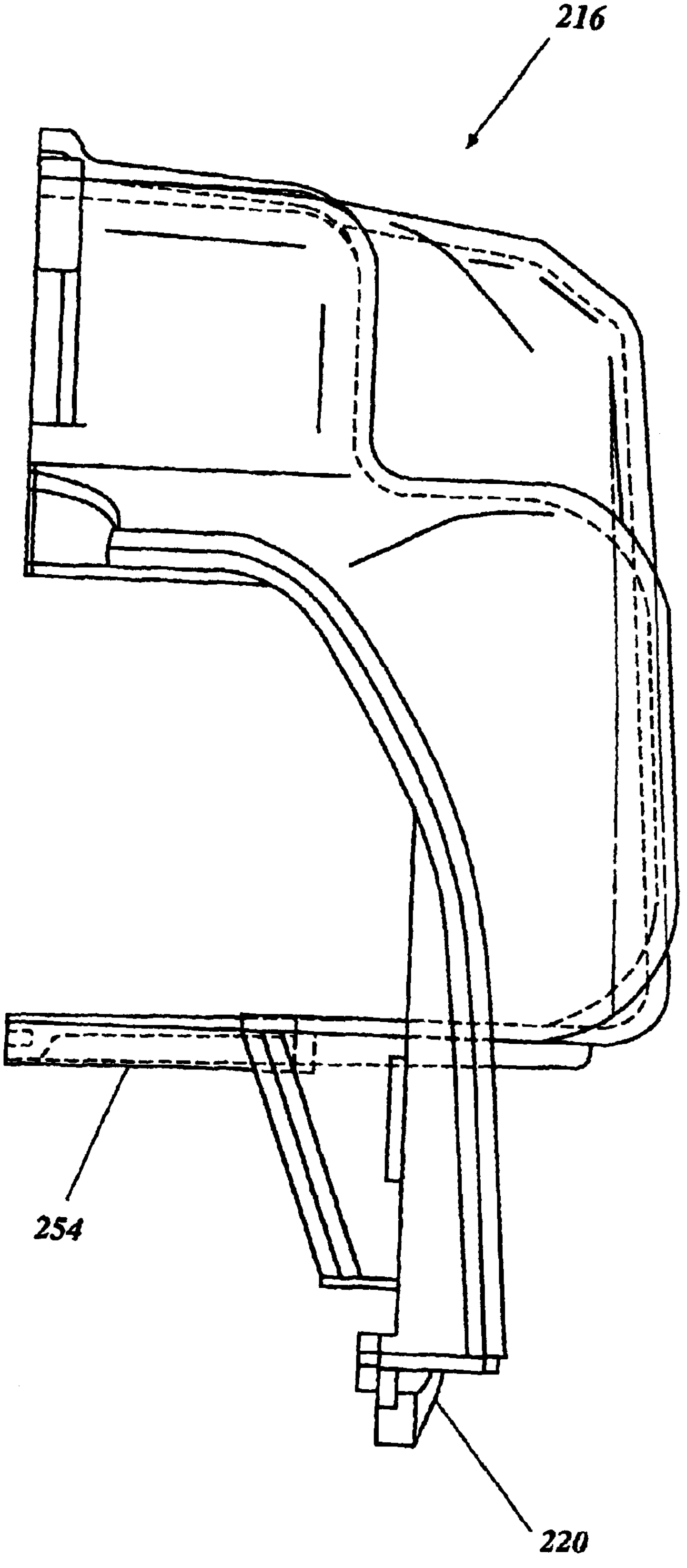
FIG. 48 is a left side view of the front engine shroud of FIG. 46.
Figure 49:
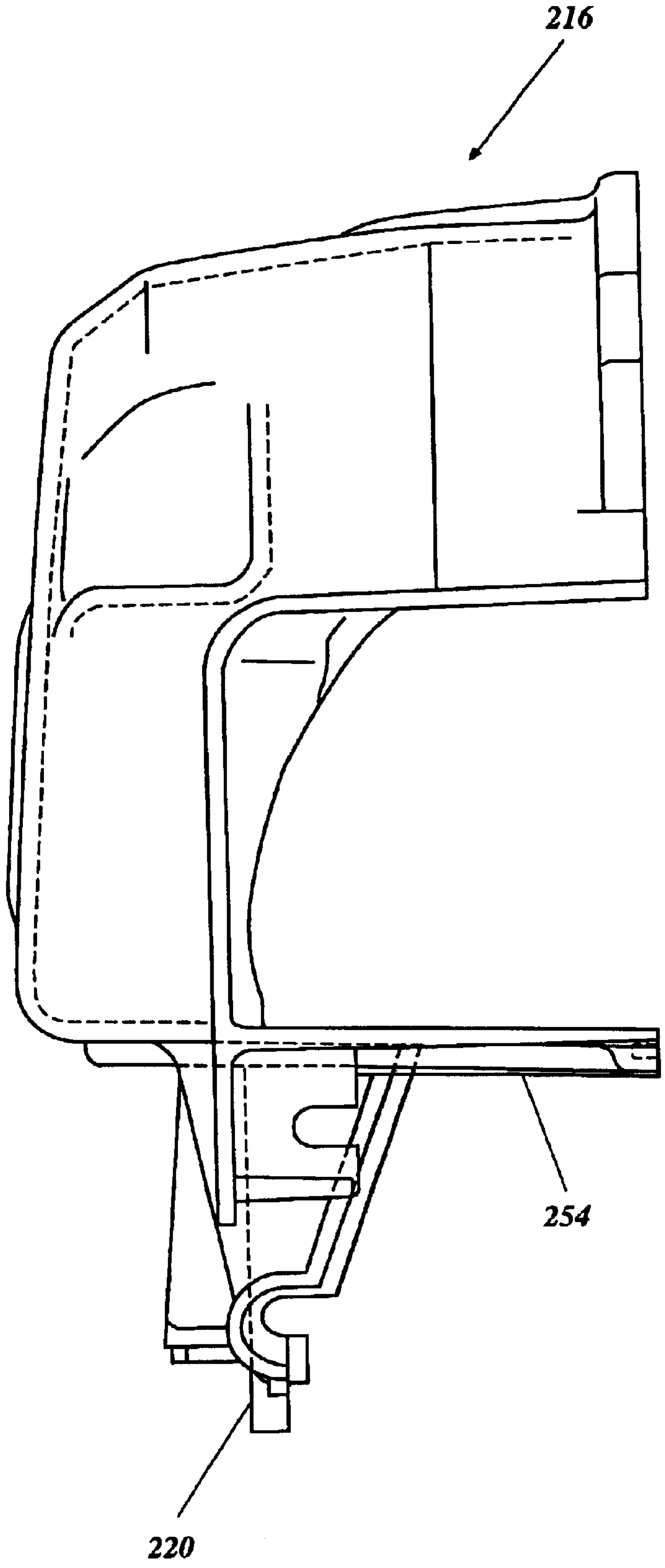
FIG. 49 is a right side view of the front engine shroud of FIG. 46.
Figure 50:
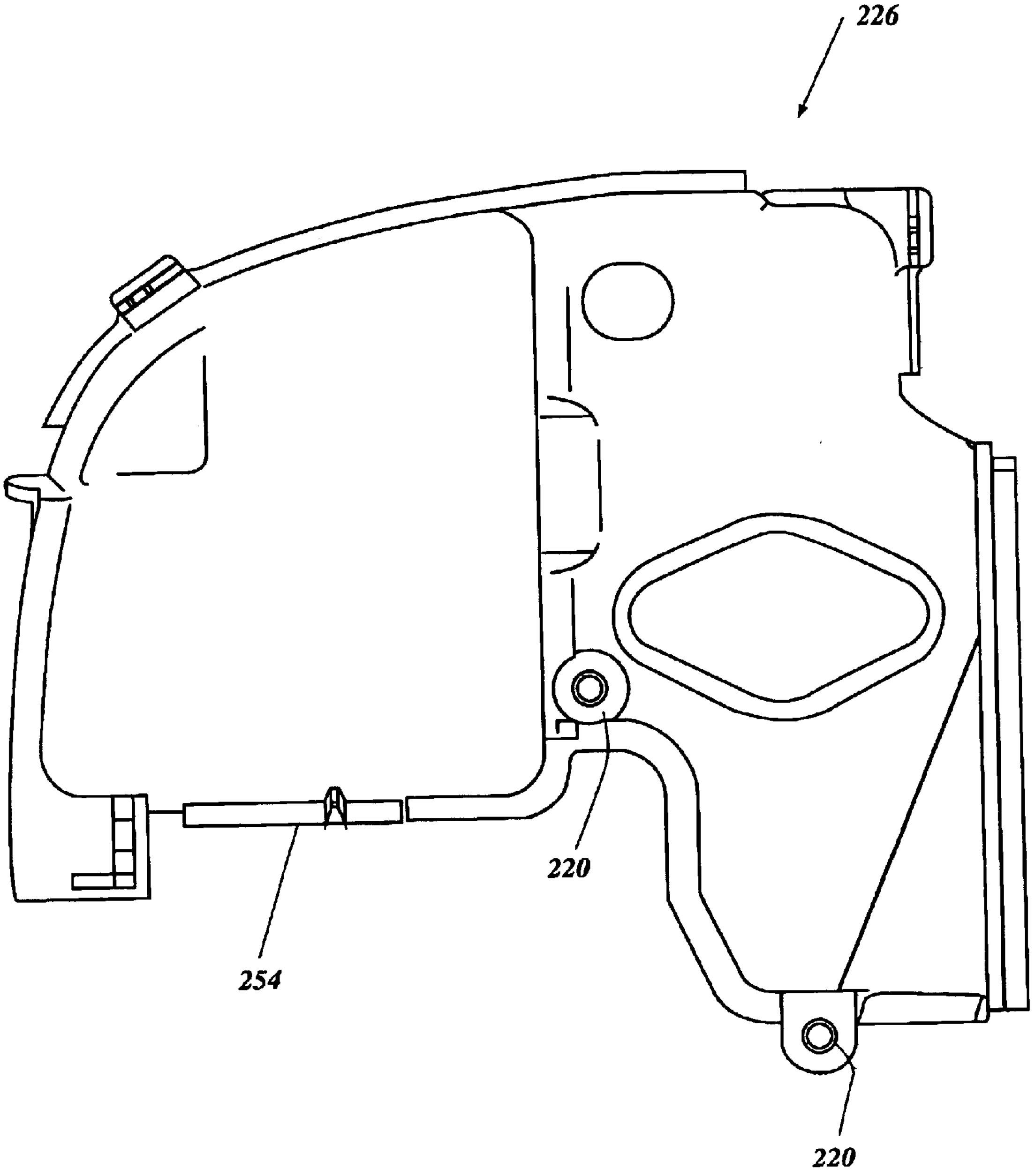
FIG. 50 is a rear view of a rear engine shroud of the engine-generator assembly of FIG. 39.
Figure 51:
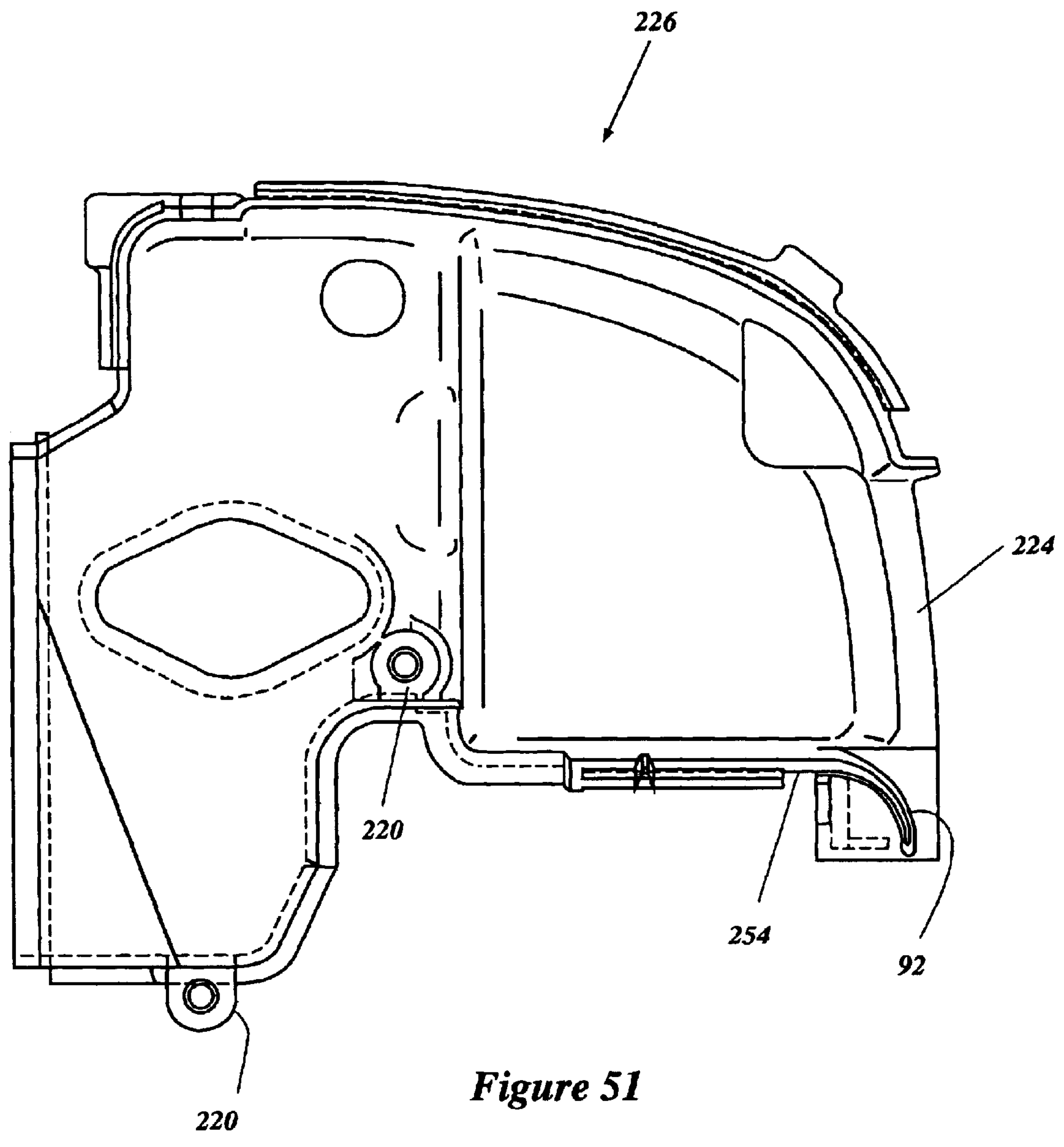
FIG. 51 is a plan view of the rear engine shroud of FIG. 50, illustrating an inner side of the rear engine shroud.
Figure 52:
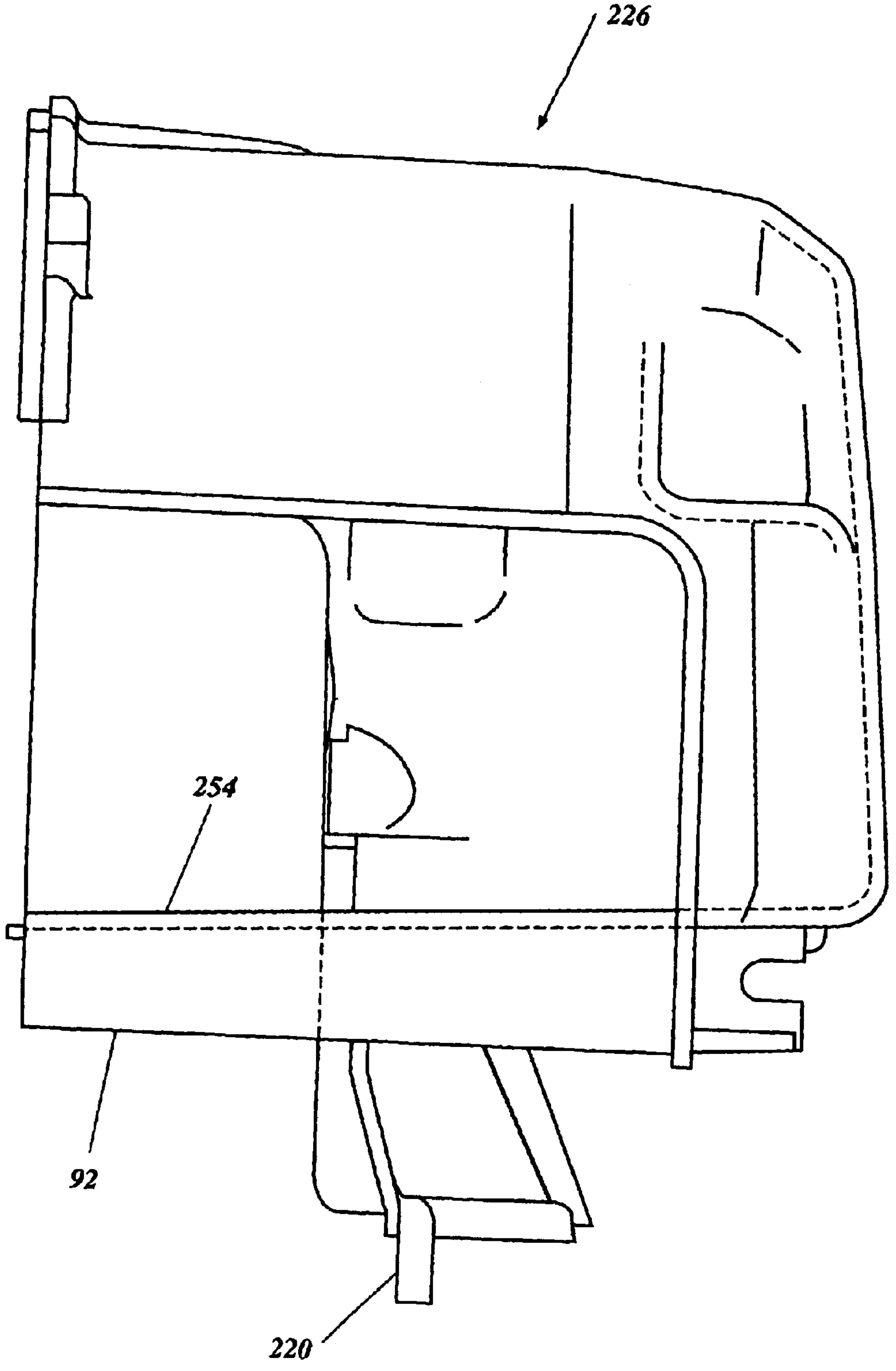
FIG. 52 is a right side view of the rear engine shroud of FIG. 50.
Figure 53:
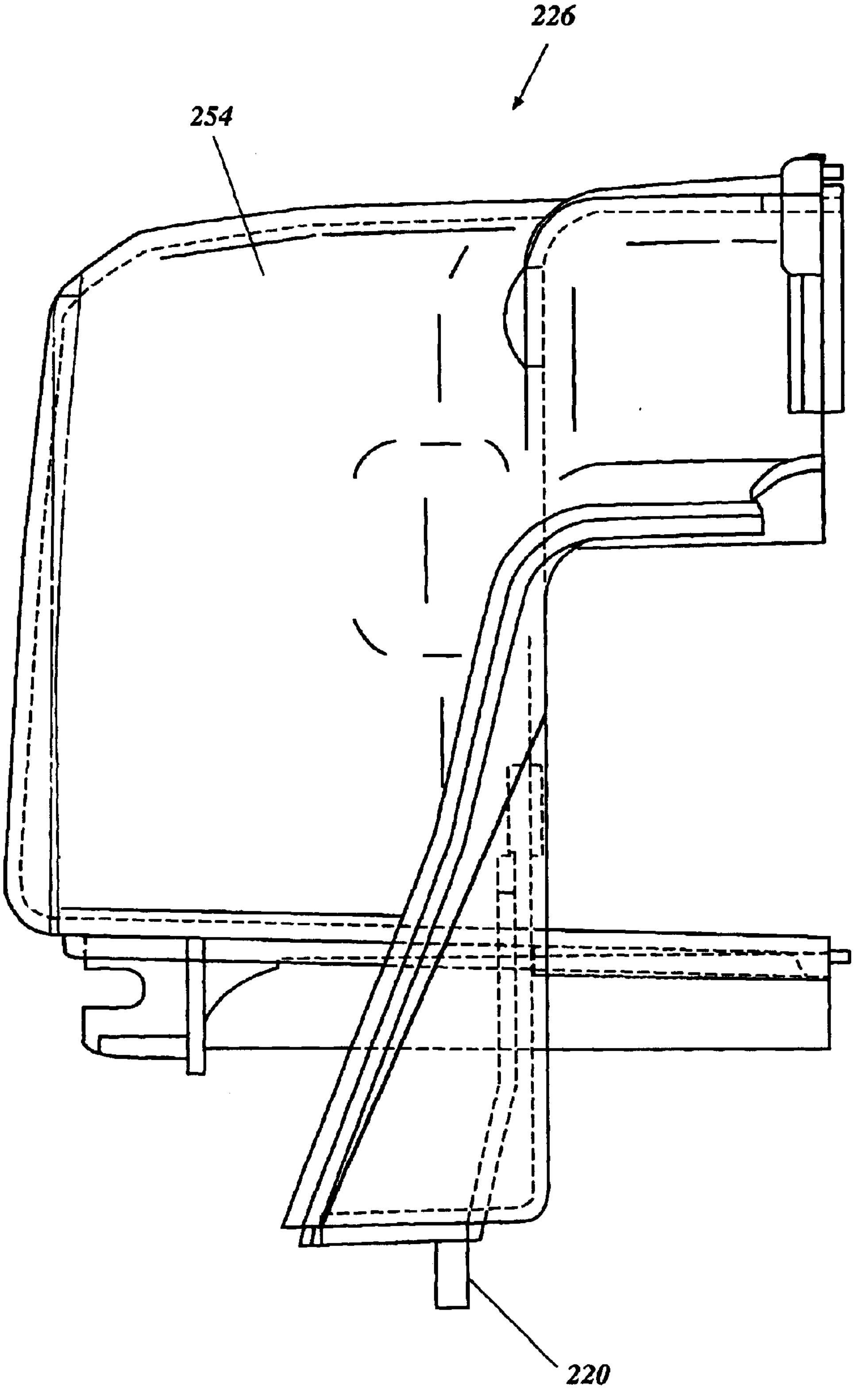
FIG. 53 is a left side view of the rear engine shroud of FIG. 50.

With additional reference now to FIGS. 43 and 44, an engine fan shroud 218 defines an air filter housing 238 and is mounted on the left side of the engine cover 218 adjacent to the recoil starter 134. A round opening 237 surrounding the recoil starter 134 is integrally formed within the engine fan shroud 218. An air cleaner cover 239 attaches to the air cleaner housing 238 to secure an air cleaner (not shown) that provides clean air to the carburetor 212. The recoil starter 134 is connected to the crankshaft for starting the engine 12 and is positioned between the crankcase 14 and the fuel tank 76. A recoil starter housing 240 comprises a plurality of cooling openings 242 allowing entry of air along the first cooling path to cool the engine 12. The engine cooling fan 86 draws in air into the cooling openings 242 through the air intake vents 32 when the engine 12 rotates, initially cooling the electronic control module 24 before cooling the engine 12. Below the recoil starter housing 240 is a sound absorbing member 248, along with a sound insulation rib 250 contributing to quiet engine and generator operation.

The front engine cover 216, the rear engine cover 226, the right side generator cover 230, and the left side engine cover 218 are designed to guide the various cooling air paths to advantageously cool the engine 12 and the generator 22. Other internal components such as, but not limited to, the muffler 74 and the electronic control module 24 are also cooled as a result of these cooling air paths. A dividing portion 254 surrounding a portion of the muffler 74 separates the two cooling air paths inhibits heat from the muffler 74 from radiating to the generator. The exiting air deflector 92 guides the exiting air from a cooling air exiting port 256 disposed on an upper side of the generator cover 230 away from a muffler outlet 258 in a downward direction. The exiting air deflector 92 also inhibits entry of foreign objects and/or water if the power generator unit 10 is kept in an outside environment.

The engine covers 216, 218, 226 as well as the generator side cover 230 assemble together to form a generally complete shrouding for engine 12 and the generator. This complete shrouding ensures proper cooling of the engine 12 and the generator 22 along with quiet operation.

Figure 54:
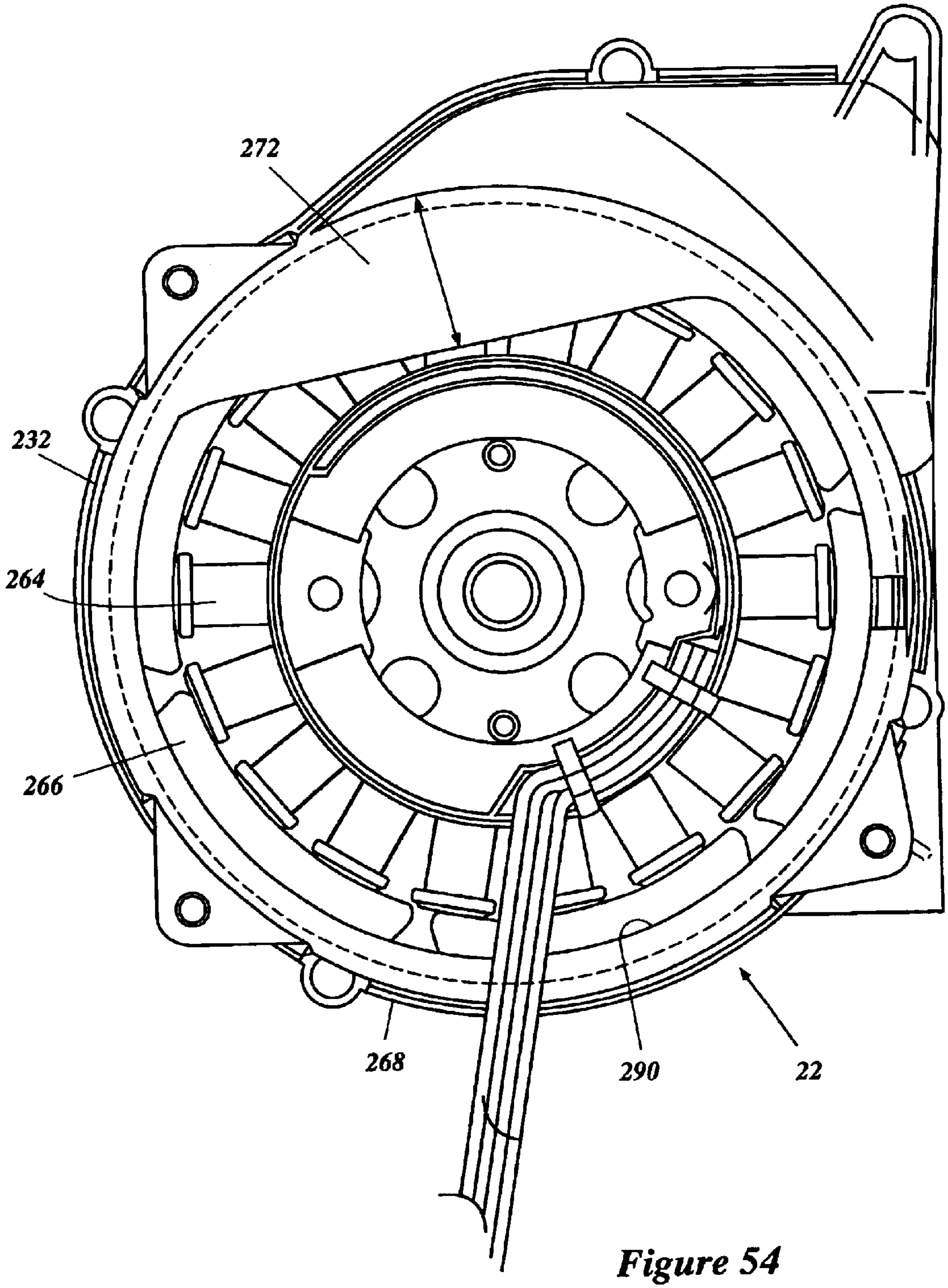
FIG. 54 is a left side view of the generator showing a generator cover of the engine-generator assembly of FIG. 39.
Figure 55:
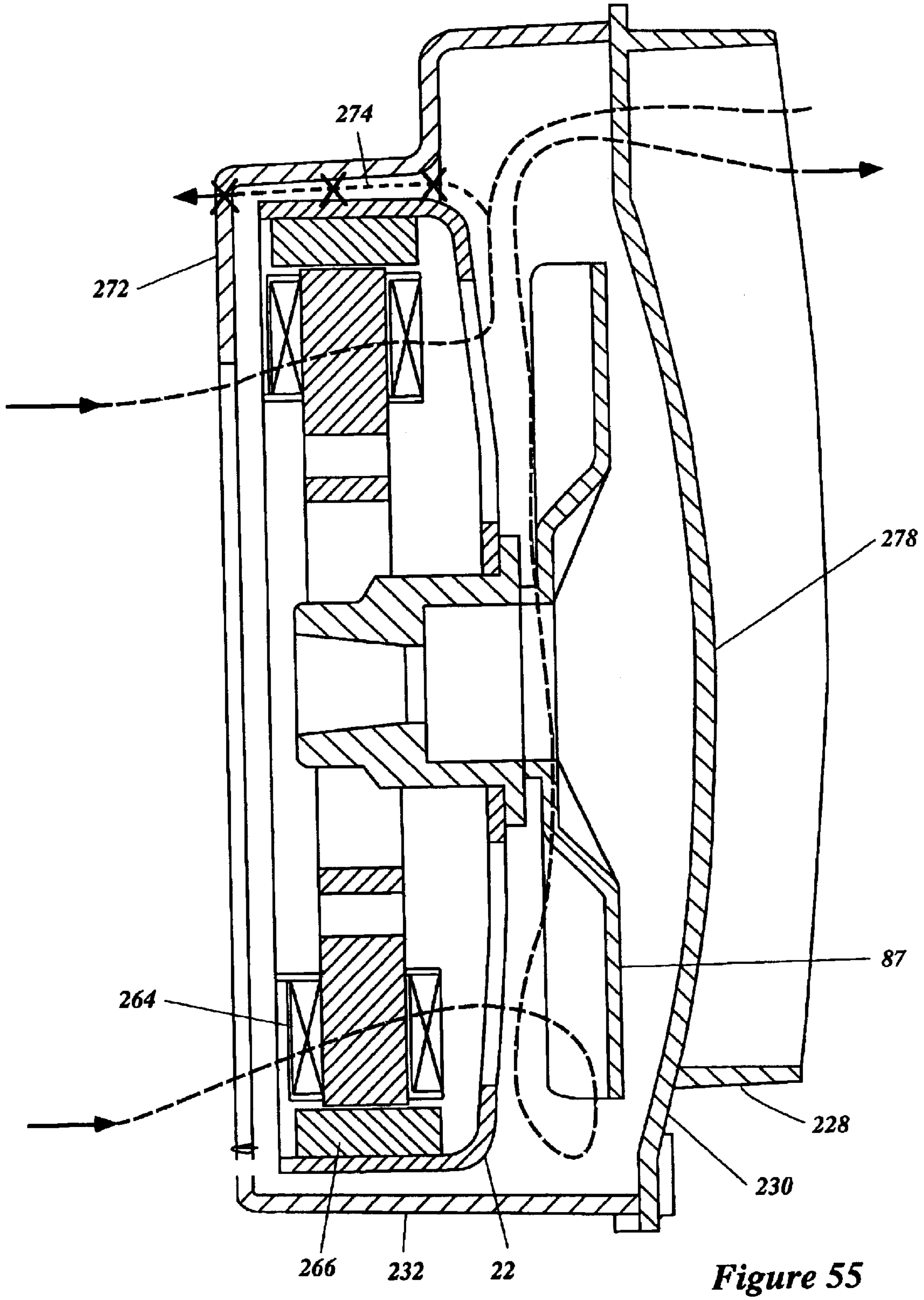
FIG. 55 illustrates a cross sectional view of the generator cooling fan and the generator with arrows showing the cooling air flow direction.

With reference to FIGS. 54 and 55, the generator 22 is positioned in the generator housing 232 to the right of the engine 12 and under the muffler 74. The generator 22 incorporates a stator 264 fastened to the crankcase 14 and a rotor 266 connected (either directly or indirectly through a gear train or another transmitter) to the crankshaft so that an electrical charge is generated as the rotor 266 is rotated by the crankshaft. The generator cooling fan 87 is positioned to the right of the generator 22 and is fastened to the rotor 266 so as to rotate with the rotor 266 and crankshaft. This generator cooling fan rotation draws external cooling air through the second air intake duct 34 cooling the crankcase 14 and generator 22. The cooling air is then exhausted through the side piece discharge vent 70.

The generator housing 232 is designed to assist in guiding the cooling air to efficiently cool the crankcase 14 and the generator 22, and to allow the cooling air to exit. FIG. 54 illustrates the generator 22 positioned within a generator mounting area 268 in a generator opening 270 of the generator housing 232. A cooling air guide 272 preferably is incorporated into an upper portion of the generator opening 270.

As seen in FIG. 55, the cooling air guide 272 inhibits the cooling air entering the generator from immediately exiting through a clearance gap 274 instead of traveling through the generator 22 to efficiently cool the generator components. The cooling efficiency of the generator 22 is increased through the use of the cooling air guide 272 by forcing the cooling air to contact more surface area of the generator components allowing the cooling air to dissipate more heat away from the generator 22. The cooling air guide 272 also strengthens the generator housing 232 by acting as an additional reinforcement between the body of the generator housing 232 and the upper portion of the generator housing 232.

Figure 56:
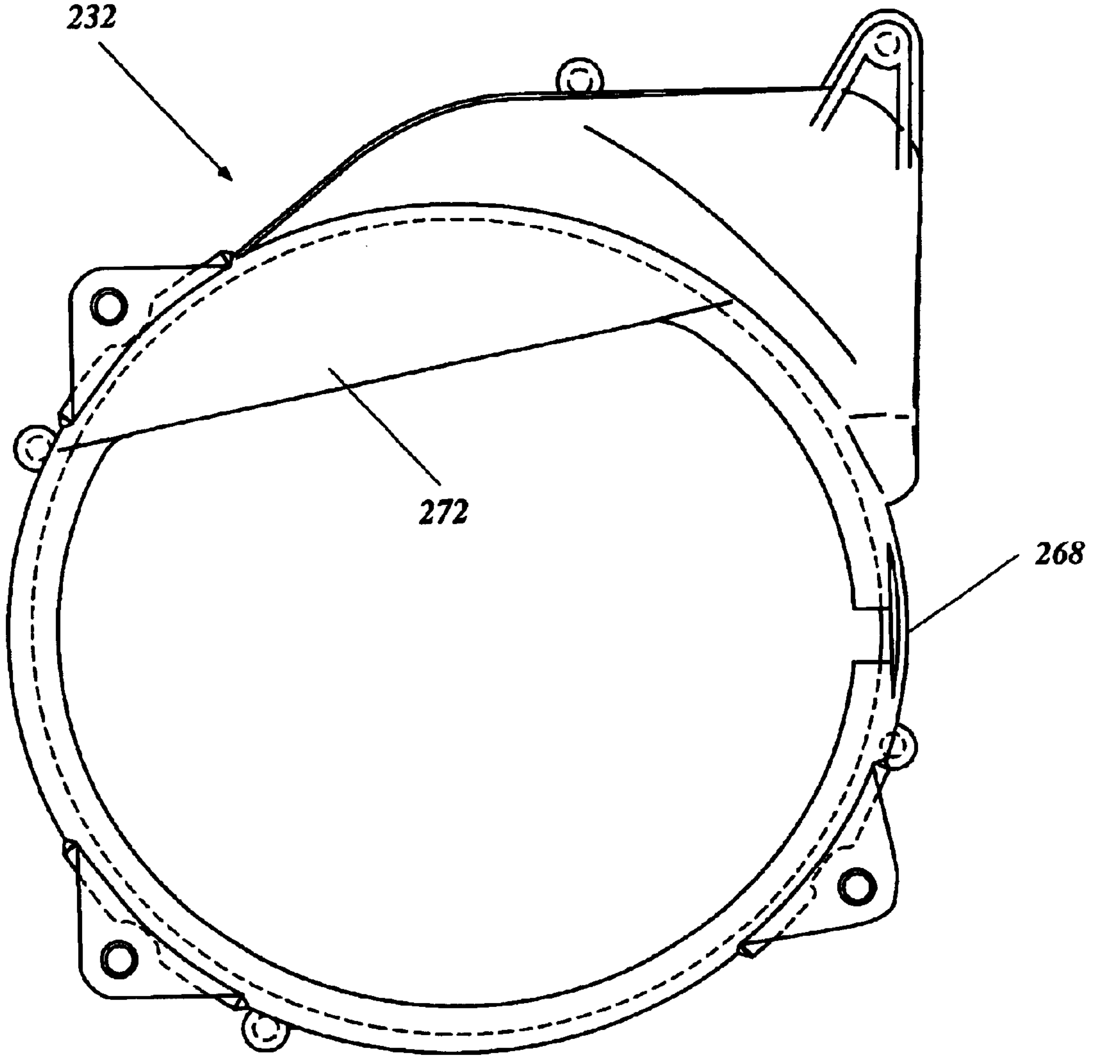
FIG. 56 is a left side view of the generator cover of FIG. 54.
Figure 57:
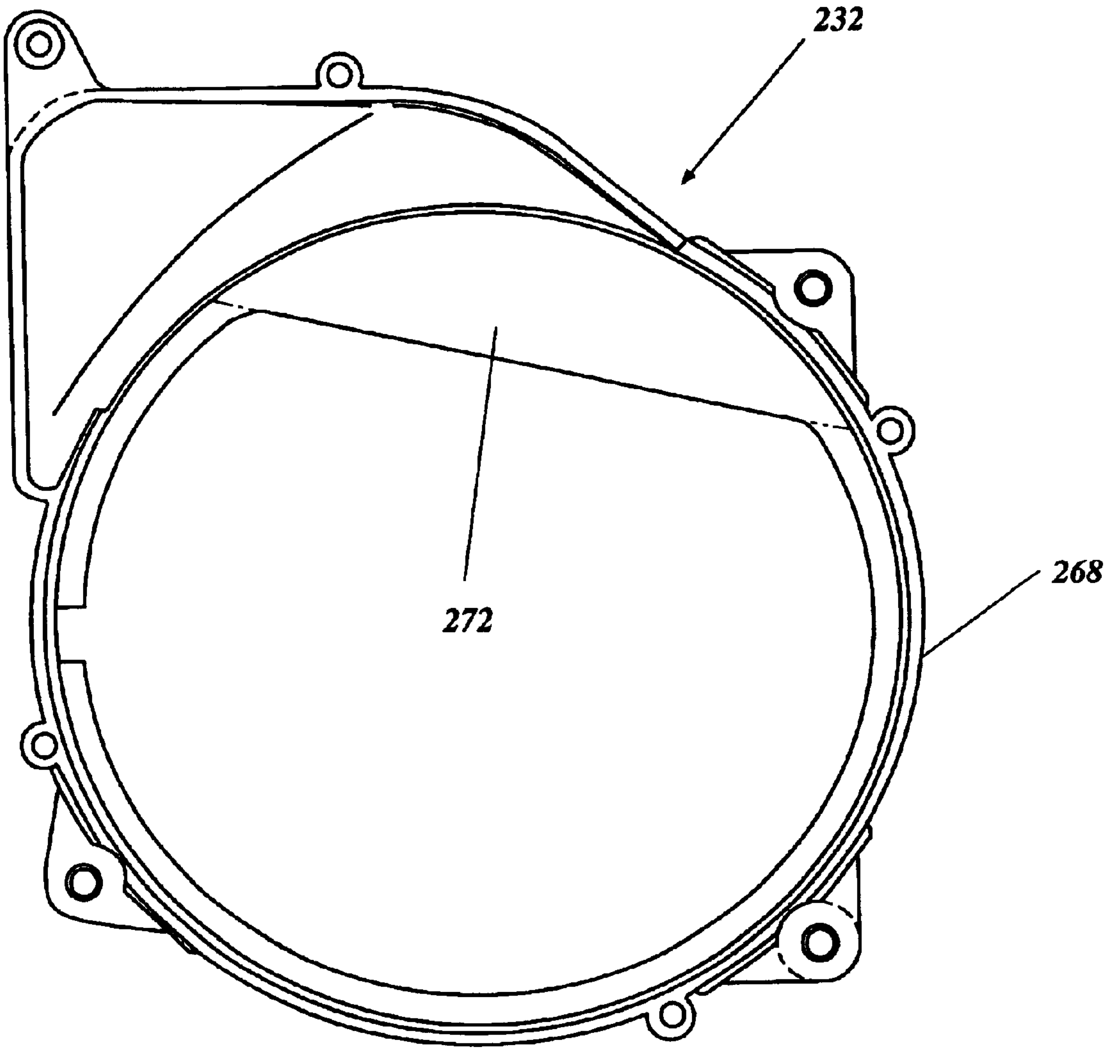
FIG. 57 is a rear side view of the generator cover of FIG. 54.
Figure 58:
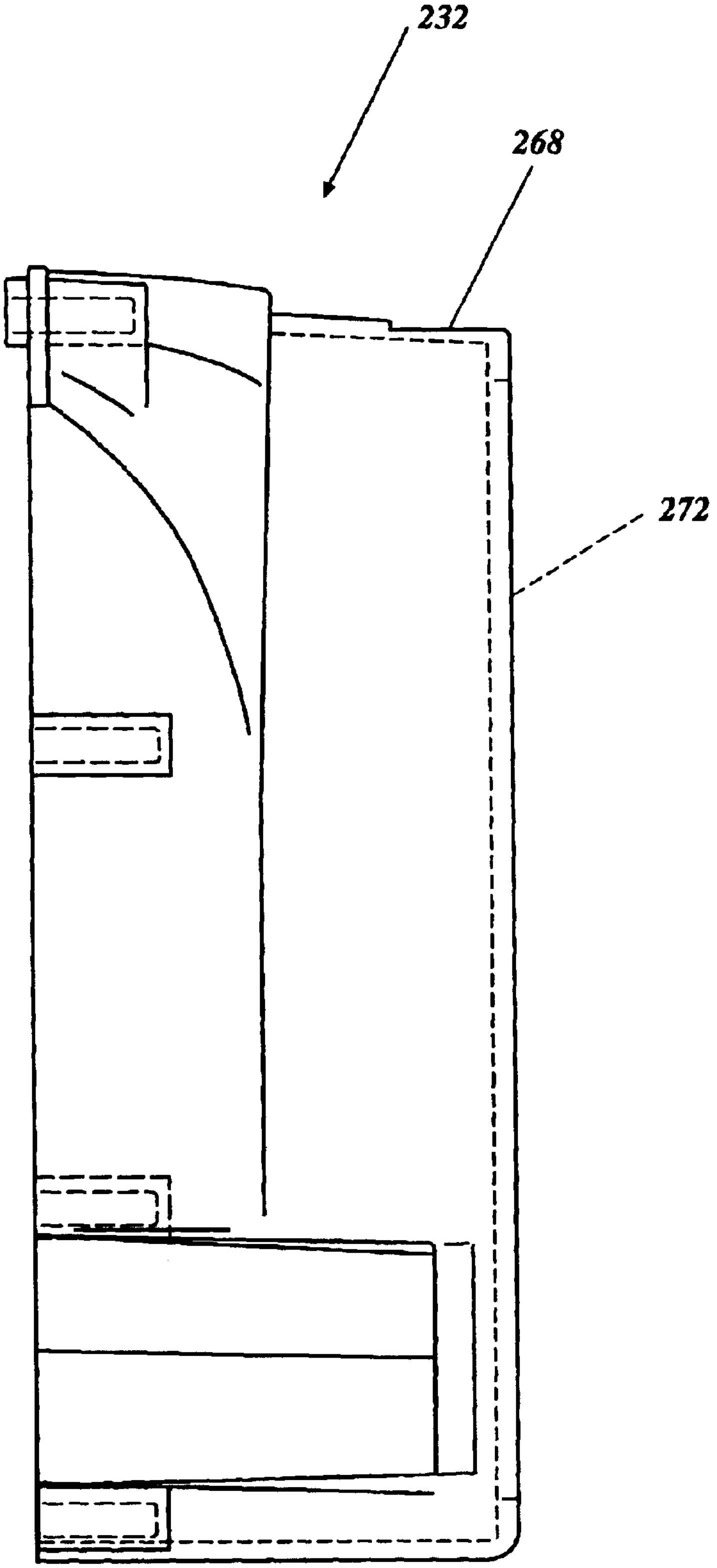
FIG. 58 is a front view of the generator cover of FIG. 54.
Figure 59:
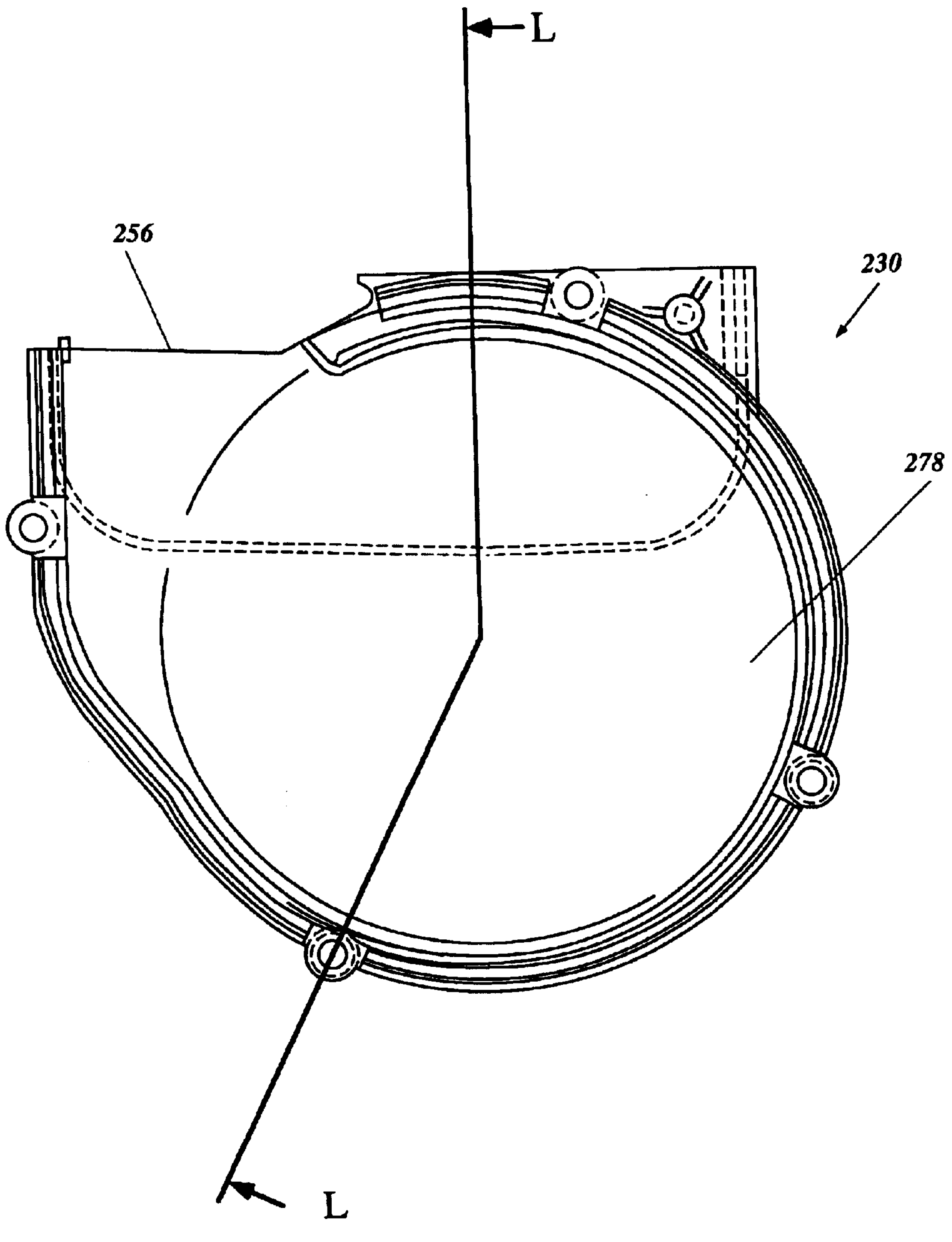
FIG. 59 is a left side view of a generator end cover of the engine-generator assembly of FIG. 39.
Figure 60:
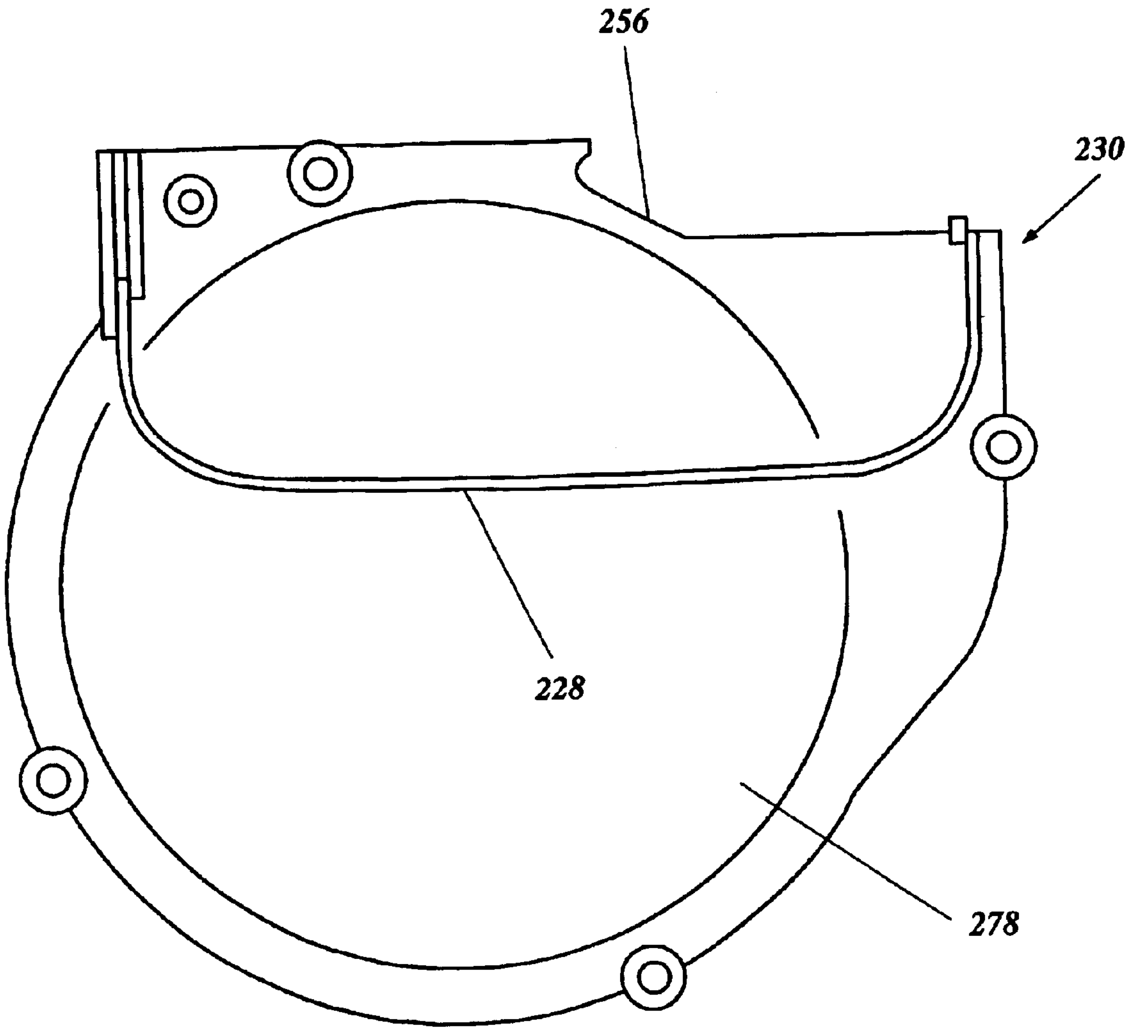
FIG. 60 is a right side view of the generator end cover of FIG. 59.
Figure 61:
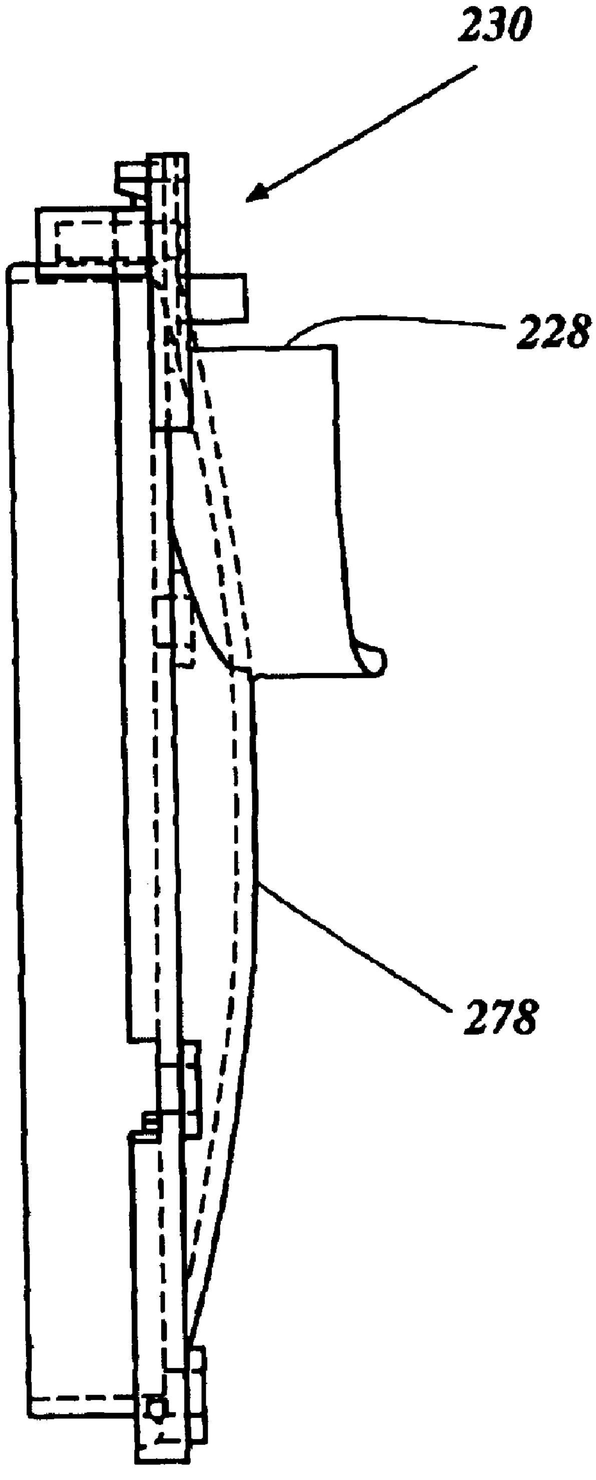
FIG. 61 is a front view of the generator end cover of FIG. 59.
Figure 62:
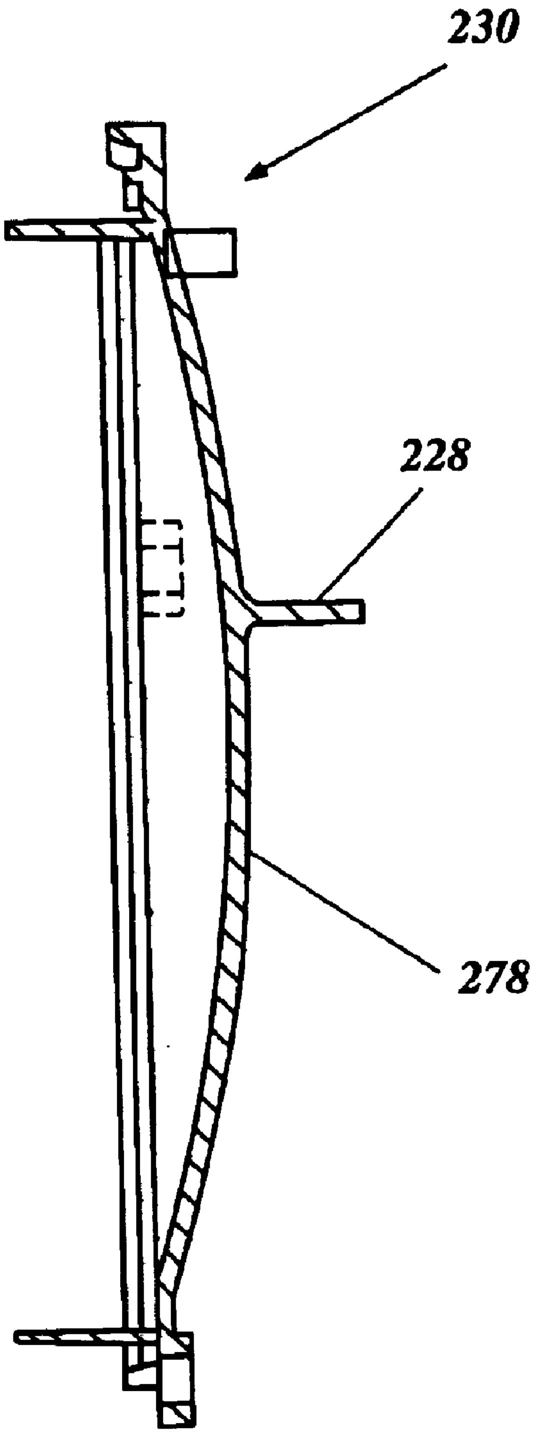
FIG. 62 is a cross sectional view of the generator end cover taken along the section line L—L of FIG. 59.

FIGS. 56–58 illustrate views of the generator housing 232 in greater detail. A generator mounting area 268 of the generator housing 232 preferably incorporates a circular size and shape closely matching the size and shape of the generator 22. This similar size and shape of the generator mounting area 268 allows the cooling air to efficiently cool the generator by through the generator 22 and to inhibit the cooling air from traveling around the generator 22. The cooling air guide 272 also encourages the cooling air to pass through the generator 22 instead of immediately escaping the generator 22 in the opposite direction against the cooling air flow. A plurality of securing boss member permit the generator housing 232 to be securely attached to the engine and to allow other covers to be secured.

FIGS. 59–62 illustrate the right side generator cover 230 in greater detail. The size and position of the illustrated cooling air exiting port 256 are designed to contribute to improved cooling of the generator. The cooling air is forced to exit the cooling air exiting port, thereby forcing the cooling air to contact more surface area of the generator components instead of quickly leaving the generator housing 232. Forcing the cooling air to contact more surface area of the generator components allows the cooling air to draw more heat away from the generator 22.

A rounded surface 278 incorporated into the right side generator cover 230 allows for a clearance cavity next to cooling air exiting side of the generator 22. This cavity provides clearance for the generator and allows the cooling air to efficiently cool all surface areas of the generator 22.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. It should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A power generator unit comprising an engine, a generator driven by the engine, at least one fan driven by the engine, a cover enclosing at least the fan and including at least one air intake opening, and an electronic control module communicating with at least one of the engine and generator so as to control at least one operational characteristic of the power generator, the electronic control module positioned immediately next to, but separate from, the at least one air intake opening, wherein the electronic control module has a generally planar surface that lies proximal and opposite to the at least one air intake opening so that the electronic control module is substantially adjacent to the at least one air intake opening, and wherein the generator and the fan are disposed on opposite sides of the engine.

2. The power generator unit of claim 1, wherein the engine has a crankshaft, the fan is driven off one side of the crankshaft, and the generator is driven off the other side of the crankshaft.

3. The power generator unit of claim 1, wherein the engine directly drives the fan.

4. The power generator of claim 1, wherein the cover also encloses the engine and the generator.

5. The power generator unit of claim 1, wherein the generally planar surface of the electronic control module includes a plurality of cooling fins.

6. The power generator unit of claim 5, wherein the electronic control module is disposed within the cover generally at the same elevation as the fan within the cover, and at least some of the cooling fins extend in a generally vertical direction.

7. The power generator unit of claim 1, wherein the cover includes a control panel, and the at least one air intake opening is disposed on the same side of the cover as the control panel.

8. The power generator unit of claim 1 additionally comprising a fuel tank enclosed within the cover, the fan being disposed at a position generally between the fuel tank and the engine.

9. The power generator unit of claim 1, wherein the air intake opening is disposed on one side of the cover, the fan is arranged to draw in external air through the air intake opening, the engine being disposed downstream of the fan, and the discharge opening being disposed downstream of the engine, whereby a cooling air path occurs when the engine drives the fan to draw external air through the air intake opening to cool the electronic control module and at least a portion of the engine, and thence to discharge heated air through the discharge opening.

10. The power generator unit of claim 9 additionally comprising a second air intake opening and a second fan, the second air intake opening being disposed relative to the fans such that at least a principal portion of external air drawn through the second air intake opening passes through the second fan and exits the cover through the discharge opening so as to produce a second cooling air path, the generator being disposed generally in the second cooling air path amended.

11. The power generator unit of claim 10, wherein another portion of the engine is disposed upstream of the second fan so as to lie at least partially in the second cooling path.

12. The power generator unit of claim 9, wherein the engine includes a muffler that is disposed between the first body portion of the engine and the discharge opening so as to lie at least partially in the first cooling air path.

13. The power generator unit of claim 1, wherein the cover encloses the engine and the generator and includes a bottom portion, and the engine, the generator and the electronic control module each being mounted to the bottom portion of the cover.

14. The power generator unit of claim 13 additionally comprising a fuel tank mounted to the bottom portion of the cover and arranged within the cover to lie next to the electronic control module, and the fan is arranged between the engine and the fuel tank.

15. The power generator unit of claim 1, wherein the cover includes at least one portion comprising a sound insulating material.

16. The power generator unit of claim 1, wherein said insulating cover defines a handle to carry the power generator unit.

17. A power generator unit comprising a cover having at least a first air intake opening, a second air intake opening separate from the first air intake opening, and a discharge opening disposed on a side of the cover generally orthogonal to the first and second air intake openings, an engine including a first body portion that defines, at least in part, a combustion chamber, a second body portion disposed next to the first body portion, and at least one muffler that receives exhaust gases from the combustion chamber, a generator driven by the engine, at least a first fan and a second fan, each fan driven by the engine, the first air intake opening being disposed on one side of the cover, the first fan arranged to draw in external air through the first air intake opening, the engine being disposed downstream of the first fan, and the discharge opening being disposed downstream of the engine, whereby a first cooling air path occurs when the engine drives the first fan to draw external air through the first air intake opening to cool at least the first body portion of the engine and thence to discharge heated air through the discharge opening, the second air intake opening being disposed relative to the first and second fans such that at least a principal portion of external air drawn through the second air intake opening passes through the second fan and exits the cover through the discharge opening so as to produce a second cooling air path, the generator being disposed generally in the second cooling air path, the first and second air intake openings and first and second fans further disposed so that the first and second cooling air oaths generally extend directly from the intake openings to the discharge opening.

18. The power generator unit of claim 17, wherein the second fan includes a rotatable blade and a shrouding disposed around at least a side of the blade that faces away from the engine, the shrouding defining at least one effluent opening for the air to exit the second fan, the effluent opening being disposed on an upper side of the shrouding.

19. The power generator unit of claim 17, wherein the first body portion of the engine includes at least one cooling fin.

20. The power generator unit of claim 17, wherein the muffler is disposed between the first body portion of the engine and the discharge opening so as at least partially to lie in the first cooling air path.

21. The power generator unit of claim 17, wherein the muffler is disposed generally above the second fan.

22. The power generator unit of claim 17, wherein the second portion of the engine is disposed upstream of the second fan so as at least partially to lie in the second cooling path.

23. The power generator unit of claim 17 additionally comprising an electronic control module communicating with at least one of the engine and generator so as to control at least one operational characteristic of the power generator unit; the module being disposed between the first air intake opening and the first fan in the first cooling air path.

24. The power generator unit of claim 17, wherein the first cooling fan is configured to distribute cooling air at a level generally above the second cooling fan.

25. The power generator unit of claim 17, wherein at least a portion of the first cooling air path is located generally above a portion of the second cooling air path.

26. The power generator unit of claim 17 additionally comprising guide members disposed within the cover and arranged so as to promote separation between the first and second cooling air paths.

27. The power generator unit of claim 17 additionally comprising a guide member disposed at the discharge opening to separate the first cooling air path from the second cooling air path, the guide member being configured to direct cooling air, which has flowed along the second cooling air path, away from the first cooling path as such cooling air exits the cover through the discharge opening.

28. The power generator unit of claim 17, wherein the engine additionally includes a crankshaft, and the second body portion of the engine supports, at least in part, the crankshaft of the engine.

29. The power generator unit of claim 17, wherein the engine includes a recoil starter that is activated by a starter cable, and the starter cable extends through the cover at a point near the second air intake opening.

30. A power generator unit comprising a cover including a bottom portion, an engine disposed within the cover, a generator driven by the engine, a fuel tank mounted onto the bottom portion of the cover, and an electronic control module communicating with at least one of the engine and the generator, the electronic control module being mounted onto the bottom portion of the cover near the fuel tank.

31. The power generator unit of claim 30, wherein the bottom portion of the cover defines at least first, second and third mounting areas, the second mounting area disposed generally between the first and third mounting areas, the fuel tank mounted at the first mounting area, the engine mounted at the second mounting area, and the generator mounted at the third mounting area.

32. The power generator unit of claim 31, wherein the bottom portion of the cover defines a fourth mounting area that is located between a sidewall of the cover and the first mounting area and generally to one side of the first, second and third mounting areas, and the electronic control module is mounted at the fourth mounting area.

33. The power generator unit of claim 30, wherein the cover additionally includes a of split cover pieces that are supported by the bottom portion of the cover.

34. The power generator unit of claim 33, wherein one of the split cover pieces includes a control panel on a front side of the power generator unit, and the other one of the split cover pieces defines an access opening on a rear side of the power generator unit.

35. The power generator unit of claim 34 additionally comprising at least one electrical component disposed behind the control panel, and the electronic control module is disposed beneath the electrical component.

36. The power generator unit of claim 34, wherein the engine includes a recoil starter that is activated by a starter cable, and the starter cable extends through the cover at a point generally next to the electronic control module and generally below the control panel.

37. The power generator unit of claim 33, wherein the cover additionally includes a side cover piece that is attached to the bottom portion of the cover and to both split cover pieces, and the side cover piece defines a discharge opening.

38. The power generator unit of claim 33, wherein the split cover pieces together define a handle on the cover.

39. The power generator unit of claim 33, wherein the cover includes a least a portion comprising a sound insulating material.

40. A power generator unit comprising:

an engine;

a generator driven by the engine;

at least one fan driven by the engine;

a cover enclosing the fan, the cover having a bottom portion and defining a plurality of air intake openings; and an electronic control module disposed within the cover generally at the same elevation as the fan, the electronic control module having a generally planar surface with a plurality of cooling fins positioned immediately next to, but separate from, the air intake openings, at least some of the cooling fins extending in a generally vertical direction relative to the bottom portion, wherein the electronic control module communicates with at least one of the engine and the generator so as to control at least one operational characteristic of the power generator.

41. A power generator unit comprising:

an engine;

a generator driven by the engine;

at least one fan driven by the engine;

a cover enclosing the fan, the engine and the generator, the cover having a bottom portion and including at least one air intake opening;

an electronic control module communicating with at least one of the engine and generator so as to control at least one operational characteristic of the power generator, the electronic control module positioned immediately next to, but separate from, the at least one air intake opening, the electronic control module, the engine and the generator each being mounted to the bottom portion of the cover; and a fuel tank mounted to the bottom portion of the cover and arranged within the cover to lie next to the electronic control module, the fan being arranged between the engine and the fuel tank.

* * * * *

UNITED STATES PATENT AND TRADEMARK OFFICE

CERTIFICATE OF CORRECTION

PATENT NO. : 6,917,121 B2
APPLICATION NO. : 10/405061
DATED : July 12, 2005
INVENTOR(S) : Akimoto et al.

It is certified that error appears in the above-identified patent and that said Letters Patent is hereby corrected as shown below:

At First Page column 2 (Astract), line 8, after “control” please delete “(“, therefor.

At column 9, line 12, after “around” please delete “a”, therefor.

At column 11, line 19, (Approx.), please delete “cross, sectional” and insert - - cross-sectional - -, therefor.

At column 11, line 67, after “is” please delete “,” therefor.

At column 15, lines 3-4, in Claim 10, after “path” please delete “amended”, therefor.

At column 15, line 55, in Claim 17, please delete “oaths” and insert - - paths - -, therefor.

At column 16, line 61, in Claim 33, after “includes a” please insert - - pair - -, therefor.

At column 17, line 17, in Claim 39, please delete “claim 33” and insert - - claim 30 - -, therefor.

At column 17, line 18, in Claim 39, after “includes” please delete “a” and insert - - at - -, therefor.

Signed and Sealed this

Twenty-fifth Day of July, 2006

JON W. DUDAS

*Director of the United States Patent and Trademark Office*